(12) United States Patent
Veugen et al.

(10) Patent No.: US 9,350,539 B2
(45) Date of Patent: May 24, 2016

(54) SECURE DISTRIBUTION OF CONTENT

(75) Inventors: Peter Veugen, Voorburg (NL); Mattijs Oskar Van Deventer, Leidschendam (NL); Omar Aziz Niamut, Vlaardingen (NL)

(73) Assignees: Koninklijke KPN N.V., The Hague (NL); Nederlandse Organisate voor Toegepast-Natuurwetenschappelijk Onderzoe TNO, Delft (NL)

( * ) Notice: Subject to any disclaimer, the term of this patent is extended or adjusted under 35 U.S.C. 154(b) by 15 days.

(21) Appl. No.: 14/346,663

(22) PCT Filed: Sep. 7, 2012

(86) PCT No.: PCT/EP2012/067577
§ 371 (c)(1),
(2), (4) Date: Mar. 21, 2014

(87) PCT Pub. No.: WO2013/041394
PCT Pub. Date: Mar. 28, 2013

(65) Prior Publication Data
US 2014/0233740 A1 Aug. 21, 2014

(30) Foreign Application Priority Data
Sep. 23, 2011 (EP) .................................... 11182553

(51) Int. Cl.
| | | |
|---|---|---|
| H04L 9/08 | (2006.01) | |
| H04L 9/30 | (2006.01) | |
| H04L 9/06 | (2006.01) | |

(52) U.S. Cl.
CPC .............. *H04L 9/0819* (2013.01); *H04L 9/065* (2013.01); *H04L 9/0825* (2013.01);
(Continued)

(58) Field of Classification Search
CPC ... H04L 9/0819; H04L 9/0869; H04L 9/0825; H04L 9/0861; H04L 9/065; H04L 9/3013; H04L 9/302; H04L 2209/24; H04L 2209/603
See application file for complete search history.

(56) References Cited

U.S. PATENT DOCUMENTS

| | | | | |
|---|---|---|---|---|
| 2006/0085343 | A1* | 4/2006 | Lisanke | .................. G06F 21/10 705/50 |
| 2010/0008500 | A1* | 1/2010 | Lisanke | .................. G06F 21/10 380/201 |

(Continued)

FOREIGN PATENT DOCUMENTS

| | | |
|---|---|---|
| EP | 2227015 A2 | 9/2010 |
| WO | 02/46861 A2 | 6/2002 |
| WO | 2010/099603 A1 | 9/2010 |

OTHER PUBLICATIONS

PCT Search Report and Written Opinion, PCT International Application No. PCT/EP2012/067577 dated Nov. 28, 2012.
(Continued)

*Primary Examiner* — Krisna Lim
(74) *Attorney, Agent, or Firm* — McDonnell Boehnen Hulbert & Berghoff LLP

(57) ABSTRACT

Methods and systems are described for secure delivery of a content item from at least a first content distribution network (CDN1) to at least one content receiving entity using a split-key cryptosystem comprising encryption and decryption algorithms E and D, a cipher algorithm for generating encryption and decryption keys e,d on the basis of secret information S and a split-key algorithm using secret information S for splitting e into i different split-encryption keys $e_1, e_2, \ldots, e_i$ and/or for splitting d into k different split-decryption keys $d_1, d_2, \ldots, d_k$ respectively, such that $D_{dk}(D_{dk-1}(\ldots(D_{d2}(D_{d1}(E_{ei}(E_{ei-1}(\ldots(E_{e2}(E_{e1}(X))\ldots))=D_{dk}(D_{dk-1}(\ldots(D_{d2}(D_{d1}(X_{e1,e2,\ldots,ei}))=X$ wherein $i,k \geq 1$ and $i+k > 2$. The method may comprise: a content source providing said at least one CDN1 with at least one an encrypted content item $X_e$; a key generator associated with said content source comprising said cipher and split-key algorithm generating first split-key information and transmitting said first split-key information to said first CDN1, preferably to a first secure module associated with said CDN1; generating a partially decrypted content item on the basis of said encrypted content item $X_e$, said decryption algorithm D and said first split-key information; and, transmitting said partially decrypted content item to said content receiving entity.

18 Claims, 32 Drawing Sheets

(52) U.S. Cl.
CPC ........... *H04L 9/0861* (2013.01); *H04L 9/0869* (2013.01); *H04L 9/302* (2013.01); *H04L 9/3013* (2013.01); *H04L 2209/24* (2013.01); *H04L 2209/603* (2013.01)

(56) References Cited

U.S. PATENT DOCUMENTS

| | | | |
|---|---|---|---|
| 2010/0088505 A1 | 4/2010 | Coppola et al. | |
| 2011/0093707 A1* | 4/2011 | Green | G06F 21/6218 713/168 |
| 2011/0176675 A1 | 7/2011 | Hughes et al. | |
| 2012/0204032 A1* | 8/2012 | Wilkins | H04L 9/006 713/170 |
| 2012/0216034 A1* | 8/2012 | Chen | H04L 9/0825 713/153 |
| 2014/0310527 A1* | 10/2014 | Veugen | H04L 9/3013 713/171 |

OTHER PUBLICATIONS

Menezes, A. et al., "Key Establishment Protocols", Handbook of Applied Cryptography, CRC Press Series on Discrete Mathematics and its Applications, Chapter 12, 1996, pp. 489-541.
"CDN Interconnection Architecture", TS 182 032 V0.0.5, ETSI, Jun. 2012, pp. 1-41.
"Telecommunications and Internet Converged Services and Protocols for Advanced Networking (TISPAN); Content Delivery Network (CDN) Architecture", ETSI TS 182 019 V3.1.1, Jun. 2011, pp. 1-82.
Dierks, T. et al., "The TLS Protocol, Version 1.0", Network Working Group, Request for Comments 2246, Jan. 1999, pp. 1-75.
Mavlankar, Aditya et al., "An Interactive Region-of-Interest Video Streaming System for Online Lecture Viewing", Proceedings of ICIP, 2010, 8 pages.

* cited by examiner

Table: "Key_ref_Movie-5"

| Party | Partial decryption key |
|---|---|
| CDN_B | 63543530165410241 0 |
| CDN_C | 36584365845441351 5 |
| CONS_634 | 36563513510515113 5 |
| CONS_511 | 35436543583643654 5 |
| CONS_122 | 32135436843153688 7 |

Keys for partial decryption before sent to consumer or other CDN

2910

Table: "Location_Movie-5_1"

| No. | URI |
|---|---|
| 1 | cache_1.cdn_A.com /res/Movie-5_1.seg |
| 2 | cache_2.cdn_A.com /res/Movie-5_1.seg |
| 3 | cache_5.cdn_B.com /res/Movie-5_1.seg |

2908

Table: "CDN_A database"

| Name | Location | Key Reference |
|---|---|---|
| Movie-1 | Location_Movie-1 | Key_ref_Movie-1 |
| Movie-2 | Location_Movie-2 | Key_ref_Movie-2 |
| Movie-3 | Location_Movie-3 | Key_ref_Movie-3 |
| Movie-4 | Location_Movie-4 | Key_ref_Movie-4 |
| Movie-5_1 | Location_Movie-5_1 | Key_ref_Movie-5 |
| Movie-5_2 | Location_Movie-5_2 | Key_ref_Movie-5 |
| Movie-5_3 | Location_Movie-5_3 | Key_ref_Movie-5 |
| ... | | |

2904  2902

Content group 2906

```
File name = Movie_4.mf
Type of segmentation = spatially
Number of segments = 4
Relationships between segments = 2x2 matrix
Encryption key = 0374560982303030355
  Segment
    Segment name =
    cache_1.cdn_A.com/res/Movie-4-1.seg
    Position in whole = (0,0)
  Segment
    Segment name =
    cache_2.cdn_A.com/res/Movie-4-2.seg
    Position in whole = (0,1)
  Segment
    Segment name =
    cache_1.cdn_A.com/res/Movie-4-3.seg
    Position in whole = (1,0)
  Segment
    Segment name =
    cache_2.cdn_A.com/res/Movie-4-4.seg
    Position in whole = (1,1)
```
3002

```
File name = Movie_4.mf
Type of segmentation = spatially
Number of segments = 4
Relationships between segments = 2x2 matrix
  Segment
    Segment name =
    cache_1.cdn_A.com/res/Movie-4-1.seg
    Position in whole = (0,0)
    Encryption key = 3616800638470747765
  Segment
    Segment name =
    cache_2.cdn_A.com/res/Movie-4-2.seg
    Position in whole = (0,1)
    Encryption key = 0347804134084000005
  Segment
    Segment name =
    cache_1.cdn_A.com/res/Movie-4-3.seg
    Position in whole = (1,0)
    Encryption key = 0019877984133364884
  Segment
    Segment name =
    cache_2.cdn_A.com/res/Movie-4-4.seg
    Position in whole = (1,1)
    Encryption key = 1338769898693846388
```
3004

```
File name = Movie_4.mf
Type of segmentation = spatially
Number of segments = 4
Relationships between segments = 2x2 matrix
Decryption key d = 3656351351051 51135
Segment
    Segment name =
    cache_1.cdn_A.com/res/Movie-4-1.seg
    Position in whole = (0,0)
Segment
    Segment name =
    cache_2.cdn_A.com/res/Movie-4-2.seg
    Position in whole = (0,1)
Segment
    Segment name =
    cache_1.cdn_A.com/res/Movie-4-3.seg
    Position in whole = (1,0)
Segment
    Segment name =
    cache_2.cdn_A.com/res/Movie-4-4.seg
    Position in whole = (1,1)
```

3102

```
File name = Movie_4.mf
Type of segmentation = spatially
Number of segments = 4
Relationships between segments = 2x2 matrix
Segment
    Segment name =
    cache_1.cdn_A.com/res/Movie-4-1.seg
    Position in whole = (0,0)
    Decryption key d = 3656351351051 51135
Segment
    Segment name =
    cache_2.cdn_A.com/res/Movie-4-2.seg
    Position in whole = (0,1)
    Decryption key d = 0348603487567 96547
Segment
    Segment name =
    cache_1.cdn_A.com/res/Movie-4-3.seg
    Position in whole = (1,0)
    Decryption key d = 8907547605 89895499
Segment
    Segment name =
    cache_2.cdn_A.com/res/Movie-4-4.seg
    Position in whole = (1,1)
    Decryption key d = 8765368126 58932154
```

```
File name = Movie_4.mf
Type of segmentation = spatially
Number of segments = 4
Relationships between segments = 2x2 matrix
Split-key = 6381987138731874817
Segment
    Segment name =
    cache_1.cdn_A.com/res/Movie-4-1.seg
    Position in whole = (0,0)
Segment
    Segment name =
    cache_2.cdn_A.com/res/Movie-4-2.seg
    Position in whole = (0,1)
Segment
    Segment name = <empty>
    Position in whole = (1,0)
Segment
    Segment name = <empty>
    Position in whole = (1,1)
```
3202

```
File name = Movie_4.mf
Type of segmentation = spatially
Number of segments = 4
Relationships between segments = 2x2 matrix
Segment
    Segment name =
    cache_1.cdn_A.com/res/Movie-4-1.seg
    Position in whole = (0,0)
    Split-key = 6516380136841385877
Segment
    Segment name =
    cache_2.cdn_A.com/res/Movie-4-2.seg
    Position in whole = (0,1)
    Split-key = 3651368413684800087
Segment
    Segment name = <empty>
    Position in whole = (1,0)
Segment
    Segment name = <empty>
    Position in whole = (1,1)
```
3204

SECURE DISTRIBUTION OF CONTENT

CROSS REFERENCE TO RELATED APPLICATIONS

The present application is a national stage entry of PCT/EP2012/067577 filed Sep. 7, 2012, and claims priority to EP 11182553.5 filed Sep. 23, 2011. The full disclosures of EP 11182553.5 and PCT/EP2012/067577 are incorporated herein by reference.

FIELD OF THE INVENTION

The invention relates to secure distribution of content and, in particular, though not exclusively, to methods and systems for secure distribution of content, a key server and a controller for use in such system, and a computer program product using such method.

BACKGROUND OF THE INVENTION

File-based and streaming content (e.g. movies and TV programs) have high cost and value associated with its creation and sales. For that reason content protection systems like Digital Rights Management (DRM) and Conditional Access (CA) systems are available to protect the content against unauthorized distribution and to only allow authorized users and systems accessing it.

Content Providers generate content but rarely deliver it directly to consumers. Instead, a content provider outsources the content delivery of the content to a consumer to an intermediate party, a content distributor. When outsourcing the delivery of the content, a certain trusted relation between the content provider and the content distributor, such as a content delivery network (CDN), is needed such that the content provider can rely on the content distributor that the content is delivered in accordance to certain predetermined conditions, e.g. secure delivery, and that the content provider is correctly paid for each time that a consumer requests a particular content item from the content distributor.

The importance of a trusted relation between the content provider and the content distributor gets even more prominent if a content distributor may or, in certain circumstances, must outsource the delivery of a content item to a consumer via one or more further content distributors, e.g. via a network of interconnected CDNs. In such situations, the process of delivery and billing of content items to large groups of consumers may easily become a very complex and non-transparent process. Moreover, the more distributors between the content provider and the consumers, the larger the chance that the security may be compromised by unauthorized parties.

A content distributor may use a content protection system for protecting the content against unauthorized access. If however the security system of the content distributor is compromised, then all stored and handled content may be potentially compromised.

US20100088505 describes a known content delivery system comprising a content protection system, which is configured to encrypt content that is stored within the CDN. In this scheme, the CDN is in direct control of the keys the content protection system needs to encrypt and decrypt the content in the CDN so that when a consumer request a content item from such CDN, the content decrypted by the CDN before it is sent to the consumer. When such CDN is compromised by an unauthorized party, such party may directly access the keys for decrypting the content. Moreover, the content protection system does not provide a scheme, which allows involvement of the content provider in the process of delivery of a content item to a consumer such that the content provider may (partly) control or at least monitor the secure delivery process of the content item for billing and/or security reasons.

Hence, methods and systems are desired which allow secure delivery of content originating from a content provider, via a content distributor or a network of content distributors to a large group of consumers. Moreover, methods and systems are desired which allow a content distributor to control or at least monitor the secure delivery of content originating from a content provider, via a content distributor or a network of content distributors to a large group of consumer and to detect a security breach during said secure delivery of content to said consumers.

SUMMARY OF THE INVENTION

It is an object of the invention to reduce or eliminate at least one of the drawbacks known in the prior art and to provide in a first aspect of the invention a method of a method for secure delivery of a content item from at least a first content distribution network (CDN1) to at least one content receiving entity using a split-key cryptosystem comprising encryption and decryption algorithms E and D, a cipher algorithm for generating encryption and decryption keys e,d on the basis of secret information S, and a split-key algorithm using secret information S for splitting e into i different split-encryption keys $e_1, e_2, \ldots, e_i$ and/or for splitting d into k different split-decryption keys $d_1, d_2, \ldots, d_k$ respectively, such that $D_{dk}(D_{dk-1}(\ldots(D_{d2}(D_{d1}(E_{ei}(E_{ei-1}(\ldots(E_{e2}(E_{e1}(X))\ldots))=D_{dk}(D_{dk-1}(\ldots(D_{d2}(D_{d1}(X_{e1,e2,\ldots,ei}))=X$ wherein i, k≥1 and i+k>2; The above condition further defines the group of split-key cryptosystems suitable for use in the present invention. The condition is written as a mathematical function and is a shortened version for stating that when executing a total of at least three of consecutive encryption and decryption operations on a content item X, applying encryption algorithm E and using split-encryption keys $e_1, e_2, \ldots, e_i$, and subsequently applying decryption algorithm D and using split-decryption keys $d_1, d_2, \ldots, d_k$ respectively, the result is again content item X.

In embodiments wherein either i or k has the value of 1, the respective split encryption key $e_1$, or the respective split decryption key $d_1$, is in fact not the result of a splitting operation, but equals e or d respectively. The condition i+k>2 defines that at least one of the encryption key e or the decryption key d, or both, are split in their respective split-keys, on the basis of the split key algorithm.

In the present application a number of encryption algorithms E and decryption algorithms D have been listed as examples of algorithms E, D, that when used in the above described split-key crypto system, fulfill this condition.

The method according to the invention uses a split-key cryptosystem with the above defined properties and may further comprise: a content source providing said at least one CDN1 with at least one encrypted content item $X_e$; a key generator associated with said content source comprising said cipher and split-key algorithm generating first split-key information and transmitting said first split-key information to said first CDN1, preferably to a first secure module associated with said CDN1; generating a partially decrypted content item on the basis of said encrypted content item $X_e$, said decryption algorithm D and said first split-key information; and, transmitting said partially decrypted content item to said content receiving entity.

The split-key cryptosystem according to the invention provides a secure content delivery system wherein content item X in a CDN domain is never fully decrypted. Moreover, encrypted content that is stored in a CDN cannot be fully decrypted with any decryption key or any other type of key that is in possession of the CDN. Each content receiving entity, which may be a CCU or for instance a further, preferably downstream CDN, may be provided with a uniquely encrypted version of the content, which may only be decrypted with one or more associated unique split decryption keys. Hence, in case information (a unique split decryption key and/or an associated partially decrypted content item) is leaked, the CPS (Content Providing System or Content Source) may easily trace this information back to the consumer it belongs to, and to the CDN that delivered it to that consumer. Furthermore, each time a content item is requested, a new and preferably unique pair of split decryption-keys is generated, upon a request being sent to the encryption module, so that the CPS controlling the encryption module comprising the encryption algorithm E may monitor the delivery of the content via a CDN to a large number of CCUs (content consumption units). The CDN may receive one split decryption key of the unique pair of split decryption keys, for partially decrypting the encrypted content item, and then transmit this partially decrypted content item to the content receiving entity. The content receiving entity may receive separately the other split decryption key for fully decrypting the partially decrypted content item.

In embodiments of the method, the encryption algorithm E may be comprised in an encryption module. Said encryption module may be associated with the content source, either through being incorporated in the content source, controlled by the content source, or co-operating, preferably in a trusted environment, with the content source. In further embodiments said encryption module further comprises said cipher algorithm, said secret information S and said split-key algorithm.

In an embodiment of the invention, said content source is a, preferably upstream, CDN.

A content consumption unit (CCU) is also referred to as a UE (User Equipment) and is a family member of the family of content receiving entities.

In one embodiment said at least one content receiving entity is a content consumption unit (CCU), wherein said method may comprise: receiving a request from a content consumption unit for delivery of a content item; said key generator generating second split-key information on the basis of said first split-key; transmitting said second split-key information to said content consumption unit; decrypting said partially decrypted content item into a plaintext content item on the basis of decryption algorithm D and said at least second split-key information.

In embodiments of the invention first, second, or further split-key information each comprises at least one different split decryption key $d_1, d_2, \ldots, d_k$. This enables entities receiving such split-key information to each and in consecutive order to perform a decryption operation using a decryption algorithm according to the invention, whereby if all k decryption operations are performed, the resulting content item is fully decrypted.

It is to be understood that the term fully decrypted is to be interpreted as that the effect of encrypting of a content item through an encryption algorithm E suitable for use in a split-cryptosystem of the invention, is nullified or undone.

In embodiments of the invention a content item X relates to an already encrypted content item using any suitable encryption algorithm and a content item $X_e$ relates to such an already encrypted content item, which is thereafter encrypted with an algorithm E suitable for use in a split-key cryptosystem according to the invention.

It is hereby understood that the term "content item" may be interchangeably used throughout this application with the term "content". Whenever content is separately identifiable, one may replace the term "content" equally well by the term "content item" throughout the application, for the purpose of this invention.

In another embodiment said content receiving entity is at least one second content delivery network (CDN2), preferably a downstream CDN, wherein said method may further comprise: sending a trigger signal for content ingestion to said second CDN, preferably said trigger signal comprising a content item identifier and, optionally, a key server identifier identifying a key server comprising said key generator; said second CDN2 sending a content ingestion request to said first CDN1.

In further embodiments, said trigger signal comprises a DRM flag indicating that DRM procedures apply to the delivery of the content item identified by the content item identifier.

During the delivery of the content to a CCU, the content provider (content source) is in full control of the split-key information. The content provider may follow the delivery of the content via the various key requests (i.e. requests for a split-decryption or split-encryption key) it receives from the CDNs. Moreover, in case of delivery via more than one CDN (e.g. a "CDN network" or in other words "a network of interconnected CDN's"), each CDN may be provided with its own split-key. This allows a content provider the possibility to ensure that the content is delivered through the correct path in the network thereby reducing the risk of fraud, and enabling the identification of a CDN that has inadvertently leaked encrypted content.

In an embodiment the method may comprise: receiving a content request from a content receiving unit, preferably a content consumption unit for delivery of a content item; said key generator generating at least second split-key information on the basis of said first split-key information; transmitting second split-key information to said second CDN2, preferably to a second secure module associated with said second CDN2; and, generating a further partially decrypted content item $X_{e,d1,d2}$ on the basis of said partially decrypted content item $X_{e,d1}$, said decryption algorithm D and said at least second split-key information.

In a further embodiment the method may comprise: generating third split-key information on the basis of said first and second split-key information; transmitting said third split-key information to said content consumption unit; transmitting said further partially decrypted content item $X_{e,d1,d2}$ to said content receiving unit, which is preferably a content consumption unit; said content receiving unit (content consumption unit) decrypting said further partially decrypted content item into a plaintext content item on the basis of decryption algorithm D and said at least third split-key information.

In further embodiments of the invention, the content item X may be a key for decrypting and/or encrypting content itself. In such embodiments of methods according to the invention a CDN may be used to deliver such keys in a secure manner. This is particularly advantageous when the keys are keys used in symmetric encryption/decryption schemes.

In yet a further embodiment said split-key algorithm may comprise a random split-key generating algorithm for generating first split-key information and a deterministic split-key generating algorithm for generating second split-key information on the basis of said first split-key information.

In an variant said first secure module comprises at least one split-key combiner and preconfigured split-key information or a random split-key generator, wherein said method may comprise: combining said first split-key information and said preconfigured split-key information or a random split-key generated by said random split-key generator into combined split-key information; and, generating a partially decrypted content item on the basis of said encrypted content item $X_e$, said decryption algorithm D and said combined split-key information.

In another variant said first secure module comprises at least a second split-key combiner and a random split-key generator, wherein said method may comprise: said key generator generating second split-key information on the basis of said first split-key information and transmitting second split-key information to said CDN1; said random split-key generator generating random split-key information; combining said second split-key information and said random split-key information into combined split-key information; and, said CDN1 transmitting said combined split-key information to said second CDN2.

In yet another variant said encrypted content item may comprise multiple segments, each segments being encrypted using encryption key e and wherein a manifest file comprises information about the locations and names of the locations where said encrypted segments can be retrieved.

In a further variant first split-key information may be associated with said multiple segments and wherein said first split-key information is inserted in said manifest file, which is sent to said first CDN1 and in yet a further variant said algorithms E,D may be based one of the one-time path, LFSR stream cipher, RSA, ElGamal or Damgard-Jurik cryptosystems.

In a further aspect, the invention may relate to a method for secure delivery of key information from at least first secure module associated with a first content distribution network CDN1 to at least a second secure module in a content receiving entity using a split-key cryptosystem comprising encryption and decryption algorithms E and D, a cipher algorithm for generating encryption and decryption keys e,d on the basis of secret information S and a split-key algorithm using secret information S for splitting e and/or d into i different split-encryption keys and/or k different split-decryption keys $d_1$, $d_2, \ldots, d_k$ respectively, such that $D_{dk}(D_{dk-1}( \ldots (D_{d2}(D_{d1} (E_{ei}(E_{ei-1}( \ldots (E_{e2}(E_{e1}(X)) \ldots ))=D_{dk}(D_{dk-1}( \ldots (D_{d2}(D_{d1} (X_{e1, e2, \ldots, ei}))=X$ wherein i, k≥1 and i+k>2, wherein the method may comprise: providing first secure module with first key information comprising encrypted key $E_e(K)$, wherein K is a key for encrypting content processed by said CDN; a key generator comprising said cipher and split-key algorithm generating at least a first split-key information and transmitting said first split-key information to said first secure module; said first secure module generating second key information comprising a partially decrypted encrypted key $D_{d1} (E_e(k))$; and, transmitting second key information to said second secure module in said content receiving entity.

In yet another aspect, the invention may relate to a method for secure delivery of a content item via at least a first and second content distribution network (CDN1, CDN2) to at least one content receiving entity using a split-key cryptosystem comprising encryption and decryption algorithms E and D, a cipher algorithm for generating encryption and decryption keys e, d on the basis of secret information S and a split-key algorithm using secret information S for splitting e into i different split-encryption keys $e_1, e_2, \ldots, e_i$ and/or for splitting d into k different split-decryption keys $d_1, d_2, \ldots, d_k$ respectively, such that $D_{dk}(D_{dk-1}( \ldots (D_{d2}(D_{d1}(E_{ei} (E_{ei-1}( \ldots (E_{e2}(E_{e1}(X)) \ldots ))=D_{dk}(D_{dk-1}( \ldots (D_{d2}(D_{d1} (X_{e1, e2, \ldots, ei}))=X$ wherein i, k≥1 and i+k>2, wherein the method may comprise: providing said first CDN1 with at least one encrypted content item $X_e$ or a partially decrypted content item; said first CDN1 transmitting said at least one encrypted content item or a partially decrypted content item to said second CDN2; a key generator comprising said cipher and split-key algorithm generating split-key information associated with said at least one encrypted content item $X_e$ or a partially decrypted content; transmitting a split-decryption control message comprising said split-key information to said first CDN1; said first CDN1 relaying said split-decryption control message to said second CDN2; generating partially decrypted content item $X_{e,d1}$ or further partially decrypted content item by applying a decryption operation on said encrypted content item $X_e$ or said partially decrypted content item using said decryption algorithm D and said split-key information; and, transmitting said partially decrypted content item $X_{e,d1}$ or further partial decrypted content item to said content receiving entity.

In an aspect the invention may relate to a system for secure delivery of a content item X to a content consumption unit comprising: an encryption module associated with a content source, said encryption module comprising encryption algorithm E for generating an encrypted content item $X_e$; a first decryption module comprising decryption algorithm D associated with a first content distribution network (CDN1); a second decryption module comprising decryption algorithm D associated with at least one content consumption unit; a key generator associated with said encryption module comprising a cipher and split-key algorithm for generating encryption and decryption keys e, d on the basis of secret information S and a split-key algorithm using secret information S for splitting e into i different split-encryption keys $e_1, e_2, \ldots, e_i$ and/or for splitting d into k different split-decryption keys $d_1, d_2, \ldots, d_k$ respectively; wherein said algorithms D, E and cipher and said split-key algorithms are selected such that $D_{dk}(D_{dk-1}( \ldots (D_{d2}(D_{d1}(E_{ei}(E_{ei-1}( \ldots (E_{e2}(E_{e1} (X)) \ldots ))=D_{dk}(D_{dk1}( \ldots (D_{d2}(D_{d1}(X_{e1, e2, \ldots, ei}))=X$ wherein i, k≥1 and i+k>2.

It is to be understood that for the purpose of this invention the terms "secure module" and "decryption module" are used interchangeably, both relating to the same functional entity associated with a content receiving unit, preferably a CDN or a CCU.

In embodiments of methods and systems according to the invention, the key generator (software and/or hardware embodied) may be part of, or comprised in the encryption module. In other embodiments, the key generator may implemented in a separate key server.

In yet another aspect, the invention may relate to a key server comprising a key generator for use in a content distribution system as described above, said key generator comprising a cipher generator for generating a decryption key d and encryption key e on the basis of secret information S and a split-key generator comprising a random generator for generating one or more random split-keys on the basis of said secret information S and a processor comprising a deterministic split-key algorithm for determining a split-key on the basis of said one or more random split-keys and said encryption key e or decryption key d, said key generator being configured to generate encryption keys for said content source and split-key information for said CDN and said content consumption unit.

In one embodiment said encryption and decryption algorithms D, E and said cipher algorithm are based on the ElGamal algorithm and wherein said split-key algorithm for generating k split-keys may be defined as:
said random generator is configured to select k−1 random integers $d_1 \ldots d_{k-1}$ smaller than p; (define n prime number generated by EL algorithm)
compute final integer as $d_k = d-(d_1 + \ldots +d_{k-1})$ (mod p).
or, wherein said encryption and decryption algorithms D,E are based the Damgård-Jurik algorithms and wherein said split-key algorithm for generating k split-keys is defined as:
determine n−1 random integers $d1, \ldots, d_{n-1}$ smaller than n (define p prime number generated by EL algorithm)
compute $d_k = d-(d_1 + \ldots +d_{n-1})$ (mod n).

In a further aspect, the invention relates to a content distribution network (CDN) controller for use in a system as described above, said CDN controller comprising a request routing function for sending a request for split-key information to said key generator in response to a content request of a content consumption unit or of a further CDN, said split-key information being used by a decryption module in order to generate partially decrypted content before sending it to the requesting content consumption unit or said further CDN.

The invention also relates to a computer program product comprising software code portions configured for, when run in the memory of computer executing at least one of the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 29 depicts a secure key database associated with a CDN decryption module according to one embodiment of the invention.

FIG. 30-32 depict so-called manifest files defining the relation between associated segments in a content group according various embodiments of the invention.

DETAILED DESCRIPTION

Figure 1:
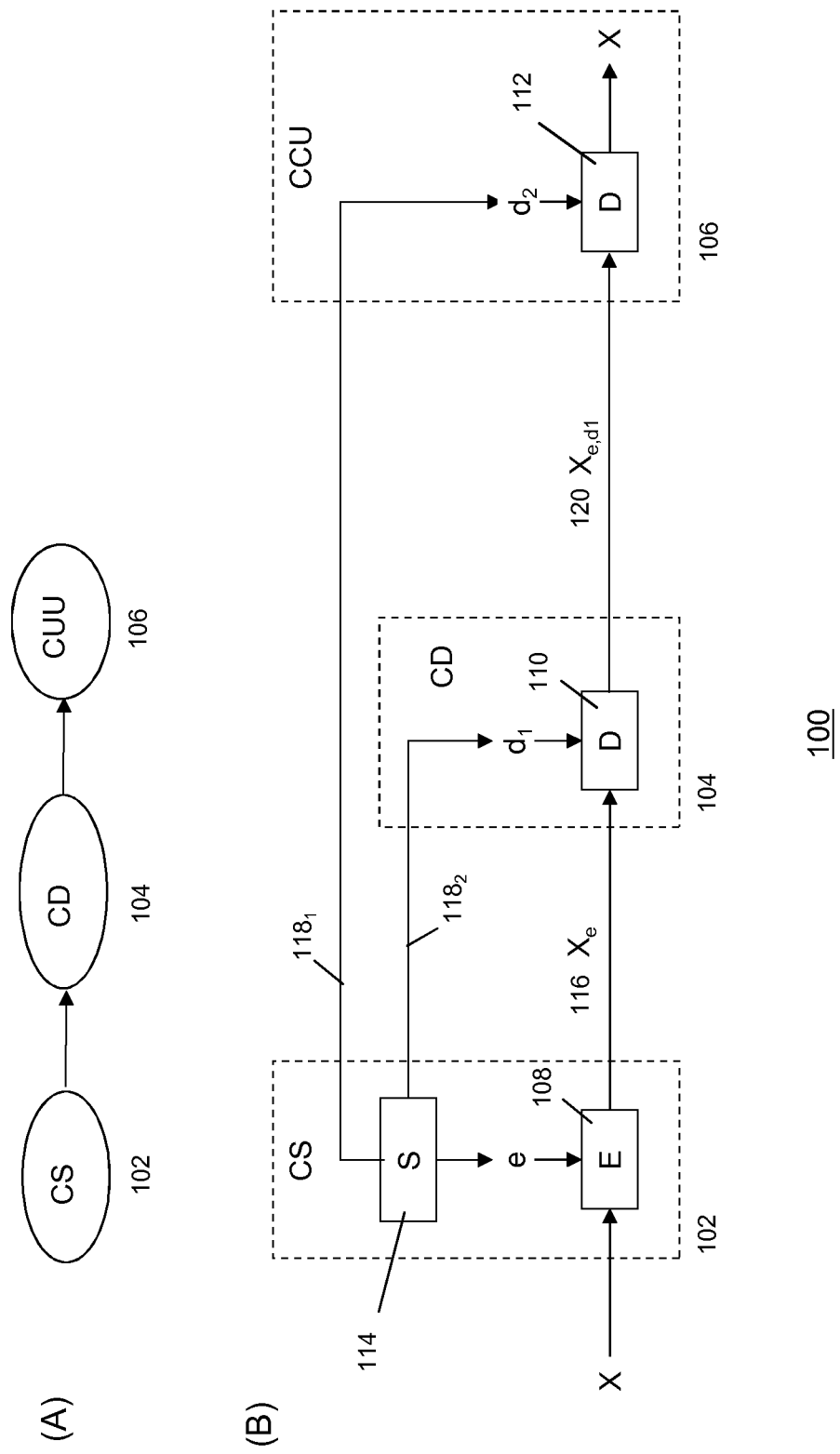
FIGS. 1 (A) and (B) depict a split-key cryptosystem for secure distribution of content according to an embodiment of the invention.

FIG. 1 (A) depicts a high-level schematic of a content distribution system. The system may generally comprise a content source (CS) 102 and a content distributor (CD) 104 for distributing content to one or more content consumption units (CCU) 106.

The content distributor may relate to a content distribution platform or a chain of different content distribution platforms configured to distribute content from the content source to the content consumption units. A content distribution platform may use electronic means for delivering content e.g. one or more content delivery networks (CDNs) or it may use physical means for delivering content, e.g. s recording-medium such as a magnetic recoding medium, an optical recoding medium using e.g. DVD and Blu-Ray technology or an optomagnetic recording medium For the purpose of this application the terms content distributor (CD) and Content Distribution Network (CDN) are interchangeably used, wherever more appropriate. The term content distributor relates more to a specific role a certain entity may fulfill, whereas the term CDN rather defines a type of network or (functional) network architecture, which may be deployed for fulfilling such role.

For the purpose of this application the term content source, also referred to as the content originator, may relate to a content provider system (CPS), a content preparation system or another CDN, preferably another upstream CDN (uCDN). A CPS may be configured to offer and/or deliver content items, e.g. video, pictures, software, data and/or text in the form of files and/or streams to customers or another content distributor. A consumer may purchase and receive the content items using a content consumption unit (CCU), comprising a software client for interfacing with the CDN and the CPS.

It is hereby understood that the term "content item" may be interchangeably used throughout this application with the term "content". Whenever content is separately identifiable, one may replace the term "content" equally well by the term "content item" throughout the application.

A CCU may generally relate to a device configured to process file-based and/or (live) streaming content. Such devices may include a (mobile) content play-out device such as an electronic tablet, a smart-phone, a notebook, a media player, a player for play-out of a recording medium such as a DVD of a Blu-Ray player. In some embodiments, a CCU may be a set-top box or a content recording and storage device configured for processing and temporarily storing content for future consumption by a further content consumption unit.

In the content delivery system described with reference to FIG. 1, the CCU may contact the CS for delivery of a content item. As the CS has delegated the delivery of the content to one or several content distributors, the risk of unauthorized access is increased. The content therefore requires protection by a content protection system (also referred to as a DRM system). Such content protection system may comprise a cryptosystem which comprise one or more encryption algorithms for encrypting content items, one or more decryption algorithms for decrypting encrypted content items and key generating algorithms for generating secret and/or public keys which maybe used by the encryption and decryption algorithms.

The content protection system may be implemented such that when content delivery is initiated by e.g. a consumer purchasing a content item, encrypted content (which may be referred to as a type of DRM protected content) is delivered to the CCU of the consumer. Access to the encrypted content is granted by a decryption key, which allows full decryption of the encrypted content at the CCU.

As will be described hereunder in more detail, the content protection system according to the present invention allows a content originator to be in full control of the secure delivery of the content even though the actual delivery of the content is outsourced to one or more content distributors. In order to achieve this, the content protection system uses a so-called split-key cryptosystem. The details and advantages of such content protection system are described hereunder in more detail with reference to the appending figures.

FIG. 1 (B) depicts a split-key cryptosystem for distributing content from a content source CS 102 via at least one content distributor CD 104 to a content consumption unit CCU 106 according to an embodiment of the invention. In this embodiment, the content source may relate to a CPS, which is associated with an encryption algorithm E 108 and secret key generator 114 for generating keys on the basis of secret information S. Content distributor and CCU may each be associated with a decryption algorithm D 110,112.

The split-key cryptosystem may be configured to provide secure delivery of a content item X to the CCU on the basis of the encryption and decryption algorithms E and D and the keys generated by the secret key generator. To that end, encryption algorithm E may use an encryption key e to encrypt content item X into encrypted content item $X_e = E_e(X)$ 116 wherein encryption key e is generated by secret key generator 114 (here $X_e$ is a short notation of $E_e(X)$, i.e. the application of encryption algorithm E to content item X using encryption key e). The thus encrypted content item may be sent as an encrypted file or stream to the content distributor. Alternatively, the encrypted content may be recorded on a storage medium, e.g. an optical or magnetic storage medium, which may be delivered to the user of the CCU.

The secret key generator 114 may further generate a decryption key d (not shown), which is used by the generator to determine split-decryption key pair $d_1$ and $d_2$ 118$_1$,118$_2$. These split-keys are necessary to fully decrypt the encrypted content item $X_e$. To that end, split-decryption key $d_2$ 118$_2$ may be distributed by the CS secret key generator to the CCU. Then, if a CCU requests delivery of content item X, the CS may send the first split-decryption key $d_1$ 118$_1$ to the content distributor which may use split-decryption key $d_1$ and decryption algorithm D to "partially" decrypt encrypted content item into $X_{e,d1}$. The thus "partially" decrypted content item $X_{e,d1}$ 120 may then be sent to the CCU, which may fully decrypt content item X on the basis of split-decryption key $d_2$ and decryption algorithm D such that $D_{d2}(D_{d1}(E_e(X))) = D_{d2}(D_{d1}(X_e)) = D_{d2}(X_{e,d1}) = X$ wherein $X_{e,d1}$ is a short notation of a decryption operation on encrypted content item $X_e$ using decryption algorithm D and split-decryption key $d_1$. Note that the word "partially" (or "partly") in this document refers to the process of encryption/decryption and not to the content. Hence (a) partially decrypted (piece of) content (or content item) relates for the purpose of this invention to a piece of content (or content item) originally encrypted on the basis of an encryption algorithm E, suitable for use in a split-key cryptosystem according to the invention, on which at least one decryption operation has been performed using a split decryption key and a decryption algorithm D suitable for use in a split-key cryptosystem according to the claimed invention. Partially decrypted content $X_{e,d1}$ is cipher text and as such as secure to unauthorized access as fully encrypted content $X_e$.

The split-key cryptosystem for use in a method according to the invention, requires that the combined knowledge of $E_e(X)$ and $d_1$ does not leak information about X. Furthermore, in some embodiments, it may also be required that the combined knowledge of $E_e(X)$ and $d_2$ does not leak information about X. Moreover—particular in the context of CDNs—it is also desired that the split-key cryptosystem allows the generation of many different split-key pairs $d_1$, $d_2$ on the basis of one encryption key e (so that each content consumer may obtain a different (personalized) set of keys for fully decrypting the encrypted content) and that the combined knowledge of $E_e(X)$ with the many different split decryption key $d_1$ does not leak information about X and (in some embodiments) the combined knowledge of $E_e(X)$ with the many different split decryption key $d_2$ does not leak information about X.

The split-crypto system depicted in FIG. 1(B) is just one non-limiting example of several groups of split-key cryptosystems, wherein each split-key cryptosystem is defined by at least a pair of encryption and decryption algorithms E, D, a cipher algorithm for generating encryption and decryption keys e, d on the basis of secret information S and a split-key algorithm using secret information S for splitting e into multiple split-encryption and/or for splitting d into multiple split-decryption keys respectively.

It is to be noted that split-keys, independent whether these are split-encryption or split-decryption keys, when applied in DRM procedures for content delivery, may also be called DRM keys. It is then further understood that the whole family of DRM keys is larger then just split-decryption or encryption-keys as being generated in a split-key crypto system as claimed. In embodiments of the invention a DRM instruction identifier is transmitted from a content source to a CDN or between CDN's such as from an upstream CDN to a downstream CDN. The DRM instruction identifier may be associated with a content item identifier. The DRM instruction identifier may be part of split-key information, or it may be transmitted together with or separate from split-key information. The DRM instruction identifier may instruct a CDN which specific DRM procedures apply to the delivery of a content item. The DRM instruction identifier may for instance indicate if and/or which split-key crypto system applies to a content item. The CDN may then apply the correct decryption algorithm D to the particular content item. Alternatively the DRM instruction identifier provides the CDN with a direct pointer to the applicable decryption algorithm D.

One group of split-key cryptosystems may be defined by crypto-algorithms E and D, a cipher algorithm for generating encryption and decryption keys e,d on the basis of secret information S and a split-key algorithm using secret information S for multiple splitting of decryption key d into an arbitrary number of k split-decryption keys $d_1, d_2, \ldots, d_k$ (k≥2) such that $D_{dk}(D_{dk-1}(\ldots(D_{d2}(D_{d1}(E_e(X)))\ldots))$ $D_{dk}(D_{dk-1}(\ldots(D_{d2}(X_{e,d1}))\ldots))=X$. Here $X_{e, d1, d2, \ldots, dk}$ is a short notation of a predetermined sequence of decryption operations on encrypted content item $X_e$ using decryption algorithm D and split-decryption keys $d_1, d_2, \ldots, d_k$, respectively.

Another group of split-key cryptosystems may be defined by crypto-algorithms E and D, a cipher algorithm for generating encryption and decryption keys e,d on the basis of secret information S and a split-key algorithm using secret information S for multiple splitting of e into an arbitrary number of i split-encryption keys $e_1, e_2, \ldots, e_i$ (i≥2) such that $D_d(E_{ei}(E_{ei-1}\ldots(E_{e2}(E_{e1}(X)))\ldots))=D_d(X_{e1,e2,\ldots,ei})X$. Here $X_{e1, e2, \ldots, ei}$ is a short notation of a predetermined sequence of encryption on plaintext content item X using encryption algorithm E and split-encryption keys $e_1, e_2, \ldots, e_i$, respectively.

Yet another group of split-key cryptosystems may be defined by crypto-algorithms E and D, a cipher algorithm for generating encryption and decryption keys e,d on the basis of secret information S and a split-key algorithm using secret information S for multiple splitting of both e and d into an arbitrary number of i split-encryption keys and k split-decryption keys $d_1, d_2, \ldots, d_k$ (i, k≥1 and i+k≥2) such that $D_{dk}(D_{dk-1}(\ldots(D_{d2}(D_{d1}(E_{ei}(E_{ei-1}(\ldots(E_{e2}(E_{e1}(X))\ldots))))=D_{dk}(D_{dk-1}(\ldots(D_{d2}(D_{d1}(X_{e1,e2,\ldots,ei}))=X$.

In some embodiments E and D may be different algorithms. In other embodiments, the encryption and decryption algorithms E and D may be identical, i.e. E=D, which allows multiple splitting of both e and d into an arbitrary number i split-encryption keys $e_1, e_2, \ldots, e_i$ and k split-decryption keys $d_k, d_{k-1}, \ldots, d_1$, such that $D_{dk}(D_{dk-1}(\ldots(D_{d2}(D_{d1}(E_{ei}(E_{ei-1}(\ldots(E_{e2}(E_{e1}(X))\ldots))))=E_{dk}(E_{dk-1}(\ldots(E_{d2}(E_{d1}(E_{ei}(E_{ei-1}(\ldots(E_{e2}(E_{e1}(X))\ldots))))=X_{e1,e2,\ldots,ei,d1,d2,\ldots dk}=X$.

In such split-key cryptosystem, there is no functional distinction between encryption keys e and decryption keys d. In some embodiments, the encryption and/or decryption algorithms may be communicative, i.e. they may be applied in any order always giving the same result. Such commutative property may be useful when split-keys are used in a different order as they are generated, or when they are used in an order that is unknown at the time of the generation of the split-keys. Examples of the above-mentioned split-key cryptosystems will be described hereunder in more detail.

It is to be understood that the above mathematical equations identified in the various embodiments all relate to conditions and therefore properties of couples of encryption/decryption (E, D) algorithms suitable for, in combination with split-key algorithms, use in split-key cryptosystems implemented in embodiments of the invention.

Figure 2:
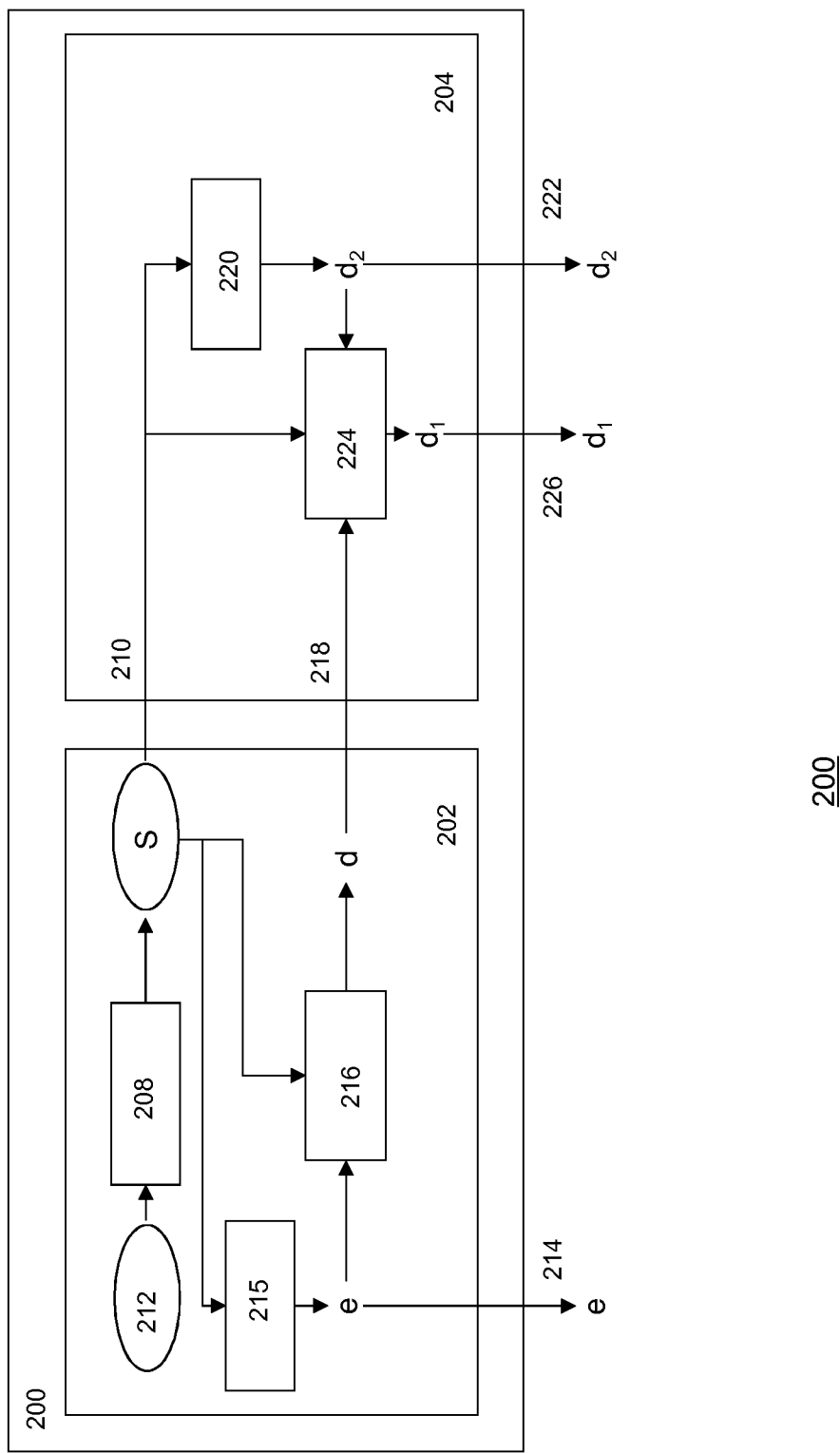
FIG. 2 depicts a schematic of a secret key generator according to one embodiment of the invention.

FIG. 2 depicts a schematic of a secret key generator 200 according to one embodiment of the invention. The secret key generator may comprise a cipher generator 202 for generating an encryption/decryption key pair e,d associated cipher algorithms. In one embodiment, such cipher algorithms may comprise a predetermined (pseudo) random cipher algorithm 215, a predetermined deterministic cipher algorithm 216 and a split-key generator 204 for generating split-keys on the basis of at least one of the encryption or decryption keys e,d and predetermined random and deterministic split-key algorithms 220,206. The cipher generator and split-key generator may be configured to generate the keys required for a predetermined split-key cryptosystem, which will be described hereunder in more detail.

In the example of FIG. 2 the cipher generator may comprise a random generator 208 configured to generate random secret information S 210 on the basis of some configuration parameters 212, e.g. the length of encryption key(s), the length of decryption keys, the length of to-be-generated random numbers. Secret information S may be used for generating a random encryption key e 214 on the basis of a random key generator 215. A deterministic cipher algorithm 216 may use random encryption key e to generate decryption key d 218. In some embodiments, secret information S may be used to generate a random decryption key d, which may be used by a deterministic cipher algorithm to generate encryption key e.

Secret information S and decryption key d may be used by split-key generator 202 to generate split-keys, e.g. split-encryption keys and/or split-decryption keys. To that end, secret information S may be input to a random split-key generator 220 in order to generate a random split-decryption key $d_2$ 222. A deterministic split-key cipher algorithm 224 may generate a further split-decryption key $d_1$ 226 on the basis of d and $d_2$.

In another embodiment, the split-key generator may be configured to generate on the basis of secret information S and d, k split decryption keys $d_1, d_2, \ldots, d_k$ (k≥2). In a further embodiment, split-key generator may be configured to receive secret information S and encryption key e in order to generate i split encryption keys $e_1, e_2, \ldots, e_i$ (i≥2). In yet a further embodiment split-key generator may be configured to generate i split encryption keys $e_1, e_2, \ldots, e_i$ and k split decryption keys $d_1, d_2, \ldots d_k$ (i, k≥1 and i+k≥2) on the basis of secret information S and encryption/decryption key pair e, d.

As described above, encryption/decryption algorithm pairs D,E may be associated with a split-key algorithm for generating split-encryption and/or split-decryption keys. Hereunder a number of such split-key cryptosystems are described.

In a first embodiment, a split-key cryptosystem may be based on the symmetrical encryption algorithm known as the "one-time pad". In this embodiment, an encryption key e may be generated in the form of a long random binary number generated using a random generator. Encryption algorithm E may be a binary function for encrypting content item X into an encrypted content item $X_e$ by applying an exclusive-or (XOR, $\oplus$) operation to X using e:

$$e = RAN\_1$$

$$X_e = E_{PT}(X) = X \oplus e$$

A first split-decryption key $d_1$ and second split-decryption key $d_2$ may be formed on the basis of e. For example, second split-decryption key $d_2$ may be a random binary number having the same length as e and first split-decryption key $d_1$ may be generated by executing a bitwise exclusive-or operation between $d_1$ and e:

$$d_2 = RAN\_2$$

$$d_1 = d_2 \oplus e$$

A first decryption operation may "partially" decrypt encrypted content item $X_e$ into $X_{e,d1}$ by executing a bitwise exclusive-or operation on $X_e$ and $d_1$. A second decryption operation may fully decrypt partially decrypted content item $X_{e,d1}$ into content item X by executing an exclusive-or operation on the basis of $X_{e,d1}$ and $d_2$:

$$X_{e,d1} = D_{d1}(X_e) = E_e(X) \oplus d_1$$

$$X_{e,d1,d2} = D_{d2}(X_{e,d1}) = D_{d1}(X_e) \oplus d_2 = X$$

If the binary values e, $d_1$ and $d_2$ are shorter than content item X, each of them may be concatenated with itself several times, and then truncated to the length of content item X. However, such concatenation would reduce the security of the system.

The above described double split-key "one-time pad" cryptosystem may be easily generalized to a split-key cryptosystem with k split-decryption keys and/or i split-encryption keys. For example, instead of choosing long binary streams $d_1$ and $d_2$ such that $d_1 \oplus d_2 = e$, k−1 random binary streams $d_1 \ldots d_{k-1}$ may be generated and the final random binary stream may be determined using $d_k = d_1 \oplus \ldots \oplus d_{k-1} \oplus e$.

In a similar way a split-key cryptosystem with i split-encryption keys and k split-decryption keys may be generated. In this embodiment encryption and decryption algorithms D,E are identical, i.e. both are performed as an exclusive-or operation. Further, the encryption and decryption algorithms are commutative, so the split-keys may be generated in any desired order and the encryption and decryption operations may be performed in any desired order.

Figure 3:
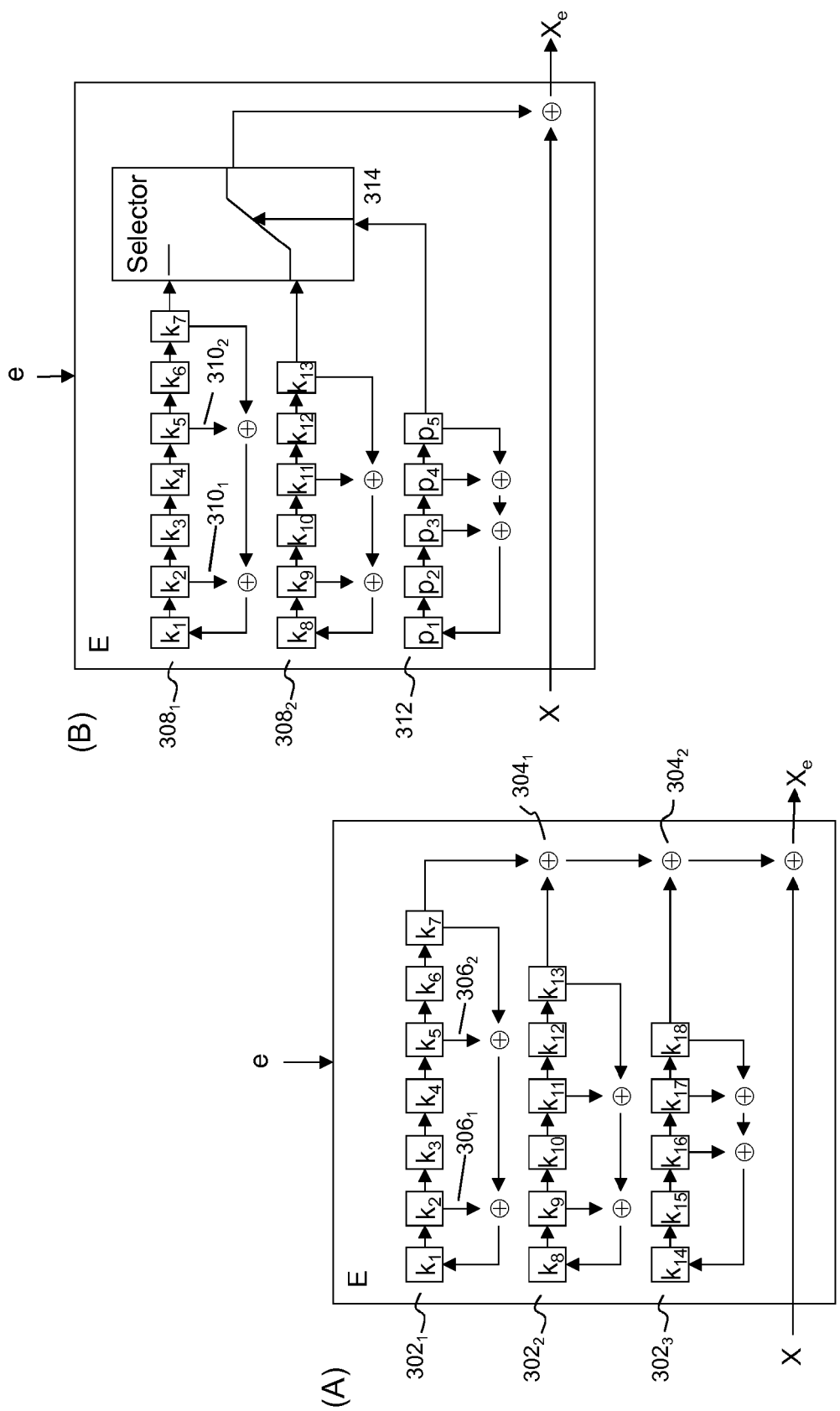
FIGS. 3(A) and (B) depict stream ciphers for use in a split-key cryptosystem according to various embodiments of the invention.

In second embodiment, a split-key cryptosystem may be based on a symmetric stream cipher. FIGS. 3(A) and (B) depict stream ciphers for use in a split-key cryptosystem according to various embodiments of the invention.

In particular, FIG. 3(A) depicts a linear stream cipher as an encryption algorithm E providing bitwise encryption of content item X into $X_e$ on the basis of encryption key e. The linear stream cipher may use one or more multiple linear feedback shift registers (LFSR) $302_1$-$302_3$, which may be combined by one or more XOR functions $304_1$,$304_2$. An LFSR may comprise one or more preconfigured taps $306_1$,$306_2$. A key k may form the start state of the (in this example three) LFSRs $\{k_1, k_2, k_3, \ldots, k_m\}$ and the linear stream cipher is linear for used keys k.

In this split-key cryptosystem encryption key e and first split-decryption key may be generated as a set of random bits $\{e_1, e_2, e_3, \ldots, e_m\}$ and $\{d1_1, d1_2, d1_3, \ldots, d1_m\}$ respectively and split-decryption key $d_2$ may be calculated as a bitwise XOR of e and $d_1$, i.e. $d_2 = e \oplus d_1$.

FIG. 3(B) depicts a non-linear stream cipher using one or more multiple linear feedback shift registers (LFSR) $308_1$, $308_2$ (optionally comprising one or more preconfigured taps $310_1$,$310_2$) which may be combined using a partial non-linear "combination generator". Two or more LFSRs $308_1$,$308_2$ may be configured to generate pseudo-random bit streams, where a key k may form the start state of the LFSRs $\{k_1, k_2, k_3, \ldots, k_m\}$. One or more further LFSRs 312 may be configured as a non-linear "combination generator" 314 (selector).

In this particular embodiment, the output of a further LFSR is used to select which bit of the other two LFSRs is taken as the output 316 of the selector. The bits p $\{p_1, p_2, p_3, \ldots, p_n\}$ defining the start state of the further LFSR may be pre-configured. As the stream cipher is linear in k, the decryption key may be calculated as a bitwise XOR of e and $d_1$, i.e. $d_2 = e \oplus d_1$. Also other partial non-linear functions may be used as a combination generator.

Stream ciphers form easy implementable symmetrical ciphers requiring keys of much shorter lengths when compared to the one-time path algorithm. The non-linear part of a partial non-linear combination generator makes the cipher more secure against certain types of attacks.

In a third embodiment, a split-key cryptosystem may be based on the asymmetrical encryption algorithm known as the RSA encryption scheme. In that case, an encryption/decryption key pair e,d using the following cipher algorithms:
  Randomly select two distinct prime numbers p and q of similar bit-length;
  Compute n=p*q;
  Compute $\phi(n) = (p-1)*(q-1)$ wherein $\phi$ is Euler's so-called totient function;
  Randomly select an integer e such that $1 < e < \phi(n)$ and gcd $(e, \phi(n)) = 1$ (i.e., e and $\phi(n)$ are coprime);
  Determine d by calculating the multiplicative inverse of e (mod $\phi(n)$), i.e.: $d = e^{-1}$ (mod $\phi(n)$).

The parameters p, q, $\phi(n)$, e, d and n may be stored as secret information for further use if necessary. In particular, the value n needs to be shared with the content distributor and the CCU, as these entities require n to perform their encryption and decryption operations. The value n may be transferred to the content distributor and the CCU in protocol messages associated with a content transaction. In one embodiment, when multiple transactions use the same secret information, n needs to be communicated only once.

A content item X may be processed on the basis of an agreed-upon reversible protocol known as a padding scheme, which turns X into an integer x wherein 0<x<n. If the process determines that X is too long, it may divide X in blocks that each satisfies the length requirement. Each block is thereafter separately processed in accordance with the padding scheme.

The RSA encryption algorithm E for encrypting X into $X_e$ may be calculated as follows:

$$X_e = E_e(X) = x^e \pmod{n}.$$

A split-key algorithm for determining a pair of split-decryption keys $d_1$,$d_2$ may comprise the steps of:
  selecting an integer $d_2$ randomly such that $1 < d_1 < \phi(n)$ and wherein $d_1$ and $\phi(n)$ are coprime;
  determining $d_2 = d_1^{-1} * d \pmod{\phi(n)}$.

A first decryption operation based on decryption algorithm D and split-encryption key $d_1$ may generate a "partially" decrypted content item by calculating $X_{e,d1} = D_{d1}(X_e) = (X_e^{d1})$ (mod n) (Read: $X_e$ to the power $d_1$ followed by a modulo n operation). A second decryption operation based on decryption algorithm D and split-encryption key $d_2$ may generate $X_{e,d1,d2} = D_{d2}(X_{e,d1}) = (X_{e,d1}^{d2})$ (mod n). The original plaintext content item X may be derived from $X_{e,d1,d2}$ by applying the padding scheme in reverse.

Since the RSA encryption and decryption algorithms E and D are identical, the split-key algorithm for determining a pair of split-encryption keys $e_1, e_2$ may be determined on the basis of the same algorithm for determining the split-decryption keys.

The above double split-key RSA cryptosystem may be generalized to a multiple split-key cryptosystem with k keys. To that end, instead of selecting $d_1$ and $d_2$ such that $d_1*d_2=d$ (mod $\phi n$)), k−1 random (preferably different) integers $d_1, \ldots, d_{k-1}$ which are coprime with $\phi(n)$ are determined and the final integer is computed as $d_k=(d_1* \ldots *d_{k-1})^{-1}*d$ (mod $\phi(n)$). RSA encryption and decryption algorithms E,D are commutative, so the keys may be generated in any desired order and the encryption and decryption operations may be performed in any desired order.

In fourth embodiment, a split-key cryptosystem may be formed on the basis of the asymmetrical encryption algorithm known as the ElGamal (EG) encryption scheme. The EG scheme is based on the discrete logarithm problem rather than the factoring problem of RSA. In that case, encryption/decryption key pair e, d may be determined on the basis of the cipher algorithms:

Select a large prime number p and a generator g that generates the multiplicative group $\{0, 1, \ldots, p-1\}$ mod p;
Determine d by selecting a random number: $d \in \{1, \ldots, p-2\}$;
Compute $h=(g^d)$ (mod p);
Determine public key $e=(p,g,h)$.

Note that e is called "public" because it could be published without leaking secret information. In one embodiment, e would be published to enable third parties (e.g. users that generate and upload user-generated content) to encrypt content for the system, while the content provider (CS, CPS) remains in fully control over the (partial) decryption steps. However, when there is no need to publish e, it is kept private.

Decryption key d and (public) encryption key $e=(p, g, h)$—wherein p, g, h are integers—may be stored as secret information for future use if necessary. In particular, the value p needs to be shared with the content distributor and the CCU, as these entities require p to perform their encryption and decryption operations. The value of p may be included in protocol messages exchanged during a content transaction between a content provider and a CCU. In one embodiment, multiple transactions may use the same secret information. In that case, p would need to be communicated to the content distributor and a CCU only once.

A content item X may be processed on the basis of an agreed-upon reversible protocol known as a padding scheme, which turns X into an integer x wherein $0<x<p$. If the process determines that X is too long, it may divide X in blocks that each satisfies the length requirement. Each block is thereafter separately processed in accordance with the padding scheme.

Encryption algorithm $E_e(X)$ for encrypting content item X into $X_e$ may comprise the steps of:
select a random number $s \in \{1, \ldots, p-2\}$;
determining $X_e=E_e(X,s)=(Y_1,Y_2)=((g^s) \pmod{p}, (X* h^s) \pmod{p})$ Similarly, a decryption operation $D_d(Y_1, Y_2)$ for decrypting an encrypted content item $X_e$ may be computed as:
$D_d(Y_1,Y_2)=(Y_1^{-d}*Y_2)$ (mod p) (which indeed equals $(g^{-ds}*h^s*X)$ (mod p)=X)

A split-key EG algorithm for determining a pair of split-decryption key $d_1, d_2$ may comprise the steps of:
determining $d_1$ to be a random number $d_1 \in \{1, \ldots, p-2\}$;
compute $d_2=(d-d_1)$ mod p.

The above-described double split-key EG cryptosystem may be generalized to a multiple split-key cryptosystem using k split-encryption keys. To that end, instead of choosing $d_1$ and $d_2$ such that $d_1+d_2=d$ mod p, k−1 random integers $d_1 \ldots d_{k-1}$ smaller than p may be selected and the final integer may be computed as $d_k=d-(d_1+ \ldots +d_{k-1})$ (mod p).

A split-key EG algorithm for splitting the random encryption parameter s into l parts may be defined as follows:
The first party selects a random number $s \in \{1, \ldots, p-2\}$;
The first party chooses l random numbers $s_i \in \{1, \ldots, p-2\}$, $1 \le i \le l$, such that $s=(s_1+s_2+ \ldots +s_l)$ mod p and sends $s_i$ to party i;
Let $Y_1=(h^{s1}*X)$ mod p.
For i=1 to l−1 do
Party i sends $(g^s$ mod $p, Y_i)$ to party i+1;
Party i+1 performs its encryption step:
$Y_{i+1}:=(h^{s1}*Y_i)$ mod p.

It may be easily verified that $(g^s$ mod $p, Y_l)=E_e(X, s)$, because $s=(s_1+s_2+ \ldots +s_l)$ mod p. The different encryption steps are commutative.

A first decryption operation on the basis of decryption algorithm D and $d_1$ may be used to "partially" decrypt encrypted content $X_e$ into $X_{e,d1}$ by calculating $D_{d1}(X_e)=D_{d1}(Y_1,Y_2)=(Y_1,Y_1^{-d1}*Y_2 \pmod p)$. Partially decrypted content $X_{e,d1}$ is represented by a pair with the same first element Y. Since $Y_1$ is part of the encryption, it may be included in the protocol messages.

A second decryption operation on the basis of decryption algorithm D and $d_2$ may be used to determine the fully decrypted content by calculating $X_{e,d1,d2}=D_{d2}(X_{e,d1})$ wherein the second element of $X_{e,d1,d2}$ will equal x: $X_{e,d1,d2}=D_{d2}(X_{e,d1})$ $D_{d2}(D_{d1}(Y_1,Y_2))=(Y_1,Y_1^{-d2}*Y_1^{-d1}*Y_2)$ (mod p))=$(Y_1, (Y_1^{-d}*Y_2)$ (mod p))=$(Y_1, X)$. Original content item X may be determined from the calculated $X_{e,d1,d2}$ by applying the padding scheme in reverse.

The EG decryption algorithm D is commutative, so the decryption keys can be generated in any desired order and the decryption operations may be performed in any desired order. Similarly, the encryption algorithm is also communicative, so encryption keys may be generated in any desired order and the encryption operations may be performed in any particular order.

It is noted that the above-described RSA and EG split-key cryptosystems are multiplicative homomorphic, exhibiting the property $D(E(Z_1) \cdot E(Z_2))=(Z_1 \cdot Z_2) \pmod p$. In the context of signal processing an additive homomorphic scheme may have advantageous properties e.g. it allows the addition of a watermark to an encrypted signal. An additive homomorphic cryptosystem exhibits the property $D(E(Z_1) \cdot E(Z_2))=(Z_1+Z_2)$ (mod p).

In a fifth embodiment, a split-key cryptosystem may be based on an additive homomorphic cryptosystem known as the Damgård-Jurik (DJ) cryptosystem. The encryption/decryption pair e,d for the DJ cryptosystem may be generated using the following cipher algorithms:

Select two large prime numbers p' and q' such that $p=2p'+1$ and $q=2q'+1$ are prime too and wherein $n=p*q$ is defined as the modulus of the system;
Select a generator g that generates all squares of the multiplicative group $\{1, \ldots, n-1\}$ mod n. The group of all squares will have size $\tau=p'*q'$;
Select d as a random value $d \in \{1, \ldots, \tau-1\}$ and compute $h=g^d$ mod n;
Determine the (public) encryption key $e=(n, g, h)$.

Note that e is called "public" because it could be published without leaking secret information. In one embodiment, e would be published to enable third parties (e.g. users that generate and upload user-generated content) to encrypt content for the system, while the content provider (CS, CPS) remains in fully control over the (partial) decryption steps. However, when there is no need to publish e, it is kept private.

The values p, q and d may be stored as secret information S together with public key e=(n, g, h). The value of n needs to be shared with the content distributor and the CCU, as these entities require n to perform their encryption and decryption operations. The value of n may be included in protocol messages exchanged during a content transaction between a content provider and a CCU. In one embodiment, multiple transactions may use the same secret information. In that case n would need to be communicated to the content distributor and the CCU only once.

A content item X may be processed on the basis of an agreed-upon reversible protocol known as a padding scheme, which turns X into an integer x wherein 0<x<n. If the process determines that X is too long, it may divide X in blocks that each satisfies the length requirement. Each block is thereafter separately processed in accordance with the padding scheme.

An encryption algorithm $E_e(X)$ for encrypting content X into $X_e$ may comprise the steps of:
  selecting a random number $r \in \{0, \ldots, n-1\}$;
  computing $g' = g^r \bmod n$ and $h' = h^r \bmod n$ such that $X_e = E_e(X, r) = (Y_1, Y_2) = (g', h'^m *(n+1)^X \bmod n^2)$.

The decryption algorithm $D_d(Y_1, Y_2)$ for decrypting an encrypted content item $X_e$ may comprise the steps of:
  calculate $H' = (Y_2 * g'^{(-d*n)}) \pmod{n^2}$
  determine $x = X_{e,d} = (H'-1) * n^{-1} \bmod n^2$ This indeed gives the desired result $X_{e,d} = D_d(Y_1, Y_2) = X$ because in equation a) $H' = ((n+1)^x) \pmod{n^2} = (n*X+1) \pmod{n^2}$. A split-key algorithm for determining a pair of split-decryption keys $d_1$ and $d_2$ may comprise the steps of:
  determine $d_2$ to be a random number $d_2 \in \{0, \ldots, n-1\}$;
  compute $d_1 = (d - d_2) \bmod n$.

A split-key EG algorithm for splitting the random encryption parameter r into l parts may be defined as follows:
  The first party selects a random number $r \in \{1, \ldots, p-1\}$;
  The first party chooses l random numbers $r_i \in \{1, \ldots, p-1\}$, $1 \le i \le l$, such that $r = (r_1 + r_2 + \ldots + r_l) \bmod n$ and sends $r_i$ to party i;
  Let $Y_1 = (h^{n*r_1} * (n+1)^X) \bmod n^2$.
  For i=1 to l-1 do
  Party i sends $(g^r \bmod n, Y_i)$ to party i+1;
  Party i+1 performs its encryption step:
  $Y_{i+1} := (h^{n*r_i} * Y_i) \bmod n^2$.

It may be easily verified that $(g^r \bmod n, Y_l) = E$, (X, r), because $r = (r_1 + r_2 + \ldots + r_l) \bmod n$. The different encryption steps are commutative.

A first decryption operation on the basis of decryption algorithm D and $d_1$ may be used to "partially" decrypt" encrypted content $X_e$ into $X_{e,d_1}$ by calculating $D_{d_1}(X_e) = D_{d_1}(Y_1, Y_2) = (Y_1, Y'_2) = (Y_1, (Y_1^{(-d_1*n)} * Y_2) \pmod{n^2})$. Hence, "partial" decrypted content $X_{e,d_1}$ is represented by the pair $(Y_1, Y'_2)$ wherein $Y_1$ may be typically included in the protocol messages. In one embodiment, if multiple transactions are based on the same secret information and the same random number r, then $Y_1$ does not chance and may need to be communicated to the content distributor and the CCU only once.

A second decryption operation on the basis of algorithm D and $d_2$ may be used to determine the fully decrypted content by calculating $H' = (Y_1^{(-d_2*n)} * Y'_2) \pmod{n^2}$ and $x = ((H'-1) * n^{-1}) \bmod n^2$. Indeed, $H' = (Y_1^{-(d_2+d_1)n} * Y_2) \bmod n^2 = (Y_2 * g'^{(-d*n)}) \pmod{n^2}$ thus showing the correctness of the split-key cipher.

The above split-key DJ cryptosystem may be easily generalized to a multiple split-key cryptosystem with k split-decryption keys. To that end, instead of choosing $d_1$ and $d_2$ such that $d_1 + d_2 = d \bmod n$, k-1 random integers $d_1 \ldots d_{k-1}$ smaller than n may be selected and the final integer may be computed as $d_k = d - (d_1 + \ldots + d_{k-1}) \pmod n$.

The DJ decryption algorithm D is commutative, so the decryption keys may be generated in any desired order and the decryption operations may be performed in any desired order. The same holds for the encryption algorithm.

Figure 4:
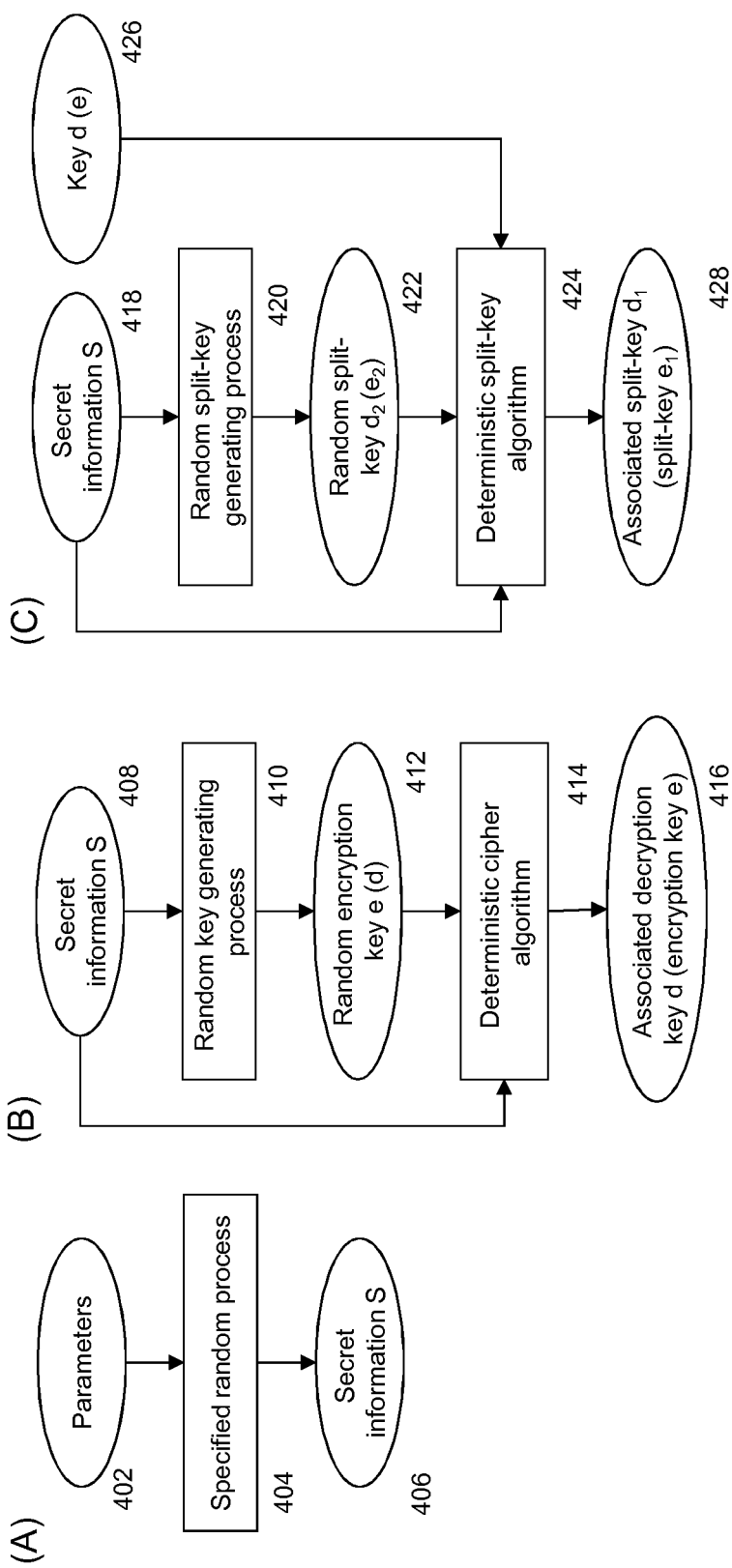
FIG. 4 (A), (B) and (C) depict flow charts illustrating the generation of the encryption/decryption pair e, d and associated split-keys according to various embodiments of the invention.

FIG. 4 depicts flow charts illustrating the generation of the encryption/decryption pair e,d and associated split-keys according to various embodiments of the invention. In particular, the flow charts correspond to the processes executed in the secret key generator as described with reference to FIG. 2. FIG. 4(A) depicts the generation of secret information S. In a first step 402 parameters are determined, like the lengths of keys or lengths of prime number that are to be generated. These parameters are used as input for a random process function 404. The random process function may be a pseudo-random generator or a physical random generator based on a physical process, e.g. thermal noise, for producing secret information S. Based upon the seed and the specific cryptosystem the random generator may generate secret information S 406.

FIG. 4(B) depicts the generation of encryption key e and decryption key d. The secret information S 408 may be used in a specific random process 410 associated with a specific cryptosystem for generating random encryption key e 412. For example, when using the RSA cryptosystem (as described above), encryption key e may be determined on the basis of a process including the random selection two distinct prime numbers p and q and the subsequent random selection of an integer e such that $1 < e < \phi(n)$ and $\gcd(e, \phi(n)) = 1$ wherein $n = p * q$.

Similarly, when using the EG cryptosystem (as described above), encryption key e may be determined on the basis of process including selection a large prime number p and a generator g that generates the multiplicative group $\{0, 1, \ldots, p-1\}$ mod p and subsequent determination of d by random selection from this group $d \in \{1, \ldots, p-2\}$.

Then, on the basis of the random encryption key e and a predetermined deterministic cipher algorithm 314 associated with the cryptosystem, associated decryption key d 416 may be determined. For example, when using the RSA cryptosystem, decryption key is calculated as $d = e^{-1} \pmod{\phi(n)}$. In some embodiments secret information S may also be used in the calculation of d. For example, in the above referred to RSA case, decryption key is calculated by using $\phi(n)$, which is part of the secret information S.

In other embodiments, decryption key d may be determined on the basis of a certain random process and encryption key e may be calculated using a predetermined deterministic cipher algorithm (such as the EG or DJ cryptosystem).

FIG. 4(C) depicts the generation of split-keys $d_1$ on the basis of secret information S. Secret information S 418 may used by a specific random split-key generating process 420 associated with a specific cryptosystem thereby generating first split-key $d_2$ 422. For example, when using the RSA cryptosystem (as described above), split-key $d_2$ may be determined on the basis the random selection of an integer $d_1$ such that $1 < d_1 < \phi(n)$ and $\gcd(d_1, \phi(n)) = 1$ (i.e. similar to the determination of e).

Thereafter, on the basis of $d_2$ 422 and d 426 (and—in some embodiments, on the basis of secret information S) associated split-key $d_1$ 428 may be determined using a deterministic split-key algorithm 424. For example, in the RSA case the associated split-key may be calculated as $d_1 = (d_2^{-1} * d) \pmod{\phi(n)}$.

Hence, from the above it follows that various symmetric and asymmetric cryptosystem may be associated with a split-key algorithm allowing multiple splitting of decryption and/or encryption keys d and e respectively. These split-key cryptosystems may be implemented in a content delivery system comprising as described with reference to FIG. 1. Table 1 provides a comprehensive overview of key information and part of the secret information S, which needs to be distributed to the CS, the CD and the CCU for the different cryptosystems. From this table, it follows that for the split-key RSA, EG and DJ cryptosystems not only the split-keys $d_1$ and $d_2$ but also part of the secret information S, i.e. n (RSA and DJ) and p (EG), are sent to the CD and the CCU respectively.

This information may be sent in a suitable "encryption container" to the entities in the content distribution system. In particular, it may use a so-called split-encryption control message (SECM) to send encryption information to a specific entity configured for (partially) encrypting a content item (e.g. an encryption module associated with the CS) and a split-decryption control message (SDCM) to send decryption information to as specific entity configured for (partially) decrypting a content item (e.g. a CDN of CCU decryption module).

TABLE 1 overview of the information used by the encryption algorithm in the CS and decryption algorithm in the CD and CCU.

| Crypto-system | Key info S → CS | Key info S → CD | Key info S → CCU |
|---|---|---|---|
| One-time pad | e = long sequence of random bits | $d_1$ = long sequence of random bits | $d_2$ = long sequence of random bits |
| LFSR-based | e = LFSR description (initial state, taps, combining functions like ASG (Alternating Step Generator), . . .) | $d_1$ = LFRS description | $d_2$ = LFRS description |
| RSA | p, q {n = p * q} e, d | n, $d_1$ | n, $d_2$ |
| ElGamal | p, g, d {h = $g^d$ mod p}, s = random integer of size p | p, $d_1$ | p, $d_2$ |
| Damgård-Jurik | p, q, g, d {n = p * q; h = $g^d$ mod n}, r = random integer of size n | n, $d_1$ | n, $d_2$ |

Figure 5:
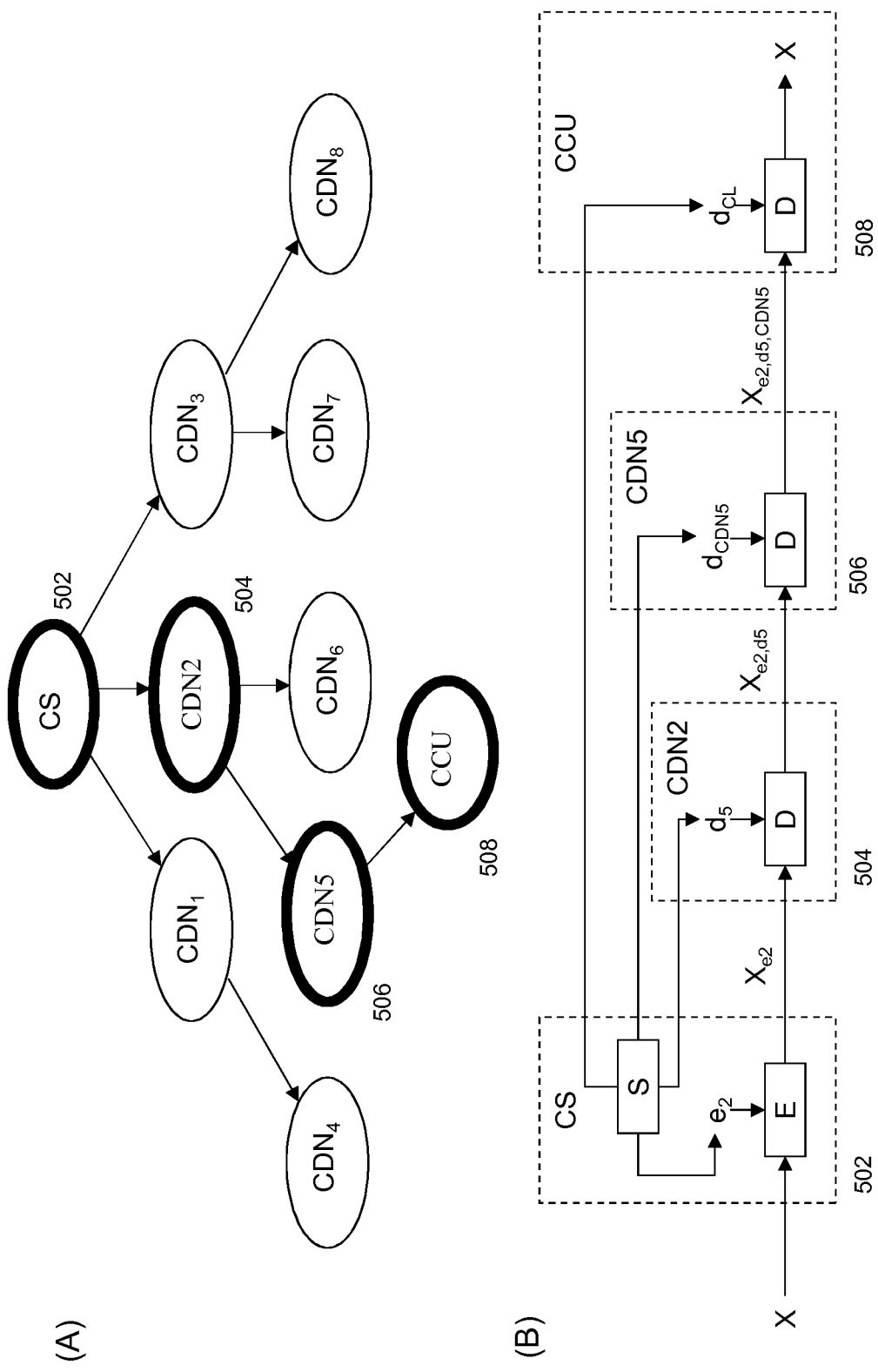
FIG. 5 (A) and (B) depict the use of a split-key cryptosystem in a content delivery system comprising a network CDNs.

FIG. 5 depicts the use of a split-key cryptosystem in a content delivery system comprising a network CDNs according to an embodiment of the invention. In particular, FIG. 5(A) depicts a CS (Content Source) connected to a CDN network configuration wherein certain CDNs, e.g. an "upstream" CDN2, generally referred to as an uCDN, may outsource the delivery of a content item X to a "downstream" CDN5, generally referred to as a dCDN. As will be shown below, the split-key cryptosystems according to the present invention are particularly suited for providing secure content distribution from the CS via the CDN network to the CCU.

In this non-limiting example, a split-key cryptosystem according to the invention may use e.g. three split-encryption keys $e_1, e_2, e_3$ for encrypting content. This way, the CS may send e.g. three encrypted versions of content item X to CDN1, CDN2 and CDN3, respectively, wherein each of these versions has been encrypted with its own encryption key so that CDN1 receives $X_{e1}$, CDN2 receives $X_{e2}$ and CDN3 received $X_{e3}$. Then, based on the associated decryption key d, secret key generator may generate multiple split-decryption keys, in this example five (random) split-decryption keys $d_4, \ldots, d_8$, which may be used when delivery of content item X is outsourced to CDN4-CDN8.

In particular, upon ingestion of content item $X_{e1}$ by CDN4, CDN1 may "partially" decrypt content item $X_{e1}$ into $X_{e1,d4}$ before it is sent to CDN4 which subsequently stores $X_{e1,d4}$ for future delivery to a CCU. In a similar way, CDN5 may receive "partially" decrypted item $X_{e2,d5}$, (received from CDN2), CDN6 may receive and store "partially" decrypted item $X_{e2,d6}$ (received from CDN2), CDN7 may receive and store "partially" decrypted item $X_{e2,d7}$, (received from CDN3), and CDN8 may receive and store "partially" decrypted item $X_{e3,d8}$, (received from CDN3).

When the content item is requested by a CCU, the selected CDN (e.g. one of CDN4-CDN8) would apply a further partial decryption step to the partially decrypted content on the basis of a further split-decryption key sent by the CS. This process is depicted in FIG. 5(B), illustrating the secret key generator associated with the CS 502 generating split-keys for the split-key cryptosystem in order to guarantee secure delivery of content item X from CS via CDN2 504 and CDN5 506 to the requesting CCU 508. In particular, as described above, delivery of content item X was outsourced by CDN2 to CDN5 so that the encrypted content $X_{e2}$ was first "partially" decrypted on the basis of split-decryption key $d_5$ into $X_{e2,d5}$ before it was sent to CDN5.

Then, if a consumer decides to purchase content item X, the content delivery system may redirect the CCU of the consumer to CDN5, which—upon reception of the request—may signal the secret key generator to generate two further split-decryption keys $d_{CDN5}$ and $d_{CCU}$ using e.g. the EG split-key algorithm i.e.: $d_{CDN5} + d_{CCU} = (d_2 - d_5)) \pmod{p}$. Here $d_2$ is the split-decryption key associated with split-encryption key $e_2$ that was used to generate $X_{e2}$, for example for RSA $d_2 = e_2^{-1}$ (mod $\phi(n)$), which was distributed to CDN2; and $d_5$ is the decryption key that CDN2 used to generate $X_{e2,d5}$, which CDN2 distributed to CDN5. The CS may send split-key $d_{CDN5}$ to CDN5 and $d_{CCU}$ to the client of the content consumption unit. Thereafter, CDN5 may partially decrypt $X_{e2,d5}$ with $d_{CDN5}$ into $X_{e2,d5,dCDN5}$, and send it to the content consumption unit, which may invoke its decryption module to perform the final decryption step with $d_{CCU}$ by calculating $D_{CCU}(X_{e2,d5,dCDN5})$. The decrypted content $X = X_{e2,d5,dCDN5,dcl}$ may be displayed to the consumer through a display module associated with the CCU.

This embodiments, illustrates that the split-key cryptosystem is particularly suitable for secure content delivery via a CDN network to a CCU. Whenever a CDN outsources a content item or a CUU requests a content item, the CS is contacted to generate a further split-key (in this example a split-decryption key). This way, the delivery of the content item via the CDN network is completely transparent. Furthermore, because at any moment no CDN has all split-decryption keys necessary to fully decrypt the content, secure transport and delivery of a content item is possible.

Figure 6:
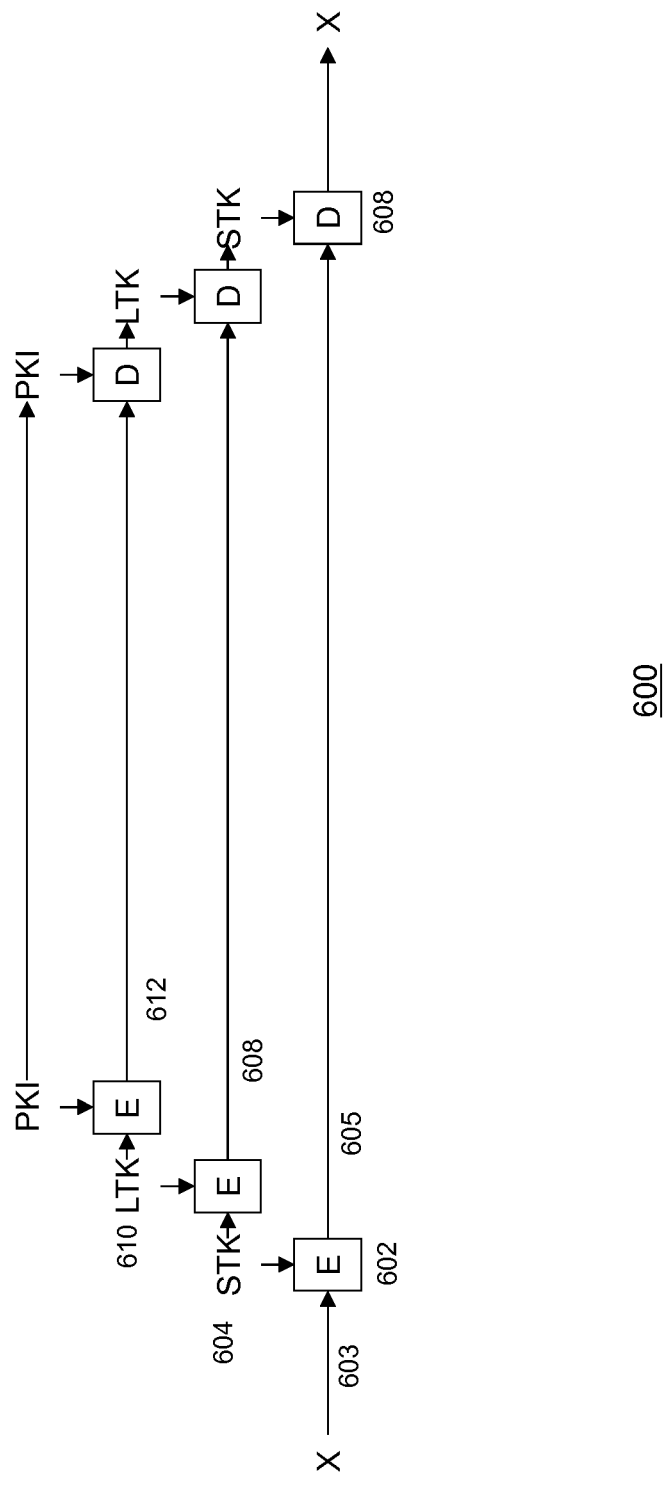
FIG. 6 depicts a conventional multi-layered encryption scheme.

FIG. 6 depicts a schematic of a multi-layered encryption scheme. FIG. 6 depicts a conventional multi-layered (in this case four-layer) encryption system as typically used in a conditional access (CA) systems.

The first layer may relate to a CA transmitter 602, which divides content stream X 603 in parts, which are each encrypted (scrambled) using a symmetrical short-term key (STK) 604 also referred to as a control word into a scrambled content stream 605. The thus scrambled stream is transmitted to a CA receiver 606, which is configured to descramble the scrambled stream.

The second layer may relate to the transmission of encrypted control words (also referred to as entitlement control message or ECMs), which may be sent by the CA transmitter in an ECM stream 608 (which may be in sync with the encrypted content stream) to the CA receiver. ECMs are decrypted in the CA receiver using a long-term key 610 (LTK) and the control words in the decrypted ECMs are used to decrypt (descramble) the encrypted content stream. The long-term key may change each month or so.

The third layer may be formed by encrypted LTKs 612, which may be sent via a separate channel to the CA receiver. Encrypted LTKs are typically referred to as Entitlement Management Messages (EMMs).

The fourth layer may be formed by the public key infrastructure (PKI) keys, which are used to encrypt and decrypt EMMs and which are distributed via a smart card or a SIM card. The split-key cryptosystems according to the invention may be applied to any of these layers.

Figure 7:
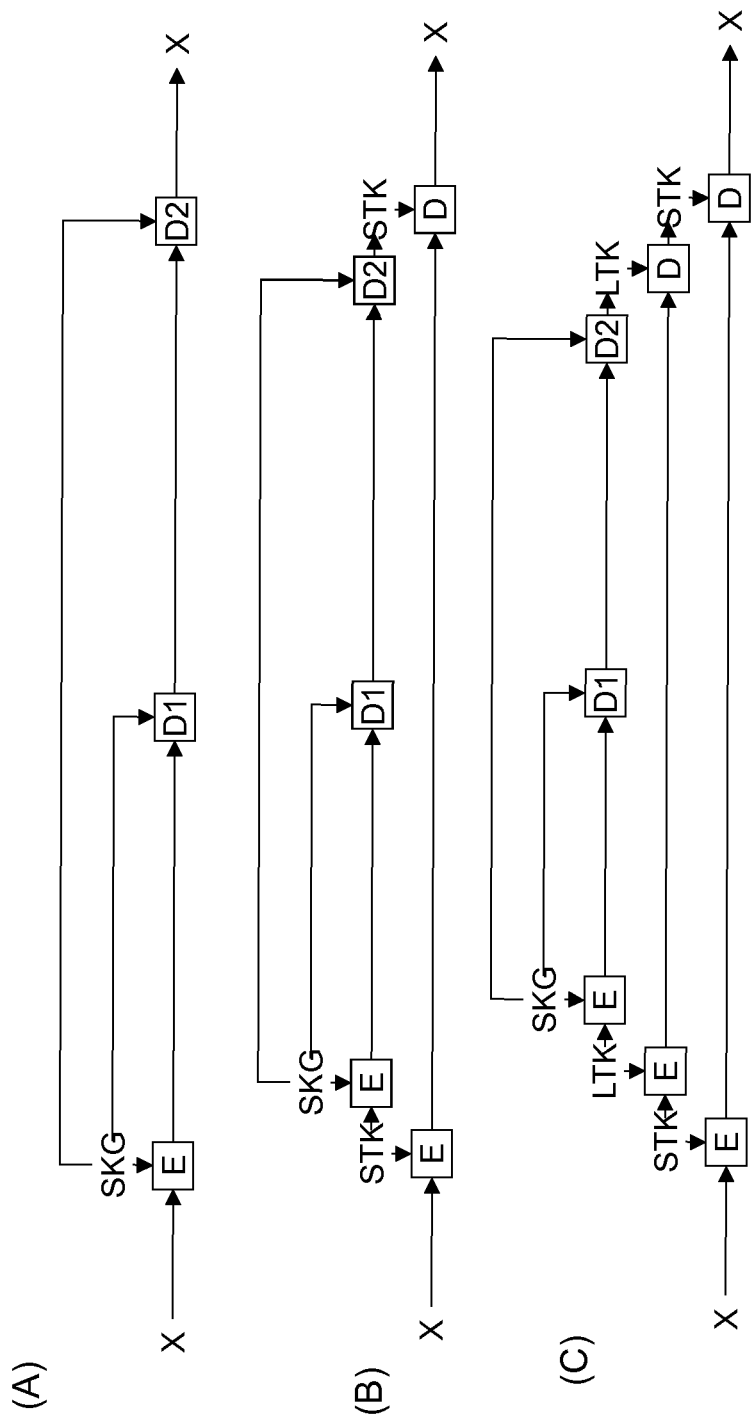
FIG. 7 (A)-(C) depict various implementations of a split-key cryptosystem in a multi-layered encryption scheme.

FIG. 7 (A)-(C) depict various implementations of a split-key cryptosystem in a multi-layered encryption scheme. For example, FIG. 7(A) depicts an example wherein a secret key generator SKG at the transmitter side of a CA system, may generate short term encryption keys (control words) for scrambling the content stream, which is sent to a first descrambling unit D1 associated with a particular streaming server in the network, which generates a partially descrambled content stream on the basis of first short term split-encryption keys $\{d_1\}$ generated by the secret key generator. The thus partially descrambled content stream is subsequently sent to a CA receiver, which comprises a second descrambling unit D2 for fully descrambling the partially descrambled content stream on the basis of second short term split-encryption keys $\{d_2\}$ which are also generated by the secret key generator SKG.

Similarly, FIG. 7(B) illustrates the application of the split-key cryptosystem on the level of the encryption of the control words. In this particular embodiment, the secret key generator SKG may generate an encryption key to encrypt controls words (which are used to scramble content) into ECMs. These ECMs are sent to a first decryption unit D1 associated with a particular ECM server in the network, which partially decrypts the stream of ECMs on the basis of first split-decryption keys $\{d_1\}$ transmitted by the SKG to the first decryption unit D1. The thus generated partially decrypted ECM stream is subsequently sent to the CA receiver, which comprises a second decryption unit D2, which fully decrypts the partially decrypted ECMs on the basis of split-decryption keys $\{d_2\}$. The control words extracted from the decrypted ECMs are subsequently used for descrambling the scrambled content stream.

Finally, FIG. 7(C) illustrates the application of the split-key cryptosystem on the level of the encryption of the LTK into EMMs. At the transmitter side LTKs may be encrypted into EMMs and send to a first decryption unit D1 associated with a secure relay server in the network. First decryption unit partially decrypts EMMs into partially decrypted EMMs on the basis of partial-decryption key $d_1$ and sends the thus partially encrypted EMMs to a second decryption unit D2, which fully decrypts the EMMs on the basis of a second split decryption key $d_2$.

Figure 8:
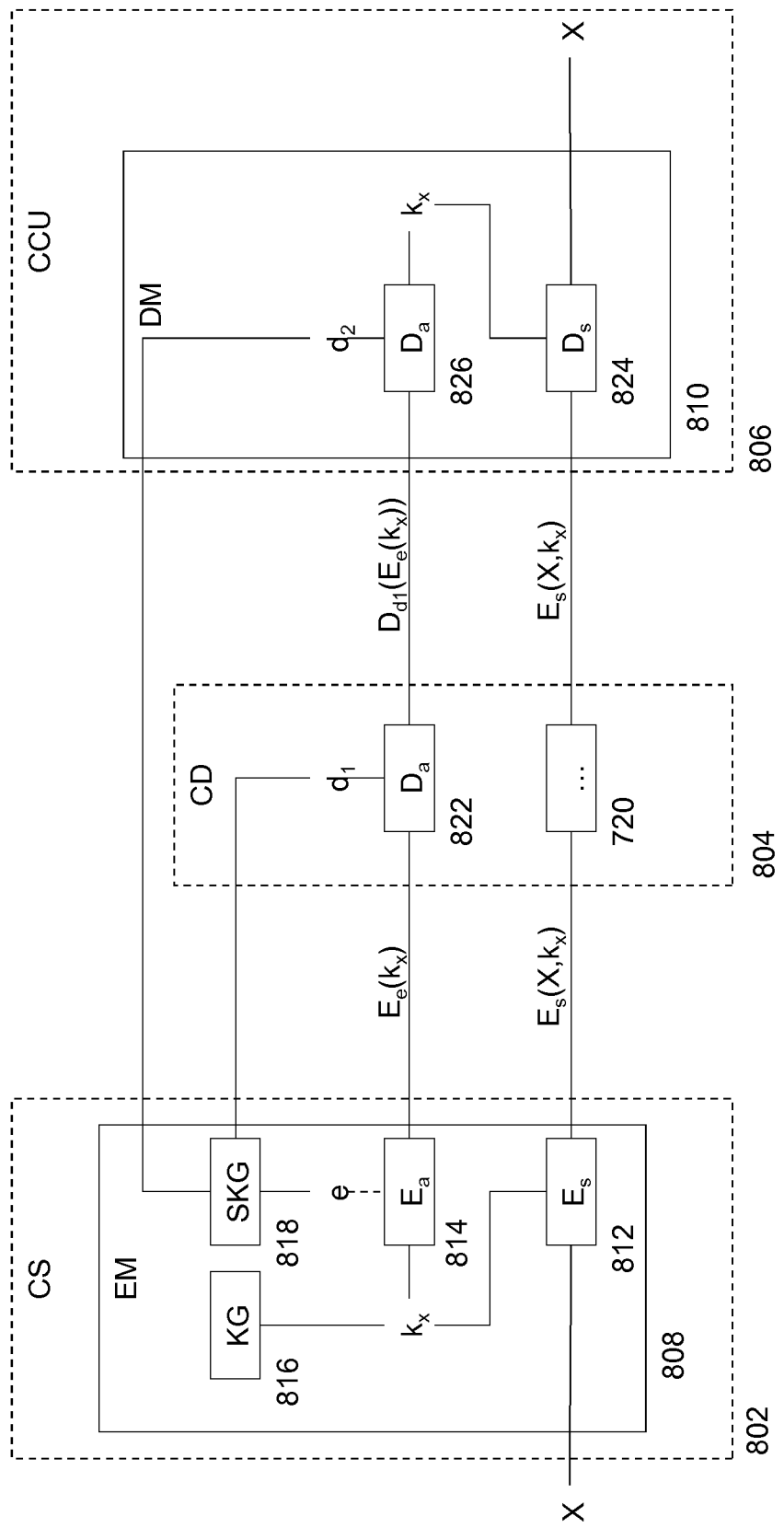
FIG. 8 depicts a hybrid split-key cryptosystem for distributing content from a CS via a CDN network to a CCI according to an embodiment of the invention.

FIG. 8 depicts a hybrid split-key cryptosystem 800 for distributing content from a CS via a CDN network to a CCU according to an embodiment of the invention. In particular, FIG. 8 depicts a content source CS 802 comprising an encryption module EM 808 comprising a symmetric encryption algorithm $E^s$ 812 and an asymmetric encryption algorithm $E^a$ 814, which is part of an asymmetric split-key cryptosystem formed by asymmetric encryption algorithm $E_a$ in the CS, an asymmetric decryption algorithms $D^a$ 822 in the CD 804 and an asymmetric decryption algorithms $D^a$ 826 in the CCU respectively and a secret key generator SKG in the CS which is configured to generate encryption key e and split-decryption keys $d_1$ and $d_2$. Suitable asymmetric split-key cryptosystems include the RSA, EG or DJ split-decryption systems as described above.

Since asymmetric encryption ciphers are less suitable for fast encryption of content than symmetric encryption ciphers, the content stream X is encrypted using symmetric encryption algorithm $E^s$ such as AES or a stream cipher such as RC4. A symmetric encryption key $k_x$ may be generated by key generator 816, which is used to encrypt content X on the basis of $E_s$ 812. Encryption key $k_x$ may be encrypted using an asymmetrical encryption algorithm $E^a$ 814 and an encryption key e generated by the secret key generator SKG.

The encrypted content $E^s_{kx}(X)$ and encrypted symmetric encryption key $E_e(k_x)$ may be subsequently transmitted via the content distributor CD to the decryption module 810 in the CCU. Here, the CD may transparently relay the symmetrically encrypted content to the CCU. In contrast, the encrypted symmetric encryption key may be send to a decryption module $D_a$ in the CD, which partially decrypts the encrypted encryption key before it is sent to the CCU which is configured to fully decrypt the partially decrypted encryption key $k_x$, so that $k_x$ may be used to descramble the scrambled content stream.

Hybrid encryption thus allows the combination of the efficiency of symmetric encryption to content item X, and the application of the split-key cryptosystem to the symmetric encryption key $k_x$. In case of streaming media, the symmetric encryption key (or secret seed) $k_x$ could be changed on a regular basis (key roll-over).

Figure 9:
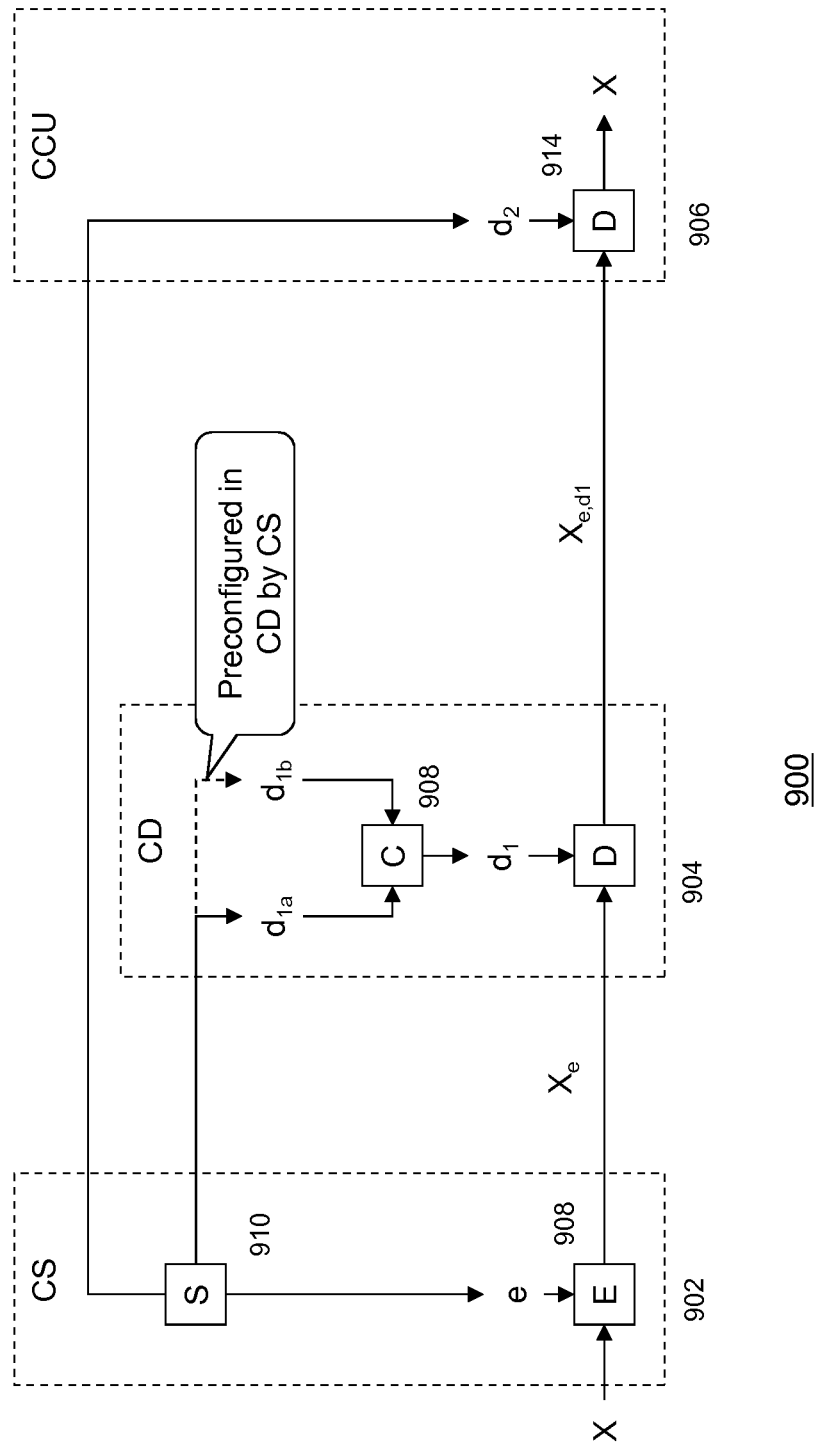
FIG. 9 depicts a split-key cryptosystem for distributing content via a CDN network to a content consumption unit according to another embodiment of the invention.

FIG. 9 depicts a split-key cryptosystem 900 for distributing content via at least one CDN 904 to a content consumption unit 906 according to another embodiment of the invention. In particular, in this variant CDN1 may comprise at least one combiner 908 C for combining two split-keys.

For example, in one embodiment, combiner may combine split-key $d_{1a}$ originating from the secret key generator 910 associated with the content source 902, with a preconfigured split-key $d_{1b}$ into a combined split-key $d_1$. The preconfigured split-key may be securely implemented together with the decryption algorithm D in a secure module associated with the CDN. Combined split-key $d_1$ may be used to partially decrypt encrypted content item $X_e$ into $X_{e,d1}$ before it is sent to the CCU, which may subsequently fully decrypt the partially decrypted content item using a second split-key $d_2$ sent by the secret key generator to the CCU.

Depending on the encryption algorithm implemented in the split-key cryptosystem, different combination functions may be used in combiner. For example for the one-time-path and the stream cipher a combination function may be defined as $d_1 = d_{1a} \oplus D_{1b}$ (XOR). For the EG and the DJ encryption scheme a combination function may be defined as a simple addition: $d_1 = (d_{1a} + d_{1b})$ (mod p) for EG and $d_1 = (d_{1a} + d_{1b})$ (mod n) for DJ. For the RSA encryption scheme such combination is not possible, as splitting of RSA keys requires secret information $\phi(n)$.

This particular variant prevents a so-called man-in-the-middle attack wherein an unauthorized third party intercepts $X_e$ and $d_{1a}$ and impersonates itself as a CDN to the CPS and/or the CCU.

Figure 10:
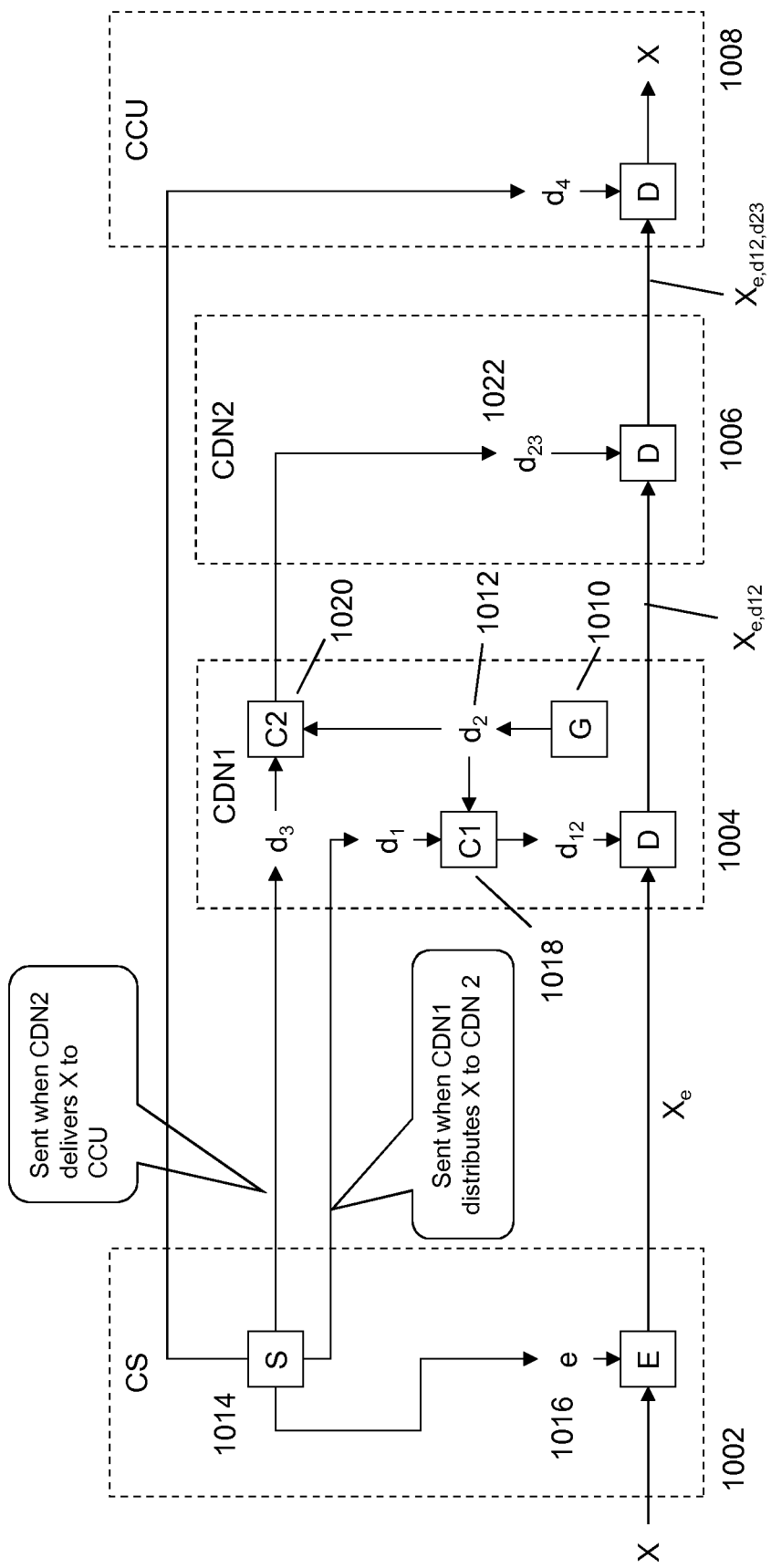
FIG. 10 depicts a split-key cryptosystem for distributing content via a CDN network to a content consumption unit according to yet another embodiment of the invention.

FIG. 10 depicts a split-key cryptosystem 1000 for distributing content via a first CDN1 1004 and second CDN2 1006 to a content consumption unit 1008 according to yet another embodiment of the invention. In particular, in this variant CDN1 is associated with a key generator G 1010, which is configured to generate a (random) split-key $d_2$ 1012. The secret key generator S 1014 associated with CPS 1002 may generate an encryption key e 1016, which may be used to generate encrypted content $X_e$, which is ingested and stored by CDN1.

The distribution of $X_e$ may be outsourced by CDN1 to CDN2. When distributing $X_e$ to CDN2, $X_e$ is first partially decrypted on the basis of a split-key $d_{12}$ using decryption algorithm D in the CDN1.

Split-key $d_{12}$ is generated on the basis of a first split-key $d_1$, which is sent to a first combiner 1018 C1 associated with CDN1, and a second split-key $d_2$, which is generated by key generator G 1010 associated with CDN1. The first combiner C1 in CDN1 may be used in order to combine $d_1$ with $d_2$ into $d_{12}$. The combination algorithm in C1 may depend on the type of encryption algorithm used by the split-key cryptosystem similar to those described with reference to FIG. 9. This way, before being distributed to CDN2, encrypted content $X_e$ is partially decrypted to $X_{e,d12}$ before it is sent to CDN2.

Then, if a CCU request content item X, the CPS may send a further split-key $d_3$ to CDN1. A second combiner C2 1020 in CDN2 may combine $d_3$ with the previously generated split-key $d_2$ into combined split-key $d_{23}$. Combined split-key $d_{23}$ 1022 may then be sent to CDN2 in a suitable encryption container, in this case a split-decryption control message (SDCM). Then, using decryption algorithm D in CDN2 and the combined split-key $d_{23}$, a double partially decrypted content item $X_{e,d12,d23}$ may be generated. $X_{e,d12,d23}$ is sent to the CCU where it is fully decrypted by decryption algorithm D and split-decryption key d4, which is sent by the CPS to the CCU.

The first combiner C1, the second combiner C2, the key generator G and the decryption algorithm D associated with CDN1 may be implemented in a secure module.

The advantage of this particular variant is that the CPS only requires an interface with CDN1 and the one or more CCUs. Further, in this embodiment CDN1 may be responsible for the outsourcing of a content item X to one or more further CDNs, wherein CDN1 can guarantee that CDN2 gets an encrypted content version which is different from the one stored at CDN1.

Note that the insight that RSA keys are not splittable without secret information ϕ(n) may be used as an advantageous features in the sense by using RSA, the CPS can assure that no unauthorized party can split keys provided by the CPS thereby providing the benefit that it will make a man-in-the-middle attack impossible (or at least very difficult) wherein a man-in-the-middle intercepts a key provided by the CPS and combines it with his own secret key.

Figure 11:
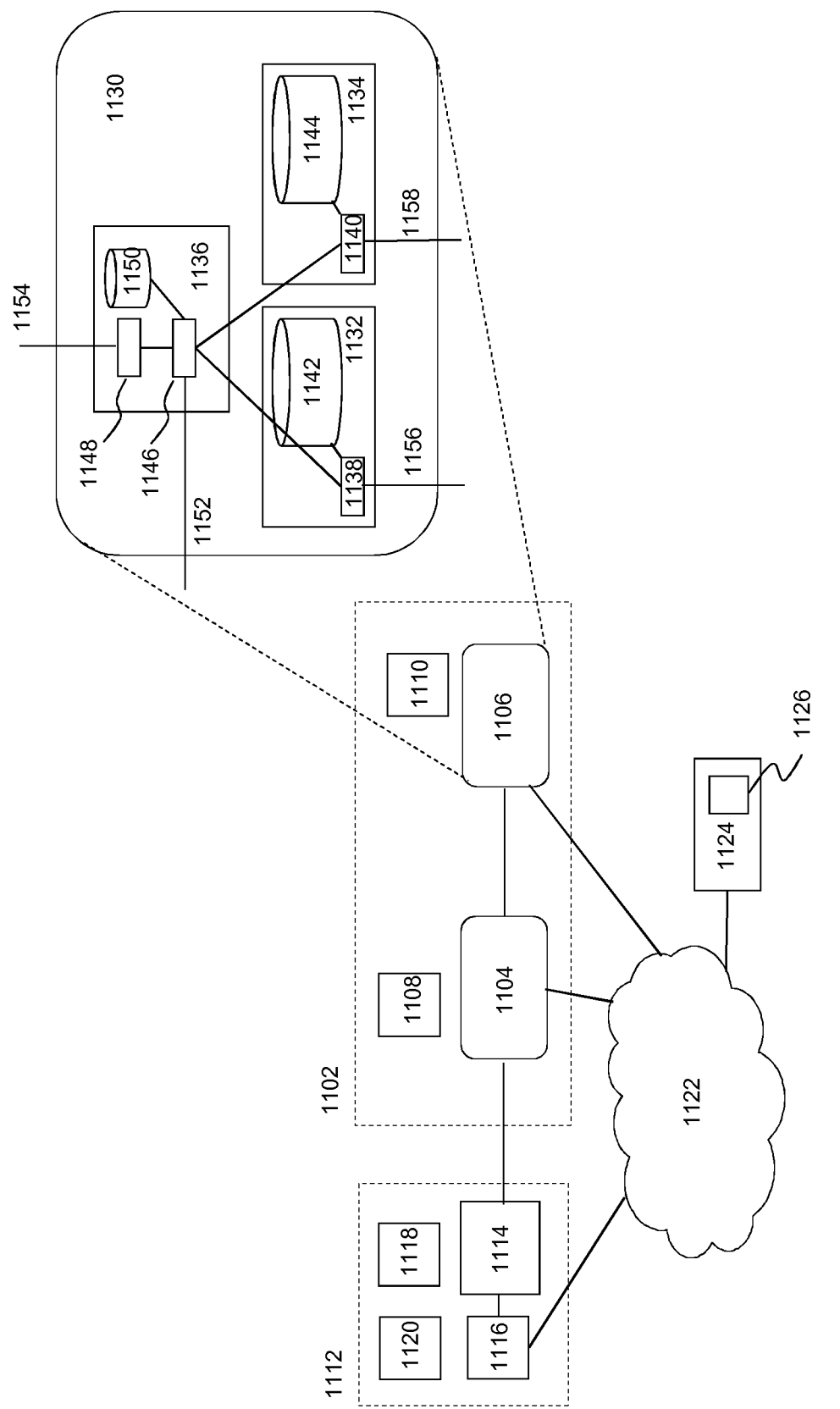
FIG. 11 depicts a schematic of a secure content delivery system for delivering content to a content consumption unit according to an embodiment of the invention.

FIG. 11 depicts a schematic of a secure content delivery system for delivering content to a content consumption unit according to an embodiment of the invention. In this particular embodiment, the content distributor 1102 is implemented as a content delivery network (CDN) or a network of CDNs, e.g. a first CDN 1104 associated with a first decryption module 1108 and a second CDN 1106 associated with a second decryption module 1110.

Content source 1112 may comprise a content provider system (CPS) 1114 connected to a web portal 1116. The CPS may be associated with an encryption module 1118 and a secret key generator 1120. One or more CCUs 1124 comprising a decryption module 1126 may be communicated via transport network 1122 to the content source and the content distributor.

The CPS may be configured to offer content items, e.g. video, pictures, software, data and/or text in the form of files and/or streams to customers. A customer may buy these content items by accessing web portal 1116 on his CCU. A CCU may communication with the CDN and the CPS using a client.

The CDN is configured to efficiently deliver content items to the CCU. Delivery of a content item may be in the form of a live stream, a delayed stream or a content file. Here, a content file may generally relate to a data structure used for processing content data belonging to each other. A file may be part of a file structure, wherein files, including content files, are stored and ordered in a directory and wherein each file is identified by a file name and a file name extension.

In set 1130 depicts CDN in more detail. A CDN may comprise delivery nodes 1132,1134 and at least one central CDN node 1136. Delivery nodes may be geographically distributed throughout the CDN. Each delivery node may comprise (or be associated with) a controller 1138,1140 and a cache 1142,1144 for storing and buffering content. The controller may be configured to set up communication session 1156,1158 with one or more CCUs.

A central CDN node may comprise (or may be associated with) an ingestion node (or content origin function, COF) 1148 for controlling ingestion of content from an external source 1154 (e.g. a content provider or another CDN). Further, the central CDN may be associated with a content location database 1150 for storing information about the location where a content item is stored within a CDN and a CDN control function (CDNCF) 1146 for controlling the distribution of one or more copies of a content item to the delivery nodes and for redirecting clients to appropriate delivery nodes (the latter process is also known as request routing). The CDNCF may further be configured to receive and transmit signaling messages from and to a CPS, another CDN and/or a content consumption unit 1152. The distribution of copies of content to the delivery nodes may be controlled such that throughout the CDN sufficient bandwidth for content delivery to a content consumption unit is guaranteed. In one embodiment, the term CDN may relate to a CDN as described in ETSI TS 182 019.

In alternative embodiments, a CDN may relate to a CDN as described in ETSI TS 182 032. It is to be understood that in such embodiments, certain steps of a method according to the invention, such as for example signaling steps between an upstream and a downstream CDN, may be performed by a Request and Content Control Function (RCF), implemented in an upstream and/or a downstream CDN according to for example ETSI TS 182 032. Likewise certain steps of a method according to the invention associated with (e.g. controlling the) the actual distribution of content within a CDN or between CDN's, may be performed by a Distribution of Content Function (DCF), which may be implemented in an upstream and/or a downstream CDN according to for example ETSI TS 182 032.

In certain embodiments, one or more signaling steps between functional entities shown in the FIGS. 16-22, may be executed by a RCF or DCF implemented in a CDN. Typically a RCF in an upstream CDN is referred to a uRCF and in a downstream CDN as dRCF. Similar annotations apply to a DCF. A Consumer may use a client, a software program on the content consumption unit (CCU, also referred to as UE), to purchase content, e.g. video titles, from a CPS by sending a content request to a web portal (WP), which is configured to provide title references identifying purchasable content. In response to the content request, the client may receive at least part of the title references from the WP and location information (e.g. an URL) of a CDNCF of a CDN, which is able to deliver the selected content to the content consumption unit.

The CDNCF may send the client location information associated with one or more delivery nodes, which are configured to deliver the selected content to the client. Typically, the CDNCF may select one or more delivery nodes in the CDN, which are best suited for delivering the selected content to the client. Criteria for selecting a delivery node may include the geographical location of the client and the processing load of the delivery nodes.

A client may contact a delivery node in the CDN using various known techniques including a HTTP and/or a DNS system. Further, various streaming protocols may be used to deliver the content to the client. Such protocols may include HTTP and RTP type streaming protocols. In one embodiment an adaptive streaming protocol, such as HTTP adaptive streaming (HAS), DVB adaptive streaming, DTG adaptive streaming, MPEG DASH, ATIS adaptive streaming, IETF HTTP Live streaming and related protocols, may be used.

In the content delivery system described with reference to FIG. 11, a transaction between the CPS and a client of a content consumption unit may be established and the delivery of the content may be delegated to one or more CDNs. Delegation of content delivery to a third party increases the risk of unauthorized access. The content is therefore protected by a content protection system based on a split-key cryptosystem.

Figure 12:
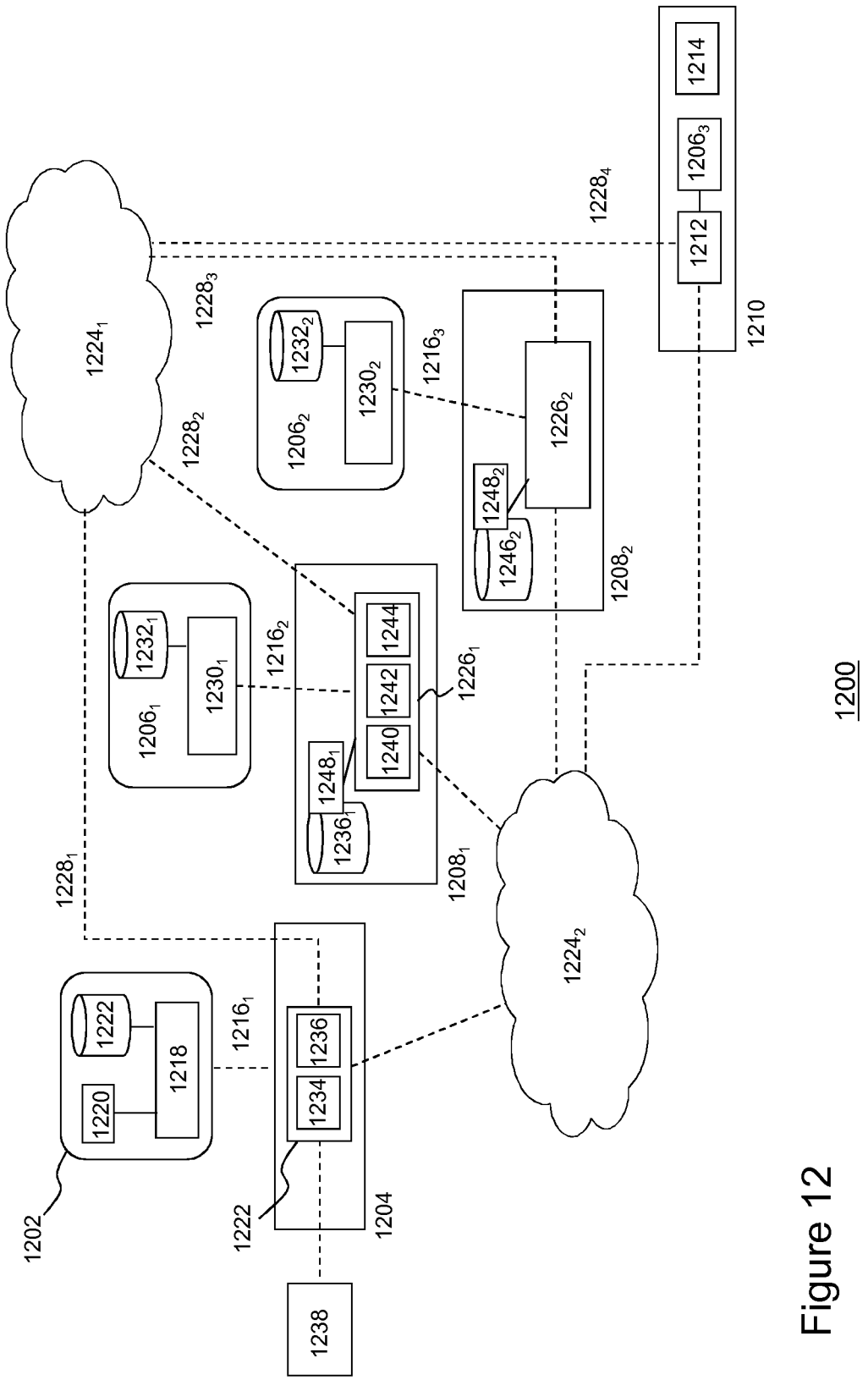
FIG. 12 depicts a schematic of a secure content delivery system for delivering content to a content consumption unit according to another embodiment of the invention.

FIG. 12 depicts a schematic of a secure content delivery system for delivering content to a content consumption unit according to another embodiment of the invention. For the sake of simplicity, FIG. 12 depicts a CDN as a single entity comprising CDN functions (e.g. ingestion, storage, request routing and content delivery functions). Each of the CDNs depicted in FIG. 12 however may be implemented on the basis of the same or similar architecture described with reference to FIG. 11.

The content protection system may comprise at least one encryption module 1202 associated with a content provider system (CPS) 1204 and one or more decryption modules $1206_{1-3}$ associated with one or more CDNs $1208_{1,2}$ and CCUs 1210. A CCU may comprise a client 1212 connected to the decryption module $1206_3$ and, optionally, a display unit 1214 for displaying decrypted content. The encryption module and the one or more decryption modules may be configured to (partially) encrypt and (partially) decrypt respectively content items on the basis of key information generated by the encryption module. Communication between encryption modules and the CPS, and between a CDN decryption module and the CDN may be handled by a secure interface $1216_{1-3}$.

The key information may comprise encryption key information used by the encryption module to encrypt plaintext content and split-key information used by a CDN decryption module to partially decrypt encrypted content received from a CPS or from another CDN and used by a decryption module in the CCU to fully decrypt the partially decrypted content items originating from a CDN. A decryption module may be implemented as a substantially tamper free device, e.g. a smart card, a hardware chip, a SIM card or a secure software module configured to hide the decryption key. After full decryption of the partially decrypted content, the decrypted plaintext content may be displayed to the consumer through the display unit such as a computer monitor, a television screen or another type of display.

The key information may be generated, managed and distributed by an encryption control unit 1218 in the encryption module. To that end, the encryption control unit may comprise a key generator for generating encryption and decryption keys e,d on the basis of secret key information S and at least one split-key algorithm for splitting e and/or d in multiple split-encryption and/or split-decryption keys (as described in detail with reference to FIG. 1-3 above). The encryption control unit may further one or more predetermined encryption algorithms E (ciphers) for encrypting plaintext content items.

The encryption module may further use a random generator 1220 for generating random information, which may be used by the encryption control unit for generating the key information, which may be stored in a secure key database 1222 associated with the encryption module. Although the encryption module in FIG. 12 is illustrated as a single entity, it submitted that other variations wherein the different functions in the encryption module are implemented as separate communicating entities are also foreseen.

As already described to above, split-key information may be sent to the decryption modules associated with the CDNs and the CCUs. The CPS controller 1222 may therefore be configured to securely transmit key information generated by the encryption module via a key distribution network $1224_1$ to a CDN controller $1226_{1,2}$ (that would pass it securely to its CDN encryption module) and to the client 1212 of a CCU (that would pass it to its decryption module).

The key distribution network provides authenticated and secure transport and is separate from the transport network $1224_2$, which is used for delivery of encrypted or partially decrypted content items to CDNs or CCUs. The key distribution network may be a separate network or an overlay network over another network (e.g. managed IP networks and/or the internet). The key distribution network may use secure protocols, such as Secure Sockets Layer (SSL) and Transport Layer Security (TLS, IETF RFC 2246) Also other key management technologies may be employed to securely generate, exchange, store, safeguard, use, vet, and replace keys.

This way, the transport of the key information and the encrypted content is completely separated. To that end, the CPS controller may be configured to set up one or more secure channels $1228_{1-4}$ with a CDN controller and/or a CCU client via the key distribution network.

A CDN decryption module may comprise a CDN decryption control unit $1230_{1,2}$ and a secure CDN key database $1232_{1,2}$ for storing key information originating from the encryption module. The CDN decryption control unit may comprise one or more decryption algorithms D (ciphers) for (further) partially decrypting encrypted content originating from a CPS or from another CDN. In some embodiment, the CDN decryption control unit may further comprise one or more combiner for combining different split-keys into a combined split-key and, optionally, a key generator G for generating a random split-key as described in more detail with reference to FIGS. 9 and 10.

The CPS controller 1222 may be configured to trigger an ingestion process of transferring content into a CDN and to handle content requests from a CUU. The CPS controller may comprise a CPS content ingestion function 1234 and a CPS request routing function 1236. When ingestion of content originating from a (third party) plaintext content source 1238 is required, the CPS content ingestion function may invoke the encryption module, in particular the encryption control unit therein, to generate an encryption key for encrypting plaintext content before it is ingested by a CDN. Content requests originating from a CCU may be handled by the CPS request routing function. This function may invoke the encryption module to generate split-key information for use in the decryption modules associated with the CDNs and CCUs.

The CDN controller $1226_{1,2}$ may be configured to manage ingestion of (encrypted) content items, distribution of content items to other CDNs and delivery of content items to a CCU. To that end, the CDN controller may comprise an ingestion function 1240, a distribution function 1242 and a CDN request routing and content delivery function 1244.

The CDN content ingestion function may be used for ingestion of encrypted content items into the CDN. Content ingestion may include storing encrypted content files and/or initiating a relay point for an encrypted content stream. Further, the CDN content distribution function may manage the distribution of encrypted content to other CDNs. It may invoke the encryption module for providing split-key information for its CDN encryption module. Finally, the CDN content request routing and delivery function may handle the processes with a client in the content consumption unit, e.g. delivery of partially encrypted content to a CCU or handing delivery over to another CDN.

A CDN may comprise a CDN content storage $1246_{1,2}$ to store and retrieve (encrypted) content files and/or CDN content streaming functions $1248_{1,2}$ to terminate and relay (encrypted) content streams.

FIG. 12 illustrates a non-limiting example how a content protection system may be used in conjunction with a CDN-type content delivery system. Many variations are possible without departing from the scope of the invention. For example, in some embodiments, one or more parts of the functionality of the encryption module may be implemented in the CPS controller. Similarly, in other embodiments, one or more parts of the functionality of the CDN encryption module may be implemented in the CDN controller.

Figure 13:
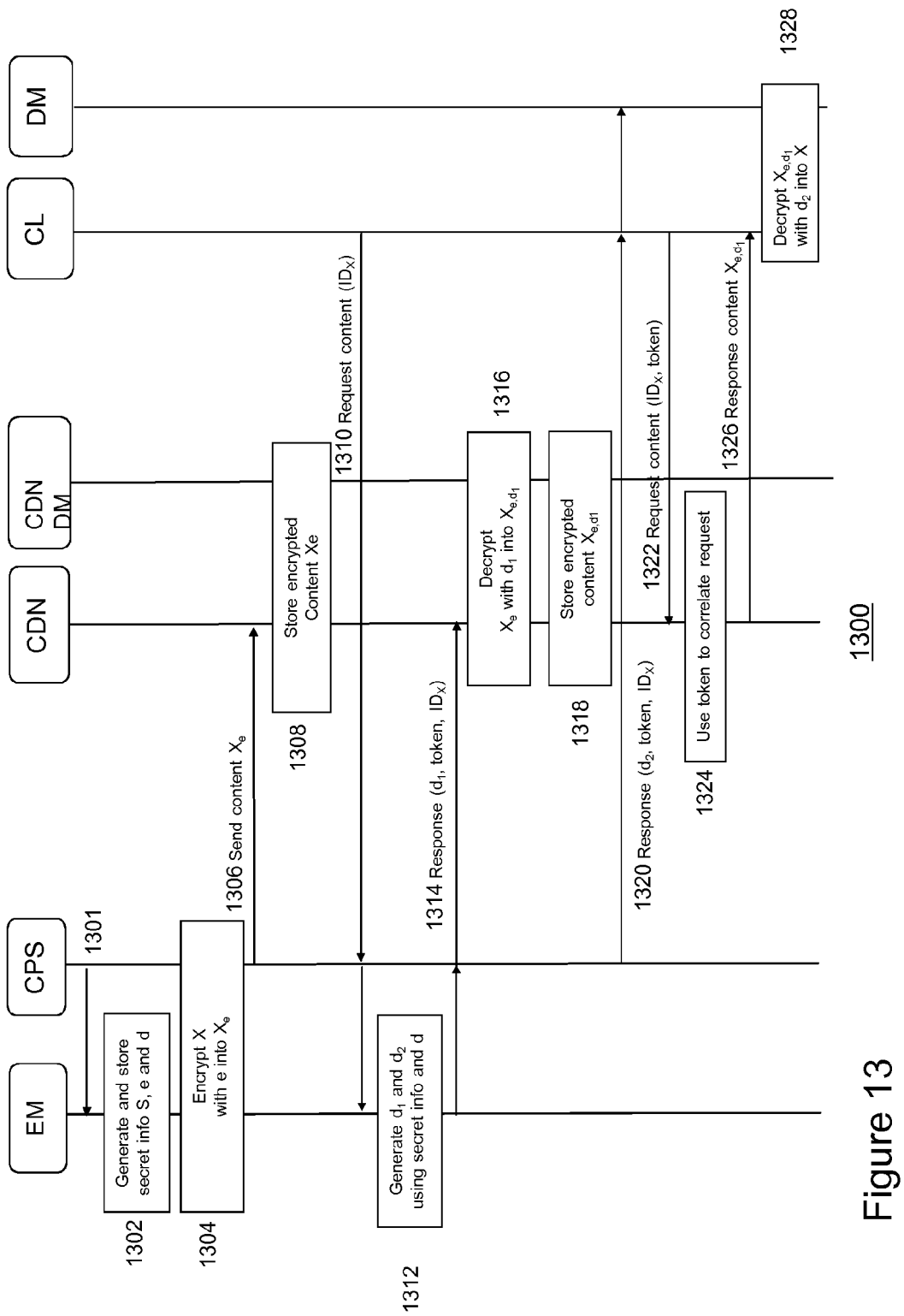
FIG. 13 depicts a schematic of protocol flow of a content delivery system using a split-key cryptosystem according to one embodiment of the invention.

FIG. 13 depicts a schematic of protocol flow of a content delivery system using a split-key cryptosystem according to one embodiment of the invention. The flow may be divided in two phases: a first phase associated with content preparation and a second phase associated with content delivery.

In the content preparation phase, the process may start with the CPS triggering the encryption module (EM) to encrypt content item X, e.g. a particular video title or stream associated with a particular content identifier $ID_X$ (step 1301). In response, the encryption module may generate an encryption key e and a decryption key d on the basis of secret information S. The secret information S, e and d may be stored together with content identifier $ID_X$ in the secure key database of the encryption module (step 1302).

Then, using encryption key e, an encryption algorithm E may be used to encrypt the plaintext X into encrypted content item $X_e$ (step 1304). The encrypted content item may be ingested by the CDN (step 1306), which may store the ingested encrypted content in a particular storage (step 1308). Note that step 1306 may be composed of several sub-steps, e.g. a trigger from the CPS to the CDN, a content-ingestion request from the CDN to the to the CPS and the actual content ingestion step again from the CPS to the CDN.

In embodiments of the invention, said trigger takes the form of a request and contains the contentID of the content item that is to be ingested and/or distributed. The request may further contain a DRM flag to indicate (or flag) to the ingesting CDN that DRM procedures apply to the content item.

In one embodiment, the CDN control function (CDNCF) may distribute one or more copies of the encrypted content item to one or more geographically distributed delivery nodes. This way throughout the CDN sufficient bandwidth for content delivery to CCUs is guaranteed. The locations of the delivery nodes storing the encrypted content may be stored in a location database.

Then, after a consumer having purchased content item $ID_X$, the second content delivery phase may start. A client (for example a Marlin client) in a content consumption unit may send a content request to the CPS (step 1310). The content request may comprise the content identifier $ID_X$ associated with the video title and location information, e.g. an IP address, associated with the client. The CPS may relay the content request to the encryption module, which may identify the secret information S and the decryption key d in the secure key database on the basis of the content $ID_X$. Then, on the basis of the secret information and the decryption key d, the encryption control unit may generate a split-decryption key pair $d_1$ and $d_2$ (step 1312). In one embodiment, the generation of the split-key pair may include the generation of a random split decryption key $d_2$ on the basis of secret information S and the generation of a split decryption key $d_1$ on the basis of the secret information S and $d_2$.

Here, the split-key pair may be uniquely associated with the content request using a session token, i.e. a unique identifier for identifying the content request session associated with the CCU. A token may relate to a consumer identifier, the IP address of the content consumption unit, a dedicated token or a combination thereof.

The CPS may send a first response comprising the first split-decryption key $d_1$ (a type of DRM key), retrieved from the encryption module), the content identifier $ID_X$ and the content session token (step 1314) via a secure channel (e.g. via a key distribution network that provides end-point authentication and message encryption) to the CDN. In embodiments of the invention, the first response may comprise a DRM-instruction identifier. The DRM-instruction identifier may for example instruct the CDN which DRM system applies to the content item, or simpler which decryption algorithm should be used for partially decrypting the content item $X_e$ using the first split-decryption key $d_1$. The DRM-instruction identifier may optionally be encoded in the content session token. The CDN may invoke the CDN decryption module (CDN DM) via the secure interface (step 1316) to partially decrypt the identified encrypted content $X_e$ using split-decryption key $d_1$ into partially decrypted content item $X_{e,d1}$. $X_{e,d1}$ may be temporarily stored at a CDN content storage (step 1318), or alternatively made available for relay via a CDN content streaming function in case of streaming content.

Thereafter and/or in parallel, the encryption module may send a second response comprising the second split-decryption key $d_2$, the content identifier $ID_X$ and the session token via a secure channel to the client in the CCU (step 1320). The response may also include an identification (DNS name, IP address, etc.) of the CDN to which the client request is redirected. The client may configure split-decryption key $d_2$ into the decryption module (DM) and temporarily store the content identifier $ID_X$ and the content session token.

The client may send a content request including the session token and the content identifier to the identified CDN. The CDN—in response—correlates the token with the $X_{e,d1}$ (step 1324) and has a delivery node send the content to the client (step 1326). In one embodiment, the CDN may redirect the client to the selected delivery node. The decryption module in the CCU then decrypts $X_{e,d1}$ into plaintext content X using the split-decryption key $d_2$ (step 1328). Optionally, the decrypted content may be displayed to the consumer.

Hence, in this particular embodiment both split-keys may be processed in parallel in the sense that the partial decryption of the encrypted content $X_e$ stored at the delivery node may already be started while the content request is further processed. Moreover, especially in the case of streaming content, partial decryption may typically start while encryption is still in progress place. A token associated with a particular media purchase is used in the process in order to allow a scalable, secure content delivery system which allows multiple active content delivery sessions.

Figure 14:
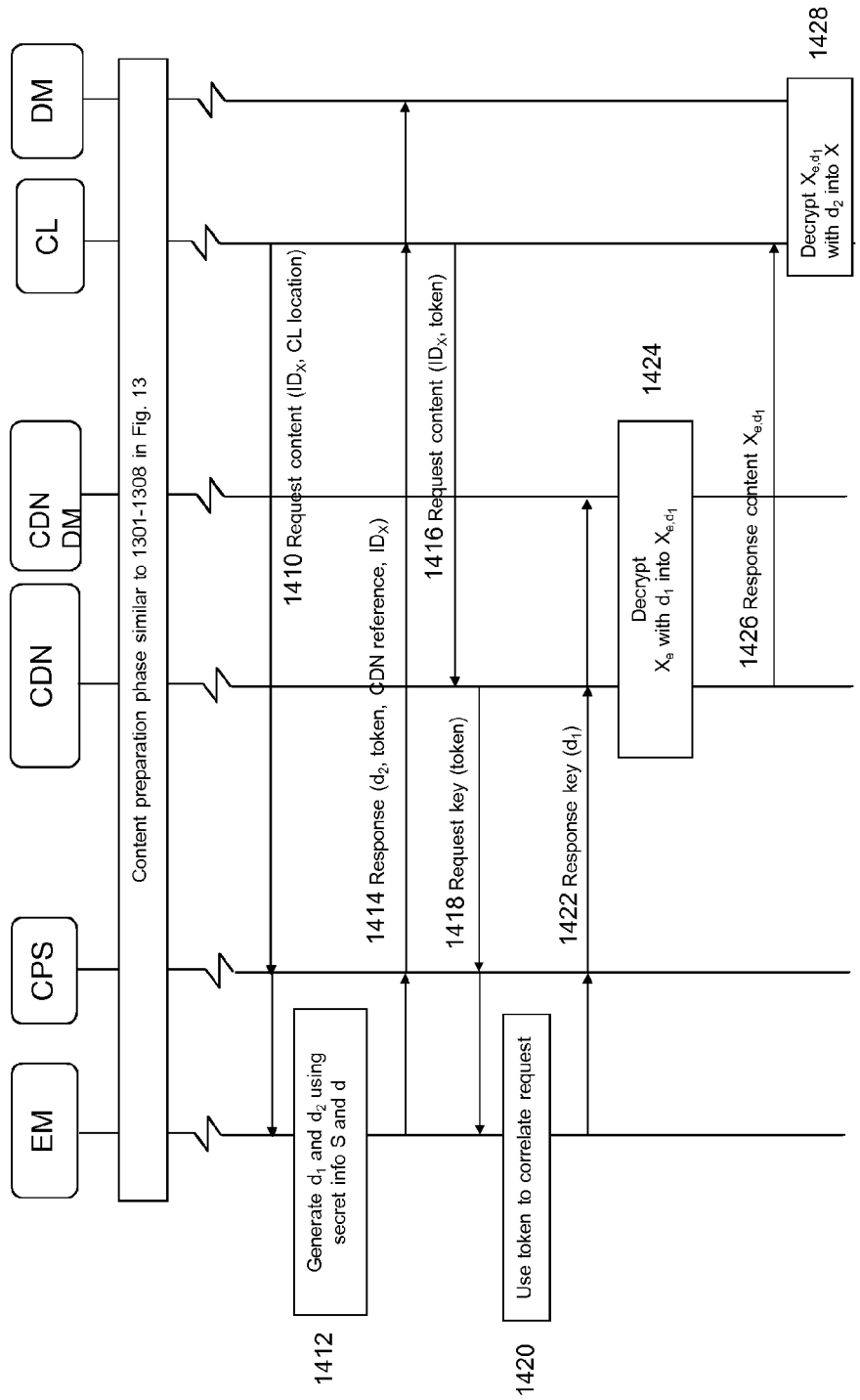
FIG. 14 depicts a schematic of protocol flow of a content delivery system using a split-key cryptosystem according to another embodiment of the invention.

FIG. 14 depicts a schematic of protocol flow of a content delivery system using a split-key cryptosystem according to another embodiment of the invention. In this embodiment, the content preparation phase, wherein encryption/decryption key pair e and d is generated on the basis of secret information and wherein the encrypted content $X_e$ is stored on a delivery node of a CDN, may be identical or similar to the one described above with reference to FIG. 13 (in particular steps 1301-1308 of that figure).

After a consumer having purchased a particular video title, the (second) content delivery phase may start with a client in the CCU sending a content request to the CPS (step 1410). The content request may comprise a content identifier $ID_X$ associated with the video title and location information, e.g. an IP address, associated with the client. The CPS may relay the content request to the encryption module (EM), which may identify the secret information S and the decryption key d associated with the requested content $ID_X$ from the secure key database. Then, on the basis of the secret information and the decryption key, the encryption control unit may generate a split-decryption key pair $d_1$ and $d_2$ (step 1412) similar to step 1312 in the process depicted in FIG. 13. Also here, the split key pair is uniquely associated with the content request using a content session token, i.e. a unique identifier for identifying the content request session associated with the CCU, which is stored with the split-key pair and the secret information S in the key database of the encryption module.

The CPS may send a response message comprising the second split-decryption key $d_2$, the session token, a reference to the CDN (e.g. an URL) and the content identifier $ID_X$ via a secure channel to the client (step 1414). In one embodiment, the reference to the CDN and the content identifier may be coded into a single URL. The client may forward the split-decryption key $d_2$ to the encryption module (EM), which may store the key in a secure memory.

The client may then send a second content request comprising the token and the content identifier $ID_X$ to the CDN (step 1416) as identified by the CDN reference received by the client. The CDN may determine from which delivery node the requested (encrypted) content will be delivered.

The CDN may send a key request comprising the token to the CPS (step 1418). It may request the first split-decryption key $d_1$ from the encryption module, which may retrieve this key from the secure key database on the basis of the token (step 1420). The CPS may send the first split-decryption key $d_1$ via a secure channel to the CDN decryption module (step 1422). In this embodiment, the token is not necessarily needed to correlate steps 1418 and 1422 as the underlying protocol (e.g. HTTP) may be used to correlate this request-response pair.

In embodiments of the invention, step 1422 may also comprise the sending of a DRM-instruction identifier. The DRM-instruction identifier may for example instruct the CDN which DRM system applies to the content item, or simpler which decryption algorithm should be used for partially decrypting the content item $X_e$ using the first split-decryption key $d_1$. The DRM-instruction identifier may optionally be encoded in the content session token.

The CDN may invoke the CDN decryption module via the secure interface to partially decrypt the identified encrypted content $X_e$ using split-decryption key $d_1$ into partially decrypted content item $X_{e,d1}$ (step 1424). The CDN may send $X_{e,d1}$ to the client in the CCU (step 1426). In this embodiment, the token is not needed to correlate steps 1416 and 1428 as the underlying protocol (e.g. HTTP) would already correlate this request-response pair. After (or while) receiving the $X_{e,d1}$, the client may forward it to the decryption module of the CCU where it is fully decrypted using second split-decryption key $d_2$ (step 1428).

Figure 15:
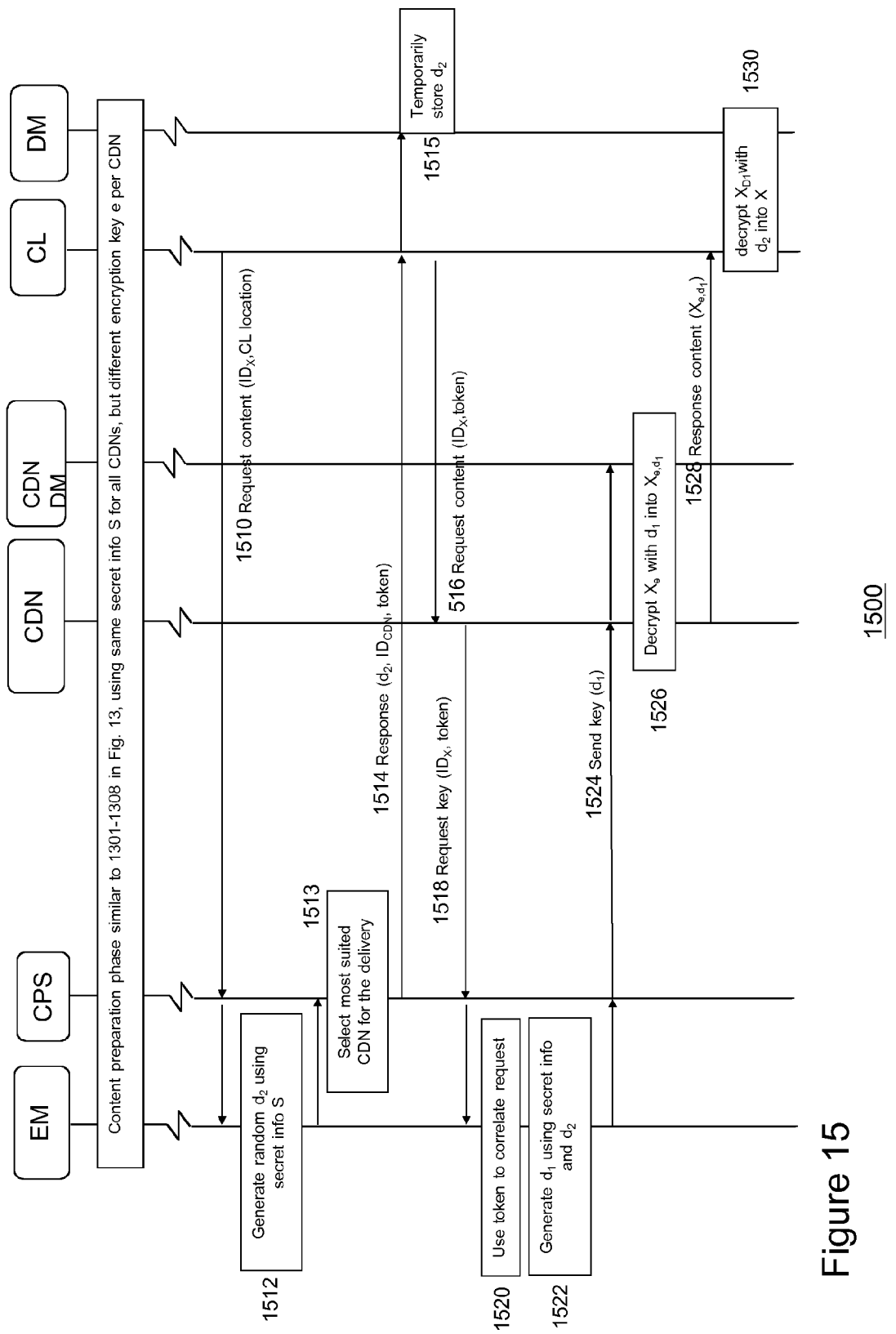
FIG. 15 depicts a schematic of protocol flow of a content delivery system using a split-key cryptosystem according to yet another embodiment of the invention.

FIG. 15 depicts a schematic of protocol flow of a content delivery system using a split-key cryptosystem according to yet another embodiment of the invention. In this embodiment, instead of sending content to one CDN, the CPS may send the same content in encrypted form to several different CDNs. In that case, on the basis of the same secret information S different encryption/decryption key pairs e and d may be generated so that for each CDN the content is encrypted $X_e$ on the basis of a different encryption key e.

For each CDN the content preparation phase may include process steps similar to those described above with reference to FIG. 13 (see in particular steps 1301-1308 of this figure). Note that for multiple CDNs, the secret information S would be generated only one time, whereas the other aspects of steps 1301-1308 are repeated for each CDN.

The second content delivery phase may start with a client in a CCU sending a content request to the CPS (step 1510). The content request may comprise a content identifier $ID_X$ associated with the video title (or stream) and location information, e.g. an IP address, associated with the client. The CPS may invoke the encryption module, which may identify and retrieve secret information S associated with the requested content $ID_X$ from the secure key database. Then, on the basis of secret information S, the encryption control unit may generate a random first split-decryption key $d_2$ (step 1512). The first split-decryption key may be uniquely associated with the content request using a content session token, i.e. a unique identifier for identifying the content request session associated with the content consumption unit. The first split-decryption key $d_2$ and the token may be stored together with the secret information S in the secure key database of the encryption module.

The encryption module may send a response message comprising the first split-decryption key $d_2$ and the session token to the CPS. The CPS may use the location information to select a CDN identified by $ID_{CDN}$ that would be the most suited to deliver the content to the client from the set of CDNs comprising the encrypted content to the client (step 1513). The response of the CDN sent to the client in the CCU may comprise first split-decryption key $d_2$, the token and the identity of the selected CDN, $ID_{CDN}$ for redirection (step 1514). The client may forward the split-decryption key $d_2$ to the decryption module DM, which may store the key in a secure memory (step 1515).

Thereafter, the client may send a second content request comprising the token to the selected CDN $ID_{CDN}$ (step 1516). The CDN may identify and locate the requested (encrypted) content and send a key request comprising the token to the CPS (step 1518), which subsequently forwards the request to the encryption module.

Using the token, the encryption module may correlate the request with the secret key information S and the split-encryption key $d_2$ stored in the secure key database (step 1520) and generate first split-decryption key $d_1$ on the basis thereof (step 1522). The CPS may forward the split-decryption key $d_1$ obtained from the encryption module via a secure channel to the CDN (step 1524). In this embodiment, the token is not needed to correlate steps 1518 and 1524, as the underlying protocol (e.g. HTTP) may be used to correlate this request-response pair.

The CDN may invoke the CDN decryption module via the secure interface to partially decrypt the identified encrypted content $X_e$ using split-decryption key $d_1$ into partially decrypted content item $X_{e,d1}$ (step 1526). $X_{e,d1}$ may be sent to the client (step 1528), which forwards the content to the decryption module where it is fully decrypted using $d_2$ (step 1530). In this embodiment, the token is not needed to correlate steps 1516 and 1528 as the underlying protocol (e.g. HTTP) may be used to correlate this request-response pair.

Hence, in this embodiment the split-decryption key $d_1$ may be generated only after generation of the split-decryption key $d_2$ and transmission of $d_2$ to the encryption module in the CCU. Moreover, this embodiment allows the content provider to send differently encrypted versions of the same content to different content distributors.

Hence, from the above it follows that the split-key cryptosystem provides a secure content delivery system wherein content item X in a CDN domain is never fully decrypted. Moreover, encrypted content that is stored in a CDN cannot be decrypted with any key that is in possession of the CDN. Each consumer is provided with a uniquely encrypted version of the content, which may only be decrypted with an associated unique decryption key. Hence, in case information is leaked, the CPS may easily trace this information back to the consumer it belongs to, and to the CDN that delivered it to that consumer.

Furthermore, each time a split-key is required, a request is sent to the encryption module, so that the CPS may monitor the delivery of the content via a CDN to a large number of CCUs.

Figure 16:
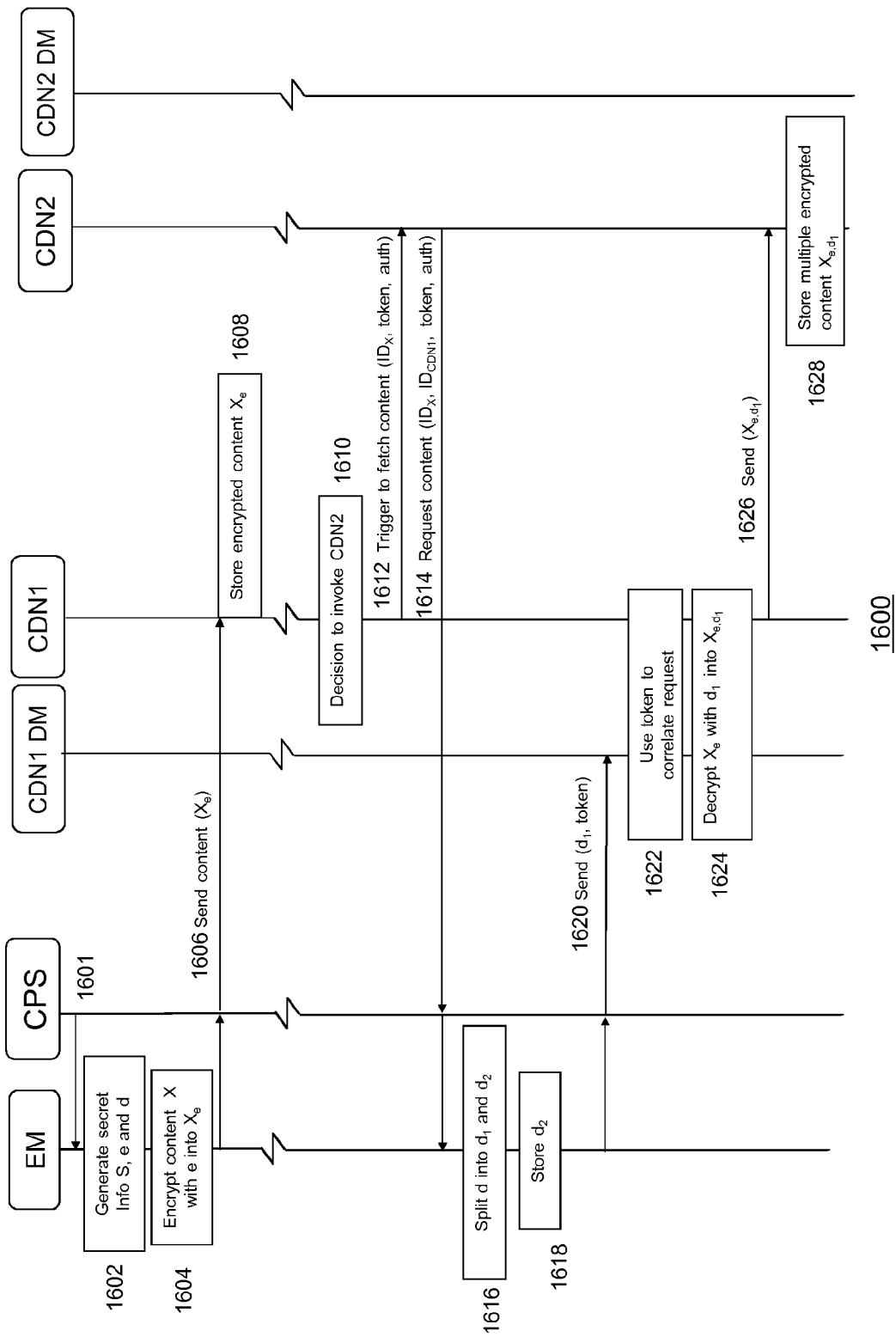
FIG. 16 depicts a schematic of a protocol flow of a content delivery system using a split-key cryptosystem according to an embodiment of the invention.
Figure 17:
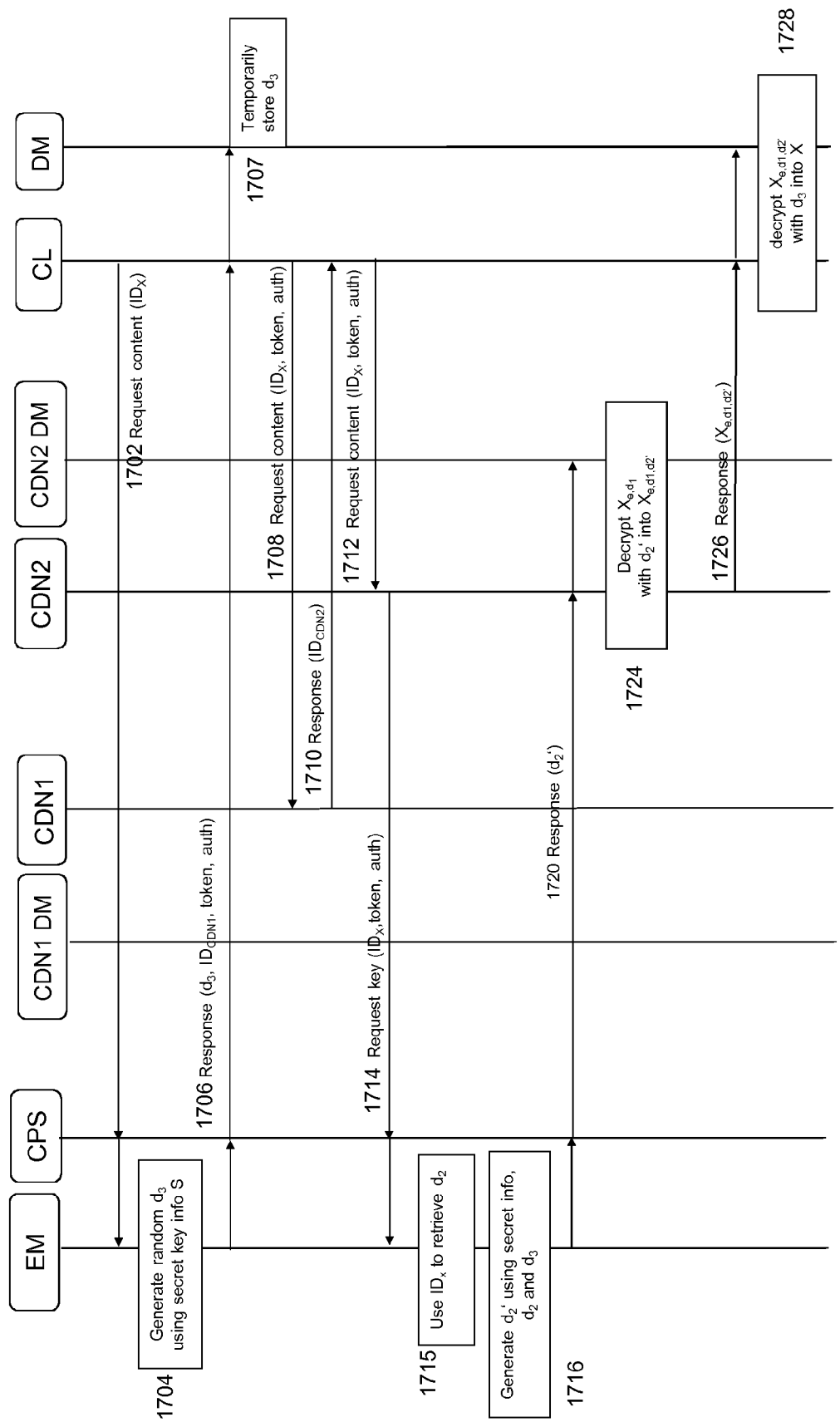
FIG. 17 depicts a schematic of a protocol flow of a content delivery system using a split-key cryptosystem according to an embodiment of the invention.

FIGS. 16 and 17 depict schematics of protocol flows of a content delivery system using a split-key cryptosystem according to yet another embodiment of the invention. In particular, in the embodiments described by FIGS. 16 and 17, the delivery of a content item is outsourced by a first CDN (the upstream CDN, also referred to as the uCDN) to a second CDN (the downstream CDN also referred to as the dCDN). As shown below, in that case a split-key cryptosystem with k=3 (i.e three split-decryption keys) may be used to enable secure delivery of content items to a CCU.

FIG. 16 depicts a schematic of a protocol flow associated with the content preparation phase wherein encrypted content originating from a content source may be ingested by an upstream CDN (uCDN) where after the upstream CDN (uCDN) may invoke a downstream CDN (dCDN) for the ingestion of the content.

In a content preparation phase, the process may start with the CPS triggering the encryption module (EM) to encrypt a content item X, e.g. a particular video title or stream, associated with a particular content identifier $ID_X$ (step 1601). In response, the encryption module may generate encryption key e and decryption key d on the basis of secret information S. The secret information S, e and d are stored together with the content identifier $ID_X$ in the secure key database of the encryption module (step 1602).

Then, an encryption algorithm E in the encryption module may encrypt content X into encrypted content $X_e$ on the basis of encryption key e (step 1604). The encrypted content may be ingested by a first content delivery network CDN1 (step 1606) (the upstream CDN (uCDN)), which may store the ingested encrypted content in a particular storage (step 1608). Note that step 1606 may be composed of several sub-steps, e.g. a trigger from the CPS to CDN1, a content-ingestion request from CDN1 to the to the CPS and the actual content ingestion step again from the CPS to the CDN.

In one embodiment, the CDN control function (CDNCF) may distribute one or more copies of the content to one or more delivery nodes such that throughout the CDN sufficient bandwidth for content delivery to content consumption units is guaranteed. The locations of the delivery nodes where the encrypted content is stored are stored in a location database.

Then, at a certain moment the CDNCF of CDN1 may decide to outsource the distribution of the encrypted content $X_e$ to a second content delivery network CDN2 (the downstream CDN) (step 1610). To that end, CDN1 (uCDN) may send an ingest trigger to CDN2 (dCDN) in order to start the ingestion process of encrypted content $X_e$ (step 1612). The trigger may comprise content identifier $ID_X$ and a token. The trigger may also comprise authentication information "auth" that authenticates the intention of CDN1 to distribute encrypted content to CDN2. The trigger may also comprise the identity of the CPS and/or encryption module in case CDN1 and CDN2 provide their CDN services to multiple content providers.

In response to the trigger, CDN2 may send a content request to the identified CPS, which may comprise $ID_X$, the token, and an identifier $ID_{CDN1}$ associated with the upstream CDN1 (uCDN) (step 1614). The content request may also contain authentication information "auth" that authenticates the intention of CDN1 to distribute encrypted content to CDN2.

In response to the request, the CPS may invoke the encryption module to generate a split-encryption key pair $d_1$ and $d_2$ on the basis of secret information S and d (step 1616) and to store second split-decryption key $d_2$ together with $ID_X$ in the secure key database (step 1618). The CPS may send a response comprising the first split-decryption key $d_1$ retrieved from the encryption module, and the token via a secure channel to the CDN1 (step 1620).

In embodiments of the invention, step 1620 may also comprise the sending of a DRM-instruction identifier. The DRM-instruction identifier may for example instruct the CDN which DRM system applies to the content item, or simpler which decryption algorithm should be used for partially decrypting the content item $X_e$ using the first split-decryption key $d_1$. The DRM-instruction identifier may optionally be encoded in the token.

The CDN1 may invoke the CDN1 encryption module via the secure interface and locate the encrypted content item on the basis of the token and content identifier $ID_X$ (step 1622). The CDN encryption module may then partially decrypt the encrypted content on the basis of $d_1$ into partially decrypted content item $X_{e,d1}$ (step 1624). The thus partly decrypted content may be sent to the downstream CDN2 (step 1626) where it is stored (step 1628) for future delivery.

Note that step 1626 may be composed of several sub-steps, e.g. a response from CDN1 to CPS that $X_{e,d1}$ is available for distribution, a response from CPS to CDN2 announcing the availability of $X_{e,d1}$ from CDN1, a request from CDN2 to CDN1 for double encrypted content $X_{e,d1}$ and a response from CDN1 to CDN2 distributing $X_{e,d1}$ to CDN2.

FIG. 17 depicts a schematic of a protocol flow 1700 associated with the content delivery phase wherein a consumer requests first CDN1 delivery of a content item, wherein the delivery of that content item is outsourced by said first CDN1 to a second CDN2.

The process may start with a consumer having purchased content item $ID_X$ so that a client in a content consumption unit may send a first content request comprising $ID_X$ to the CPS (step 1702). The request may trigger the EM to generate a random third split-decryption key $d_3$ based on secret information S (step 1704), which may be stored in the key database of the encryption module. In response, the CPS may send a response comprising $d_3$ (retrieved from the encryption module), $ID_X$, a identifier $ID_{CDN1}$ (for redirection) associated with the upstream CDN1 (uCDN) and a token to the client (step 1706). The response may also contain authorization information "auth" that contains the authorization from CPS to deliver the content to the specific client. The third split-decryption key $d_3$ may be stored in a secure memory of the decryption module DM of the CCU (step 1707).

The client may then send a second content request comprising $ID_X$, a token to the identified upstream CDN1 (uCDN), and optionally the previously received authorization information (step 1708). As CDN1 has outsourced the delivery of the content item identified by $ID_X$ to a second downstream CDN2, it may send a response back to the client comprising a reference $ID_{CDN2}$ for redirection to the downstream CDN2 (step 1710). The content request may then be redirected to CDN2 (step 1712). Note that CDN1 may take its decision to redirect to CDN2 on a per-transaction basis. CDN1 would only redirect to CDN2 for a client request that would be better served (proximity, availability) by CDN2. CDN2—upon receipt of the request—will send a key request comprising $ID_X$ and the token to the CPS (step 1714), which is forwarded to the encryption module.

The encryption module may retrieve the second split-decryption key $d_2$ on the basis of $ID_X$ and the token (step 1715), and subsequently generate split-key $d_2'$ on the basis of the secret information S, $d_2$ and $d_3$ (step 1716). The CPS would retrieve $d_2'$ in a response from the encryption module and send it via a secure channel to CDN2 (step 1720). In this embodiment, the token is not needed by the CDN2 to correlate steps 1714 and 1720 as the underlying protocol (e.g. HTTP) may be used to correlate this request-response pair.

In embodiments of the invention, step 1720 may also comprise the sending of a DRM-instruction identifier. The DRM-instruction identifier may for example instruct the CDN which DRM system applies to the content item, or simpler which decryption algorithm should be used for partially decrypting the content item $X_{e,d1}$ using the split-decryption key $d_2'$.

Then, CDN2 may invoke the CDN2 decryption module via the secure interface to locate the encrypted content item $X_{e,d1}$ on the basis of the token and to further decrypt $X_{e,d1}$ using $d_2'$ into partially decrypted content $X_{e,d1,d2'}$ (step 1724). The thus partially decrypted content item may be sent to the client (step 1726) of the CCU, which may invoke its decryption module DM for decryption into plaintext content X using split-decryption key $d_3$ (step 1728). In this flow diagram, steps 1702, 1706, steps 1708,1710, steps 1712,1726, and steps 1714,1720 may form request-response pairs, e.g. using the HTTP protocol.

Hence, from the above flow diagram, the effect and advantages associated with the split-key cryptosystem clearly derivable. In particular, from the above flow diagrams it follows that during the delivery of the content to a CCU, the content provider is in full control of the key information. The content provider may follow the delivery of the content via the various key requests it receives from the CDNs. Moreover, in case of delivery via more than one CDN (e.g. a "CDN network"), each CDN may be provided with its own split-key. This allows a content provider the possibility to ensure that the content is delivered through the correct path in the network thereby reducing the risk of fraud, and enabling the identification of a CDN that has inadvertently leaked encrypted content.

It is remarked that in the protocol flows above, the transmission of split-key information to CDNs and CCU may include the use of a split-decryption control message comprising a split-decryption key and, optionally, additional information needed by a decryption module to perform a split-decryption operation. This additional information may depend on the type of cipher (e.g. RSA, EG, DJ, etc.) used in the split-key cryptosystem (see e.g. table 1 for more details).

Figure 18:
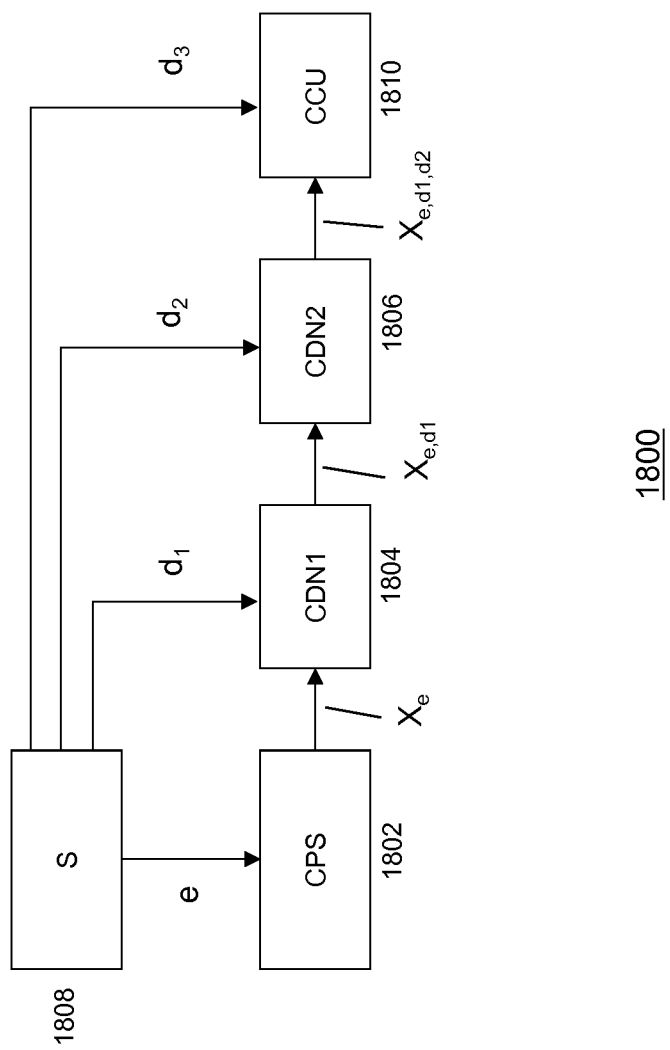
FIG. 18 depicts a secure content distribution system according to another embodiment of the invention.

FIG. 18 depicts a secure content distribution system 1800 according to another embodiment of the invention. The content distribution system may comprise a CPS 1802, one or more content distributors 1804,1806, e.g. a first and second CDN, a secret key server 1808 comprising the secret key generator (as e.g. described with reference to FIG. 2) and a CCU 1810.

In this particular case, the network address of the key server is different from the network address of the CPS, which is used for ingesting content into CDN1. The use of a separate key server, which may be a third-party key server, is advantageous as this way the ingestion processes cannot hinder the key distribution processes. Moreover, a separate key server also provides a scalable solution as the key generation and distribution processes occur much more often than ingestion processes. Hence, when needed, two or more key servers may be assigned to one CPS in order to handle the key generation and distribution processes, or conversely, one key server may serve multiple CPS.

Figure 19:
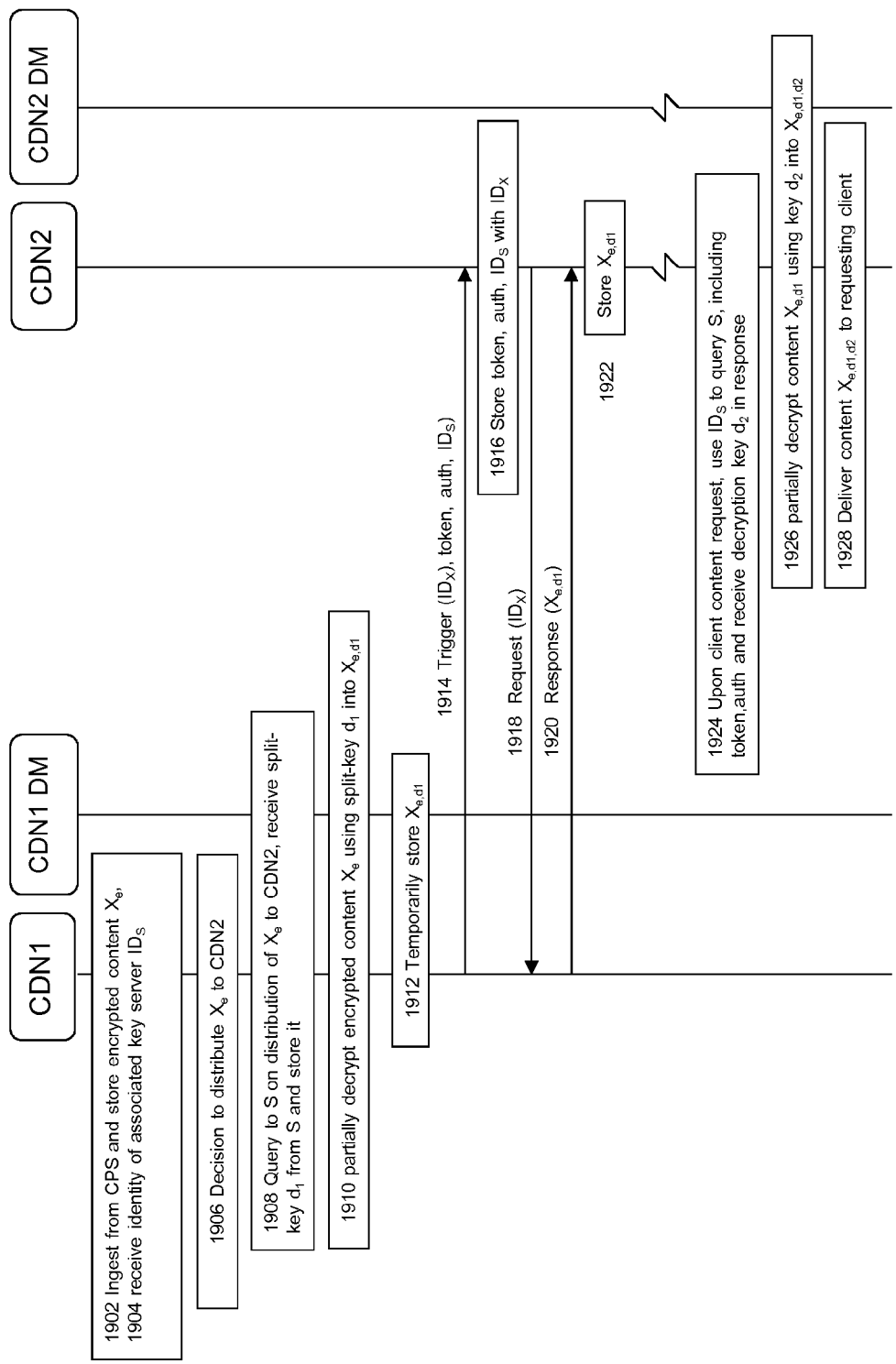
FIG. 19 depicts a secure protocol flow associated with a secure content distribution system according to an embodiment of the invention.

FIG. 19 depicts a protocol flow 1900 associated with a secure content distribution system, in particular a secure content distribution system as depicted in FIG. 18, according to an embodiment of the invention.

The process flow 1900 may start with a first step 1902 of CDN1 ingesting one or more encrypted content items originating from a CPS or another CDN and storing the encrypted content in a storage. CDN1 may further receive an identifier $ID_s$ identifying key server $ID_s$. The identifier may be an IP address or alternatively an URI, which may be resolved in an IP address using conventional resolution techniques, e.g. a DNS system.

Then CDN1 may decide to outsource distribution of content item $X_e$ to CDN2 (step 1906). CDN1 may therefore request a split-key $d_1$ from key server S. After having received the split-key $d_1$, the key is stored in a secure key database (step 1908).

On the basis of split-key $d_1$, encrypted content $X_e$ is partially decrypted into $X_{e,d1}$, which is temporarily stored in a storage (step 1912). Thereafter, in order to start the ingestion process, CDN1 may send an ingest trigger message comprising a content identifier $ID_X$ and the key server identifier $ID_s$ to CDN2 (step 1914). The ingest trigger message may further comprise a token and authentication information, and optionally a DRM flag to indicate (or flag) to the ingesting CDN2 that DRM procedures apply to the content item $X_{e,d1}$. The information in the trigger message may be subsequently stored in a storage (store 1916). The trigger message may initiate a content ingestion process, wherein CDN2 may send a content request message comprising content identifier $ID_X$ to CDN1 (step 1918), which in response may send a response message comprising partially decrypted content $X_{e,d1}$ to CDN2 (step 1920), which is subsequently stored in CDN2 (step 1922).

Then, when CDN2 receive a content request comprising content identifier $ID_X$ from a CCU, it may retrieve the associated key server identifier $ID_s$ and use that identifier to send a message to the identified key server for requesting an appropriate split-key $d_2$ for a second partial decryption operation onto $X_{e,d1}$ (step 1924). The message may further comprise a token and authentication information. Split-key $d_2$ may be used for partially decrypting $X_{e,d1}$ into $X_{e,d1,d2}$ (step 1926) before it is send to the CCU (step 1928) for full decryption. Hence, in this particular example, CDN1 (in particular the CDNCF of CDN1) is configured to send an ingestion request comprising an identifier ID, of the key server so that CDN2 is able to locate the key server and send requests for split-key information to the key server.

Figure 20:
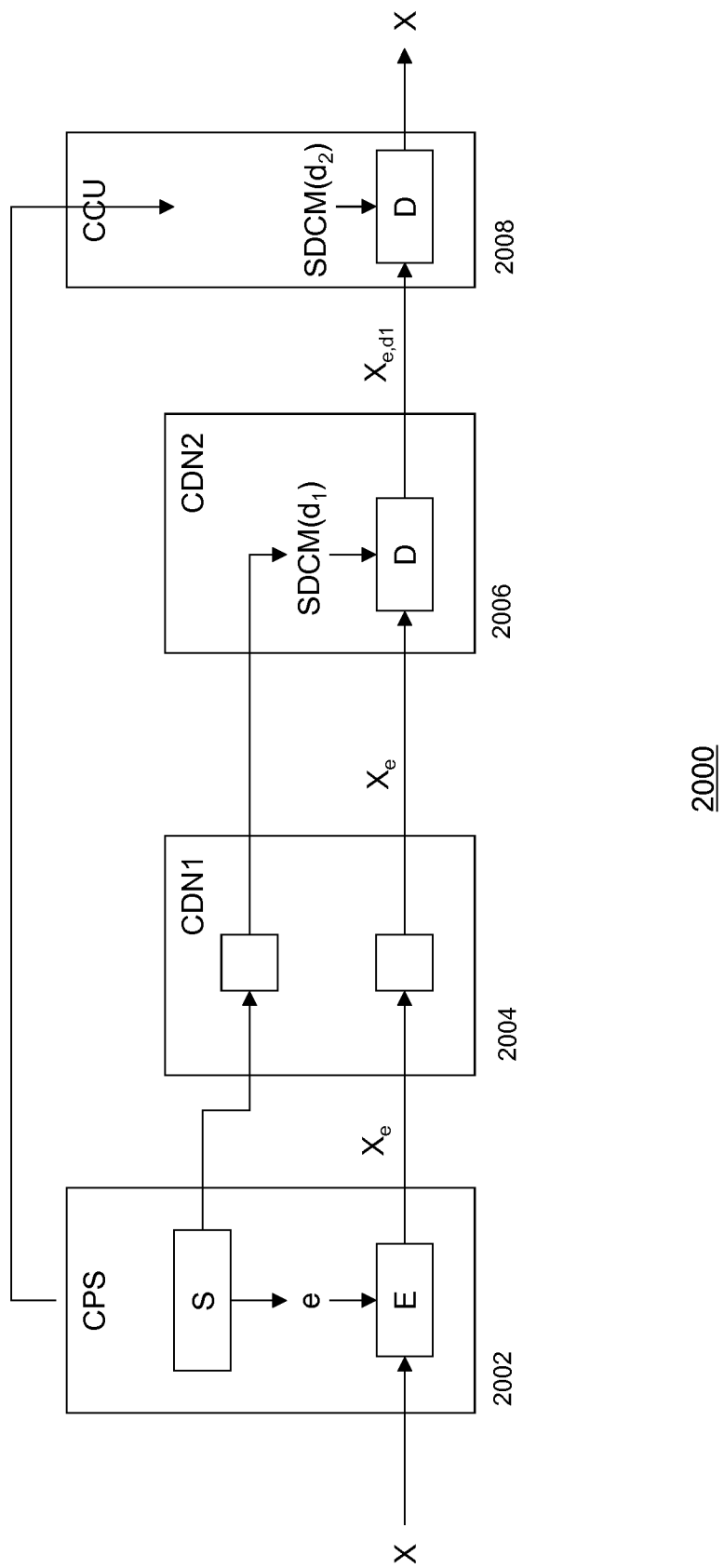
FIG. 20 depicts the use of a split-key cryptosystem in a content delivery system according to an embodiment of the invention.

FIG. 20 depicts the use of a split-key cryptosystem in a content delivery system comprising a network CDNs according to an embodiment of the invention. In particular, in this embodiment, content originating from a CPS 2002 may be securely delivered via a plurality of content distributors, i.e. least a first CDN1 2004 and second CDN2 2006, to a CUU 2008. In this embodiment, the CPS transmits encrypted content $X_e$ and split-key $d_1$ to CDN1, which may decide to outsource delivery of content to CDN2.

In contrast with the embodiment in FIG. 16, CDN1 does not delivery partially decrypted content $X_{e,d1}$ to CDN2. Instead, the request routing function 2010 of CDN1 "transparently" relays $X_e$ to CDN2. Similarly, it relays all information to further decrypt an encrypted content item X in an appropriate encryption container, in this case a split-decryption control message (SDCM), to CDN2. For example, when using an EG split-key cryptosystem the SDCM may comprise $d_1=(Y_1,Y_2)$ and p (see table 1 for an overview the different split-key cryptosystems).

When a consumer requests content item from the CPS, $d_2$ may be sent to the CCU and partially decrypted content $X_{e,d1}$ is sent to the CCU. Hence, in this embodiment, CDN1 screens all downstream CDNs from the CPS. This way, the CPS, and in particular the secret key generator associated with the CPS, only needs to have an interface with CDN1 and CCUs.

Figure 21:
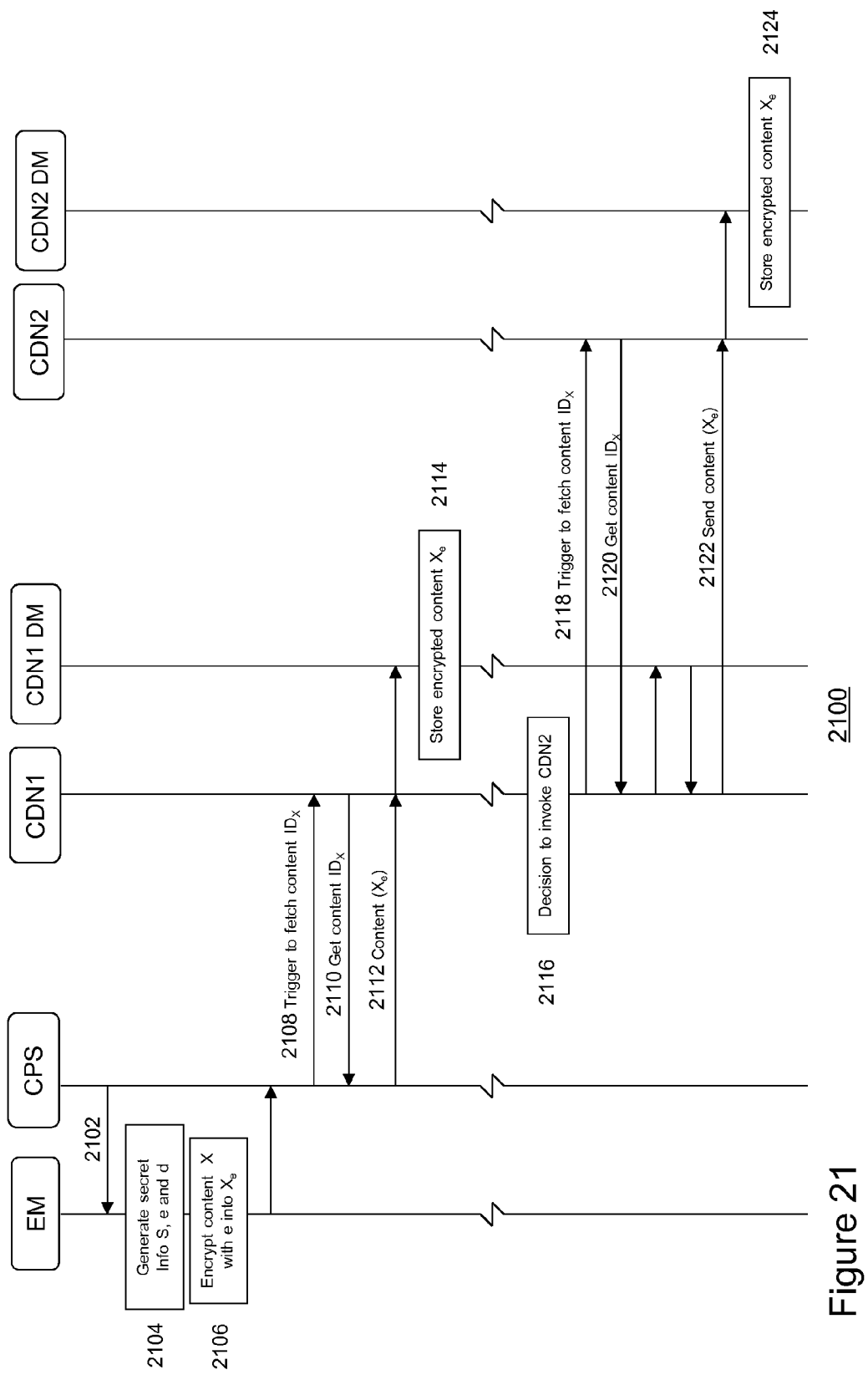
FIG. 21 depicts a schematic of protocol flow for use in a secure content delivery system according to one embodiment of the invention.

FIG. 21 depicts a schematic of protocol flow for use in a secure content delivery system as described with reference to FIG. 20 according to one embodiment of the invention. In this protocol flow content is first sent to CDN1, which subsequently forwards the content to CDN2 where it is stored for further delivery.

The process may start with the CPS triggering the encryption module EM (step 2102) to generate secret information S and an encryption/decryption key pair e,d (step 2104). The EM may subsequently encrypt content item X into encrypted content item $X_e$ (step 2106). Then, the CPS may send a ingest trigger to CDN1 (step 2108) in order to start the ingestion process of content item $X_e$ identified by content identifier $ID_X$ from the CPS into CDN1.

In embodiments of the invention the ingest trigger (signal) may comprise a DRM flag to indicate (or flag) to the ingesting CDN1 that DRM procedures apply to the content item $X_e$.

The content ingestion process may comprise sending a content request message comprising content identifier $ID_X$ to the CPS (step 2110) and sending a response message comprising encrypted content item $X_e$ to CDN1 (step 2112) which is subsequently stored in a storage (step 2114).

Then, at a certain moment the CDNCF of CDN1 may decide to outsource the distribution of the encrypted content $X_e$ to a second content delivery network, CDN2 (the downstream CDN) (step 2116). To that end, CDN1 may send an ingestion trigger to CDN2 in order to start the process of ingesting encrypted content $X_e$ into CDN2 (step 2118). The ingestion process may include a content request message comprising content identifier $ID_X$ (step 2120).

In embodiments of the invention the content request message (ingest trigger) may comprise a DRM flag to indicate (or flag) to the ingesting CDN2 that DRM procedures apply to the content item $X_e$.

Upon reception of the request, encrypted content is retrieved from the storage of CDN1 and sent in a response message to CDN2 (step 2122), where it is stored in a storage (step 2124).

This embodiment provides the advantage that the CPS only requires an interface with CDN1.

Figure 22:
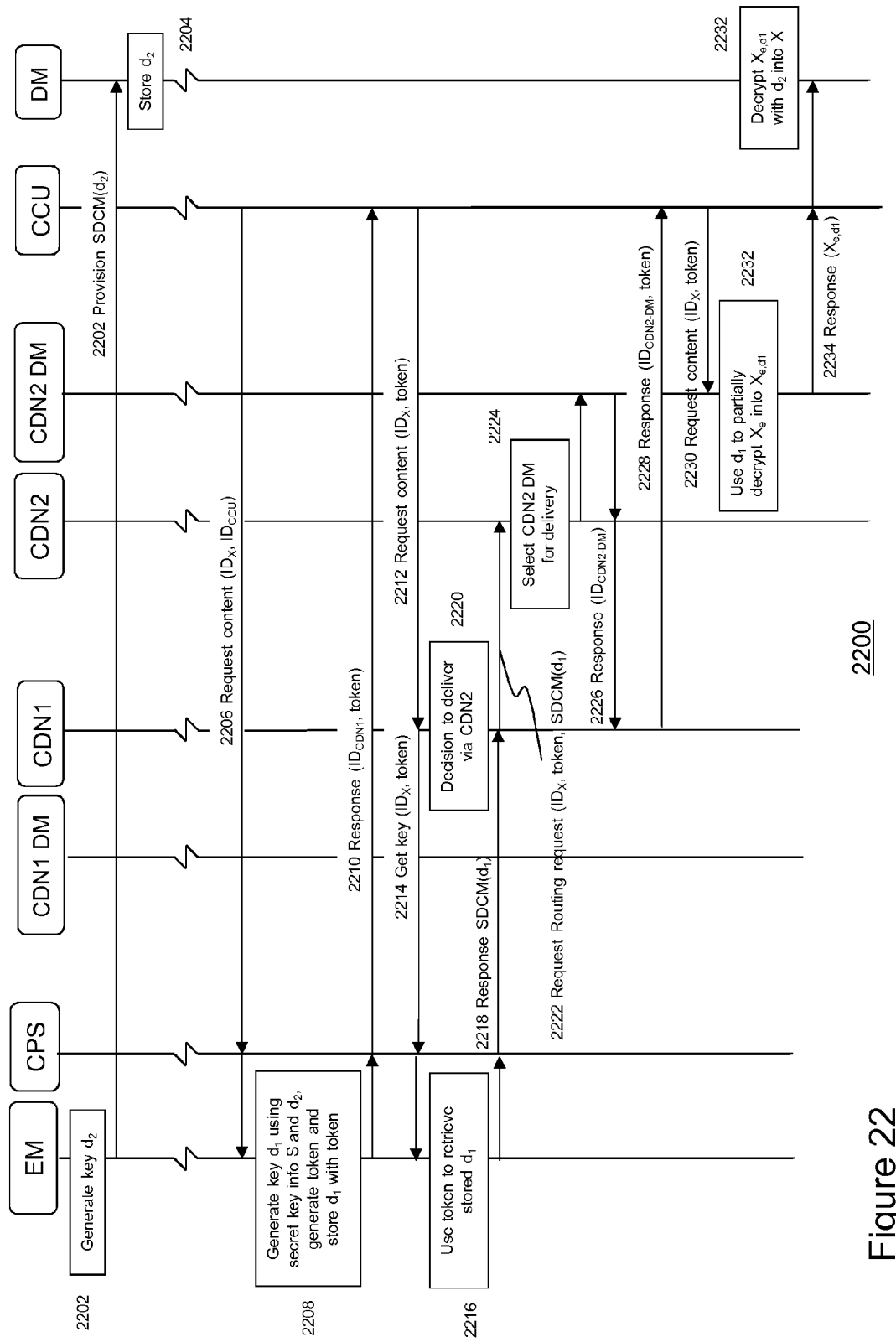
FIG. 22 depicts a schematic of protocol flow of a content delivery system an embodiment of the invention.

FIG. 22 depicts a schematic of protocol flow of a content delivery system as described with reference to FIG. 20 according to an embodiment of the invention. In this protocol flow content stored in CDN2 is delivered to a CCU. The process may start with the generation of a second split-key $d_2$ (step 2202) which is sent to the CCU in an appropriate encryption container, in this case a Split-Key Decryption Message comprising $d_2$ (SDCM($d_2$)) and all other (secret) information required for the particular implemented split-key cryptosystem (see table 1 for details). Split-key $d_2$ is stored in a secure storage of the decryption module of the CCU (step 2204).

Then, at some point in time, the consumer may decide to retrieve content item $ID_X$. To that end, the CCU may send a first content request comprising $ID_X$ and an identifier for identifying $ID_{CCU}$ to the CPS (step 2206), which may forward the request to the encryption module associated with the CPS. The encryption module may generate split-key $d_1$ using secret key info S and $d_2$, generate a token and store $d_1$ with token in a secure key database (step 2208). In response to the request, the CPS may send a response message comprising the token and an identifier $ID_{CDN1}$ identifying the CDN where the content item may be stored back to the CCU (step 2210). The CCU subsequently sends a second content request comprising the token and $ID_X$ to CDN1 (step 2212), which in response sends a key request message comprising the token and $ID_X$ via the CPS to the encryption module (step 2214), which uses the token to retrieve split-key $d_1$ (step 2216).

This split-key is sent back in SDCM($d_1$) message to the CDN1 (step 2218) where the CDN1 determines that the requested content item should be delivered via CDN2 (step 2220).

In embodiments of the invention, the SDCM($d_1$) message may also comprise a DRM-instruction identifier. The DRM-instruction identifier may for example instruct the CDN1 which DRM system applies to the content item, or simpler which decryption algorithm should be used for partially decrypting the content item $X_e$ using the split-decryption key $d_1$.

To that end, the routing request function of CDN1 (e.g. also referred to as uRCF) may generate a request routing message comprising $ID_X$, the token and SDCM($d_1$) which is sent to CDN2 (step 2222).

In embodiments of the invention, step 2222 may also comprise a DRM-instruction identifier. The DRM-instruction identifier may for example instruct the CDN2 which DRM system applies to the content item, or simpler which decryption algorithm should be used for partially decrypting the content item $X_e$ using the split-decryption key $d_1$ CDN2 subsequently selects the decryption module of CDN2 (CDN2 DM) for preparing the content for delivery to the CCU (step 2224). In response, CDN2 DM may send its identifier $ID_{N2-DM}$ to CDN1 (step 2226) which subsequently forwards $ID_{N2-DM}$ and a token to the CCU (step 2228), such that the CCU is able to send a third content request comprising $ID_X$ and the token to CDN2 DM (step 2230) in order to trigger CDN2 DM to partially decrypt encrypted content $X_e$ into $X_{e,d1}$ (step 2232) and to send $X_{e,d1}$ to the CCU (step 2234). The DM in the CCU may thereafter fully decrypt $X_{e,d1}$ into X on the basis of $d_2$ (step 2236).

Hence, in the embodiment described with reference to FIG. 20-22, the CPS only interacts with CDN1 and CDN1 outsources delivery of a content item by transparently forwarding encrypted content and a request routing message comprising the split-key information to CDN2.

The split-key crypto system for a secure content distribution system may also be used with so-called segmented content. Segmented content may comprise multiple associated content items, e.g. associated content files and/or streams. Each of these associated content items is hereafter referred to—in short—as a segment.

In one variant, segmented content may relate to content that is composed of time-segments. In a time-segmented system, content is played-out by playing time-segments in a particular time sequence. The HTTP adaptive streaming (HAS) protocol may be used to manage and play-such time-segments.

In another variant, segmented content may relate to spatially segmented content. For example, Mavlankar et al. describe in "An interactive region-of-interest video streaming system for online lecturing viewing", proceeding of ICIP 2010, p. 4437-4440 a so-called tiled video system wherein multiple resolution layers of a video content file are generated using a server-based interactive Region-of-Interest encoder. Every layer is divided into multiple spatial segments (also referred to as "tiles"), each of which can be encoded and distributed (i.e. streamed) independently from each other.

In yet another variant, segments may relate to files or streams associated with different bitrates or qualities such that one piece of content can be viewed at different bitrates or qualities (multi-rate encoding). A known quality-based content segmentation system is the so-called Scalable Video Coding (VCS) system. Further, a segment may relate to a so-called enhancement layer, which may be used in combination with a conventional content file or stream in order to produce a certain video enhancement effect, e.g. a segment comprising video data for enhancing the presentation of conventional presentation in order to produce e.g. 3D effects.

The above mentioned segmented content systems have in common that content may be organized in a number of segments, which may be formatted according to a known transport container format such as MPEG or AVI, which is suitable for streaming and organizing video data and associated metadata in a file structure.

The relation between associated segments may be described in a special data structure, which hereafter will be referred to as a manifest data structure, and which may be stored and identified using a specific manifest file associated with a name extension, e.g. *.mf, *.xml and *.m3u8. The manifest file may further comprise information about the locations and names of the locations where the different segments are stored (e.g. one or more delivery nodes and the names of the one or more CDNs to which this delivery nodes belong to). On the basis of the manifest file a client in a content consumption unit or a CDN may locate and retrieve segments associated with on particular video title.

A CDN may manage and distribute segmented content on the basis of certain parameters. For example, it may store popular segments on more than one delivery node in a CDN such that multiple accesses to those segments may be handled without the risk of overload situations. Moreover, in certain situations, segments may be retrieved from delivery nodes in another CDN domain.

Within one CDN domain, a CDNCF may manage the locations where segments may be retrieved. To that end, the CDNCF may use the content location database 1150. In one embodiment, the content location database may relate to an Asset Location Function (ALF) as described in ETSI TS 182 019.

Figure 23:
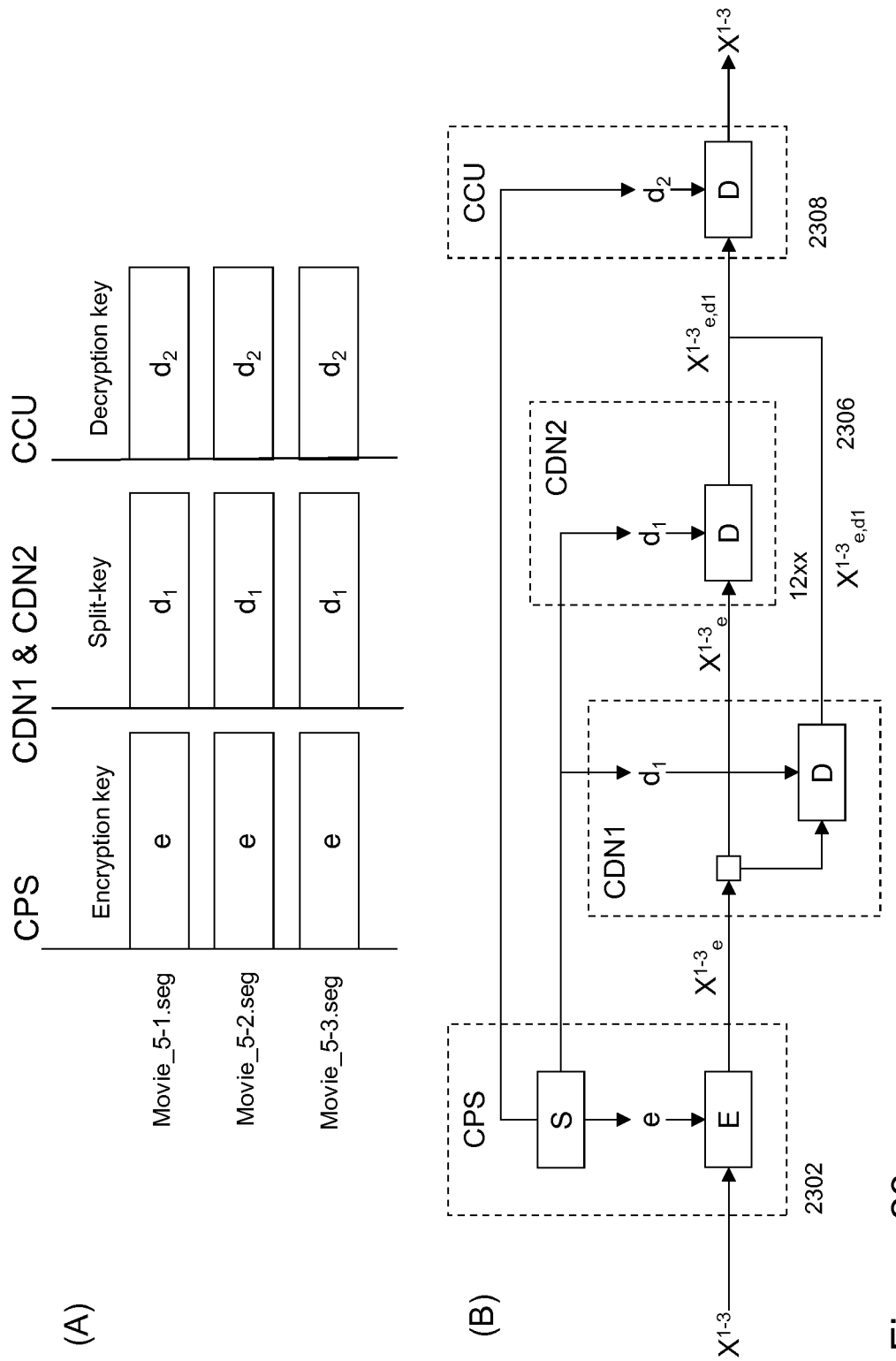
FIG. 23 (A) and (B) depict a schematic of a simple split-key cryptosystem for segmented content according to an embodiment of the invention.

FIGS. 23 (A) and (B) depict schematics of a simple split-key cryptosystem for segmented content according to an embodiment of the invention. In particular, FIG. 23(A) depicts a set of segment files Movie_5-1.seg, Movie_5-2.seg and Movie_5-3.seg which may be encrypted by content provider using encryption key e. Further, partial decryption key $d_1$ may be used by each CDN configured to deliver the segments to a particular content consumption unit, which may use decryption key $d_2$ to decrypt each segment.

Figure 24:
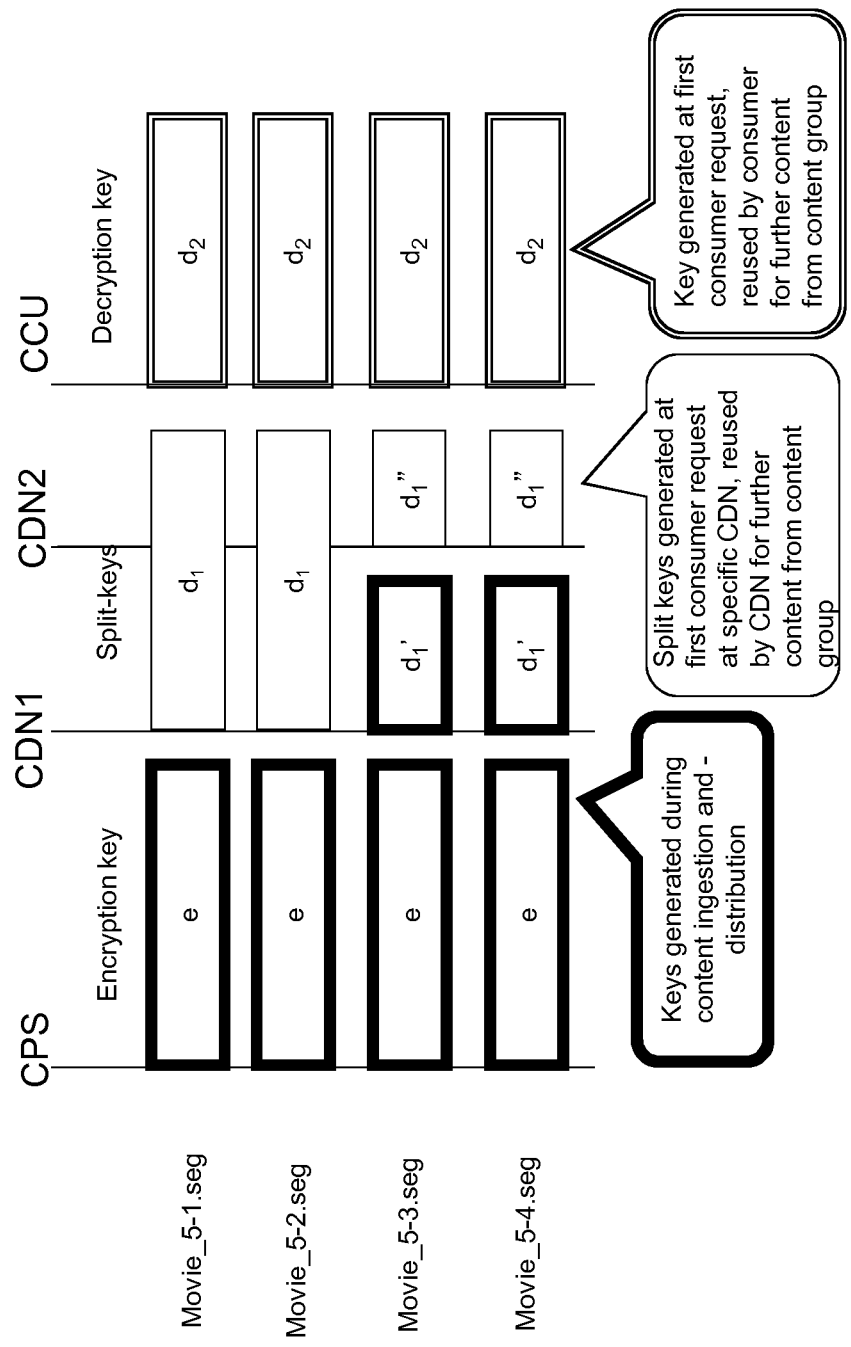
FIGS. 24 and 25 depicts a schematic of a split-key distribution scheme and split-key cryptosystem for distributing segmented content via a CDN to a content consumption unit according to an embodiment of the invention.
Figure 25:
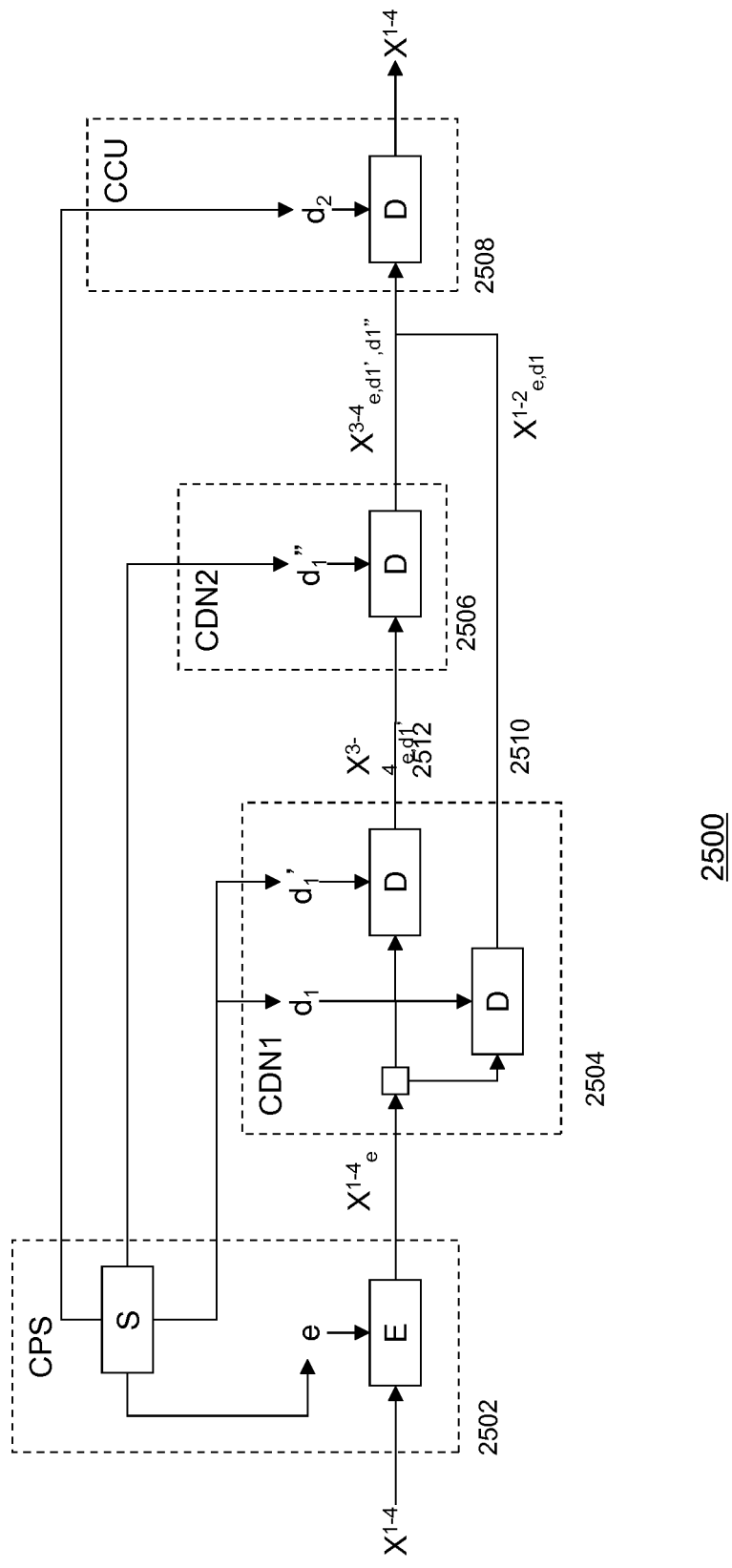

FIG. 23(B) depicts the accompanying key distribution scheme. Here, an example is provided wherein segment $X^{1-3}$ in a CPS 2302 encrypted in to into encrypted content $X^{1-3}_e$. This encrypted segment may be ingested by CDN1 2304 and by CDN2 2306. From this figure it is clear, that if the CCU requests encrypted content $X^{1-3}_e$ from CDN1, CDN1 will send a partially decrypted $X^{1-3}_{e,d1}$ to the CCU. Similarly, if CCU requests FIGS. 24 and 25 depict schematics of a split-key cryptosystem for distributing segmented content via a CDN to a content consumption unit according to an embodiment of the invention. In particular, FIG. 24 depicts four segment files which are processed in accordance with a predetermined split-key cryptosystem. Before ingestion of segments into CDN1, segments may be encrypted on the bases of encryption key e and stored as encrypted segments $X^{1-4}_e$ in CDN1. The other two segments $X^{3-4}_e$ stored in CDN1 may be partially decrypted on the basis of split-key $d_1$, into $X^{3-4}_{e,d1'}$ before (one of) those segments are (is) distributed to CDN2.

Then, if a consumer requests a particular segment, the CPS generates a split-key $d_2$, which is provided to the CCU of the consumer. If the CCU requests a segment $X^{1-2}$ stored at CDN1, split-key $d_1$ may be used for partially decrypting segments $X^{1-2}_e$ into $X^{1-2}_{e,d1}$ before it is sent to the CCU. If the CCU requests a segment $X^{3-4}$ stored at CDN2, split-key $d_1$" may be used for partially decrypting segments $X^{3-4}_{e,d1'}$ into $X^{3-4}_{e,d1',d''}$ before it is sent to the CCU. Thereafter, partially decrypted segments $X^{1-2}_{e,d1}$ and $X^{3-4}_{e,d1',d''}$ may be fully decrypted on the basis of a single split-decryption key $d_2$.

The technical advantage of this embodiment is that the CCU only requires one split-decryption key $d_2$ in order to fully decrypt multiple segments (or multiple pieces of content) independent whether these segments are received from CDN1 or CDN2.

Figure 26:
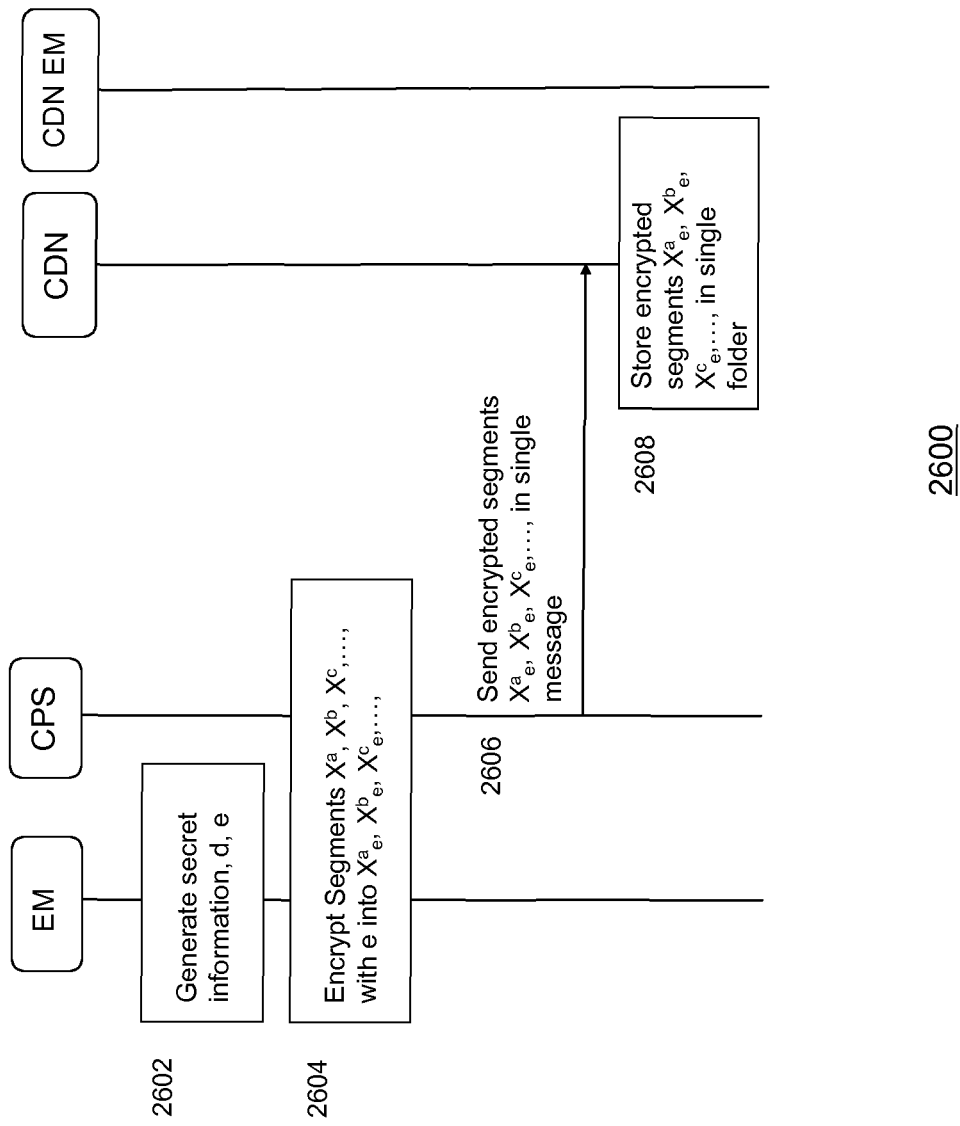
FIGS. 26 and 27 depict flow diagrams regarding the encryption and ingestion of segmented content into a CDN according to various embodiments of the invention.
Figure 27:
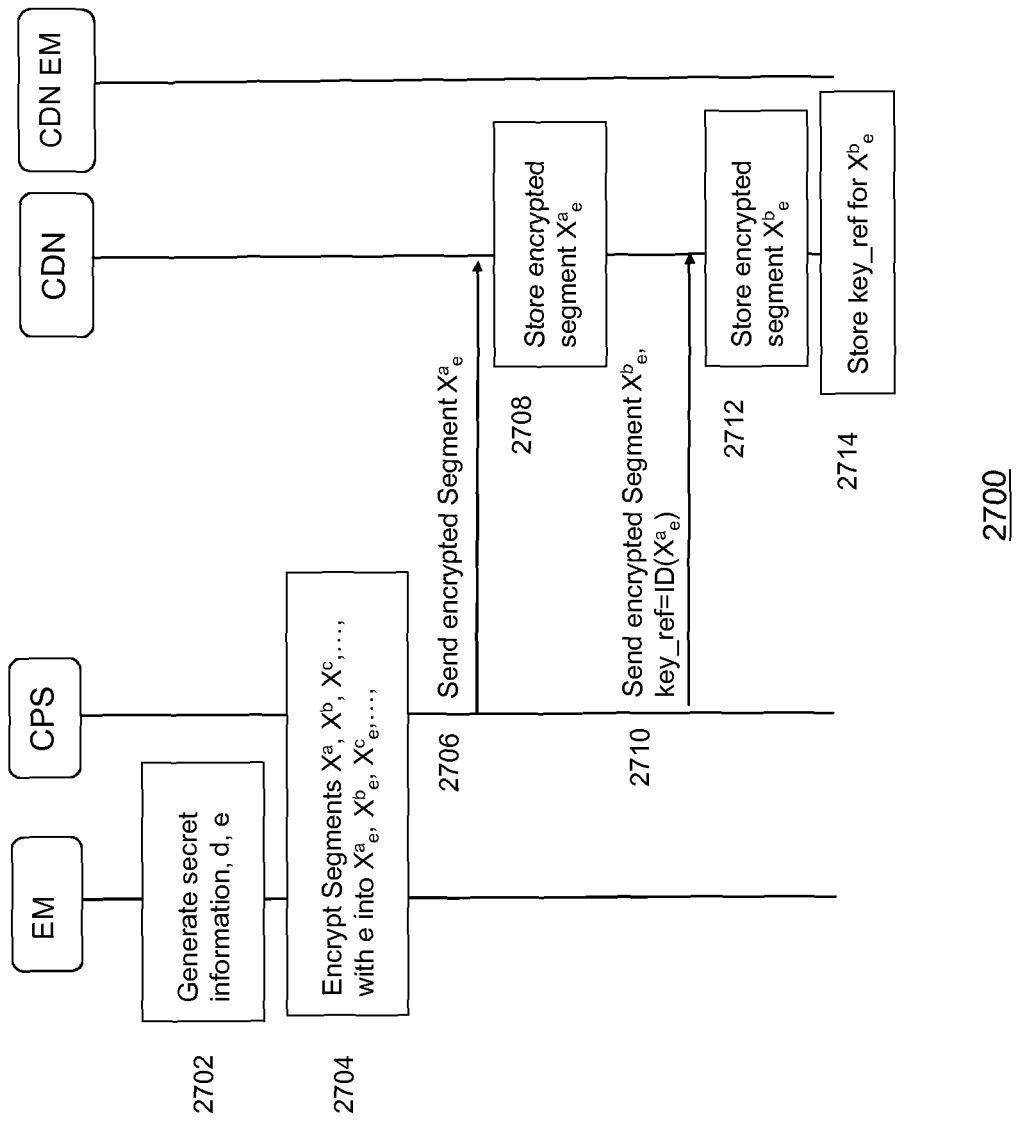

FIGS. 26 and 27 depict flow diagrams regarding the encryption and ingestion of segmented content into a CDN according to various embodiments of the invention. In particular, FIG. 26 depicts a flow diagram wherein in a first step 2602 encryption and decryption pair e,d is generated on the basis of secret information S. Then, in a further step 2604 multiple associated segments $X^a$, $X^b$, $X^c$, ..., e.g. segments associated with one video title or stream or independent pieces of content for which the CPS decides the same encryption may be encrypted with e into multiple encrypted segments $X^a_e, X^b_e, X^c_e$. The CPS may define these segments as a single segment group so that these encrypted segments may be efficiently addressed. For example, it may allow the encrypted segments to be sent in a single message to CDN (step 2606) and stored in a single location, e.g. a single folder, of the CDN (step 2608). Hence, defining a segment group as a large set of encrypted segments, which are all encrypted with the same encryption key e, allows efficient processing of the segments by the secure content protection system.

FIG. 27 depicts a flow diagram wherein in a first step 2702 encryption and decryption pair e, d is generated on the basis of secret information S and multiple associated segments $X^a, X^b, X^c$, ..., e.g. segments associated with one video title or independent pieces of content for which the CPS decides the same encryption, may be encrypted with e into multiple encrypted segments $X^a_e, X^b_e, X^c_e$ (step 2704). The CPS may send a first segment $X^a_e$ to the CDN (step 2706) where is stored at a particular location in the CDN (step 2708). Then, the CPS may send a subsequent encrypted segment $X^b_e$ to the CDN wherein the message comprises a key reference key_ref=ID($X^a_e$) to a previous segment $X^a_e$. The CDN may thereafter store the encrypted segment $X^b_e$ together with the key reference at a particular location in the CDN (steps 2712 and 2714). This process may then be repeated for all encrypted segments, each using the same key reference key_ref=ID($X^a_e$). The key reference is used to indicate a group of segments that has been encrypted with the same key. By using the key reference, the CDN knows that when it has received an encryption key $d_1$ from the CPS to encrypt encrypted segment $X^a_e$, it can use the same encryption key $d_1$ to encrypt encrypted segment $X^b_e$, so it does not have to request it (again) from the CPS.

This way the number of key requests may be reduced, thereby saving network capacity, and speeding up the encryption and the delivery of subsequent (double) encrypted segments. Additionally, as different associated segments may be stored at different location in the CDN, the association between the stored segments is provided by the key reference parameter, linking all subsequent segments to the first received one $X^a_e$.

Figure 28:
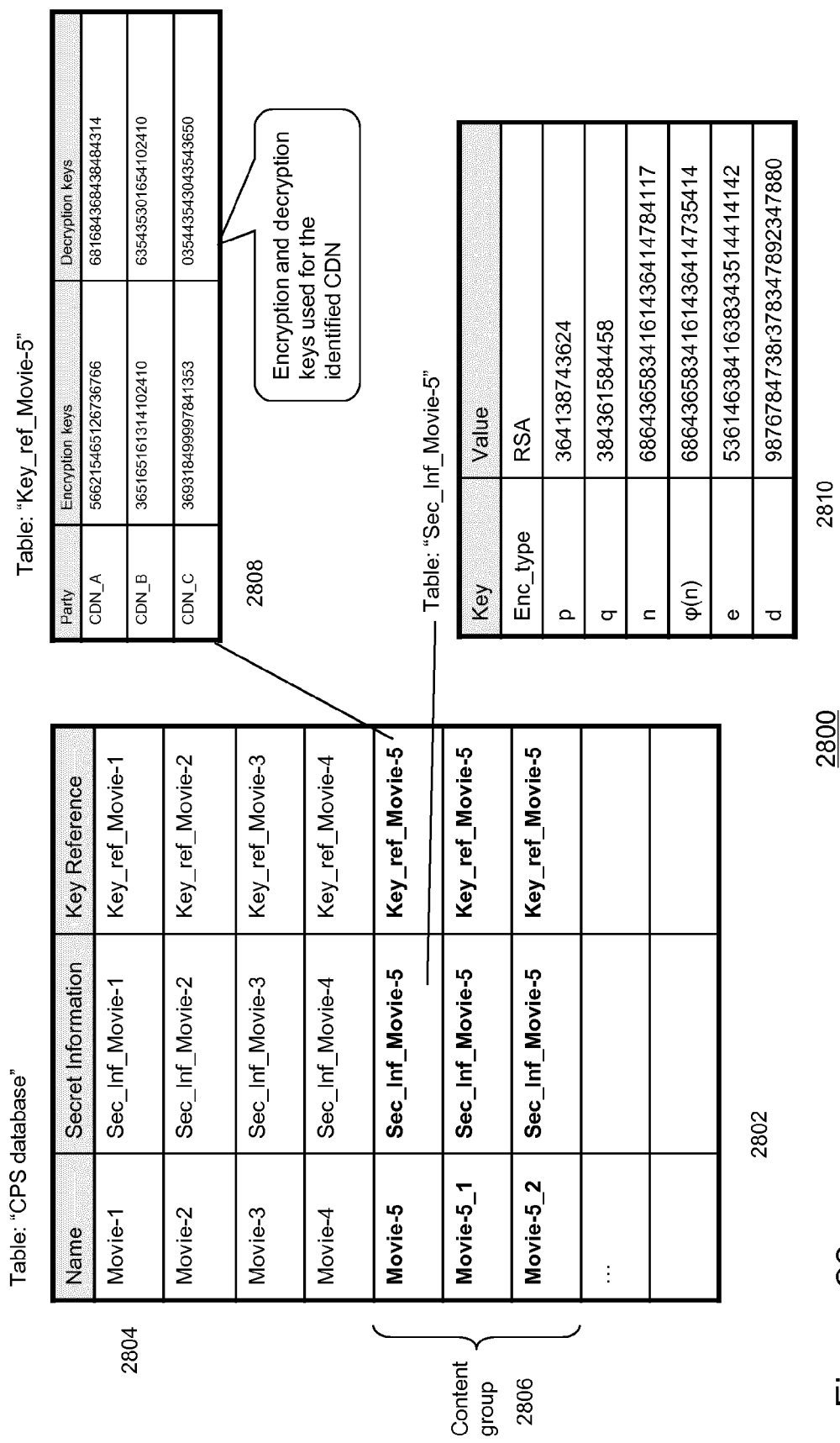
FIG. 28 depicts a secure key database associated with an encryption module according to one embodiment of the invention.

FIG. 28 depicts a secure key database associated with an encryption module according to one embodiment of the invention. In particular, it depicts a main CPS database table 2802 comprising entries 2804 associated with content items, which are or were processed by the CPS. Each entry may be associated with a file name with at least a reference to a secret information table and a key reference table. Some entries may relate to associated content items, e.g. segments defining a content group 2806.

The secret key information table 2810 may comprise information used by the split-key multiple encryption system to generate encryption/decryption pair e,d associated with a particular content item or content group. For example, the secure information table associated with content item "Movie-5" may include: the type of crypto cipher used, e.g. RSA, and the secret information that the crypto cipher requires to generate e,d such as prime numbers p,q etc.

Similarly, key reference table 2808 may include the encryption key $e_{CDNA}$, $e_{CDNB}$, $e_{CDNC}$, which are/were used by the Encryption module to perform the initial encryption of a particular content item (in this example content item "Movie-5") or content group before it is/was sent to the identified CDN, and the decryption keys $d_{CDNA}$, $d_{CDNB}$, $d_{CDNC}$ associated with those encryption keys. Note that these keys are never shared directly with a CDN or CUU in the split-key multiple encryption system, but they are used for key splitting, e.g. $d_{CDNA} \rightarrow d_{1(CDNA)}$, $d_{2(CDNA)}$.

FIG. 29 depicts a secure key database associated with a CDN decryption module according to one embodiment of the invention. In particular, it depicts a main CDN database table 2902 comprising entries 2904 associated with content items, which are or were processed by the CDN. Each entry may be associated with a file name with at least a reference to a location table and a key reference table. Some entries may relate to associated content items, e.g. segments defining a content group 2906.

Location table 2908 may include a list of URI's associated with locations where a copy of the particular content item is located (stored). In the example, content item "Movie-5_1" may be stored as a segment file Movie-5_1.seg at three different locations: two caches in CDNA and a particular cache in CDNB.

Key reference table 2910 may include split-key information, which is used by the CDN decryption module before a particular content item is sent to a content consumption unit or another CDN. For example, content item "Movie-5_1" may be sent to different CDNs (CDNB and CDNC) or different consumers (consumers 634, 511 and 122) using the split-keys listed in the table.

FIG. 30-32 depict so-called manifest files defining the relation between associated segments in a content group according various embodiments of the invention. Such manifest files may include a file name, an type indicator for indicating the type of segmentation (in this case spatial segmentation for tiled video), the number of segments in a content group, the spatial relationship between the segments and the file names of the segments, and a URI referring to the location of a cache of a CDN where a particular segment may be retrieved. In the examples provided in these figures, key information used by the split-key cryptosystem may be included in such manifest file.

The encryption module associated with a content provider may use a manifest file for storing encryption keys as illustrated in FIG. 30. This figure depicts two different types of manifest files 3002, 3004 comprising encryption keys. First manifest file 3002 may include an encryption key e, which is used to encrypt all segment files defined in the manifest file. Instead of the same encryption key for all segments in the segment group, each segment may be encrypted using a different encryption key as illustrated in the second manifest file 3004. Optionally, also the used encryption algorithm and the secret information may be stored in the manifest file. Manifest files comprising the encryption keys may be stored in the secure key database of the Encryption module.

Further, the encryption module associated with a content provider may use a manifest file for storing decryption keys as illustrated in FIG. 31. This figure depicts two different types of manifest files 3102, 3104 comprising decryption keys. First manifest file 3102 may include one decryption key for all segments in a segment group. Second manifest file 3104 may include a decryption key for each segment in the segment group defined in the manifest file.

Typically, an encryption module may generate a decryption key or decryption keys in response to a content consumption request of a consumer. The encryption module may further generate a manifest file including the decryption key(s) and/or split-decryption key(s) and send the thus generated manifest file via a secure channel to the content consumption unit, which may stored the manifest file in a secure memory associated with the decryption module.

The encryption module associated with a content provider may use a manifest file for storing split-keys used by the split-key cryptosystem as depicted in FIG. 32. This figure depicts two different types of manifest files 3202, 3204 comprising split-keys which are generated by the encryption module and send to a particular CDN encryption module, which uses the split-keys for further encrypting encrypted content items in response to a request for ingesting content from a first upstream CDN (uCDN) to a second downstream CDN (dCDN) and/or in response to a content consumption request originating from a content consumption unit (CCU, also referred to as UE).

To that end, the encryption module may be configured to generate the split-keys for a particular CDN, generate an associated manifest file, insert the split-keys into the manifest file and send the thus generated manifest file to the CDN encryption module of the targeted CDN. The CDN encryption module may store the manifest file in the secure CDN key database.

First manifest file 3202 may include one split-key for all segments in a segment group. Second manifest file 3204 may include a split-key for each or some segments in the segment group defined in the manifest file. Note that the thus generated manifest file for the CDN encryption module may include "empty" segments, which are not distributed by the addressed CDN.

The above-described manifest files thus provide an efficient data structure for efficient handling of split-key information associated with segmented content.

It is to be understood that in certain figures of this application, in particular FIGS. 15, 16, 17, 19, 21, 22 and 27, a CDN(1, 2) DM is shown to perform one or more steps according to embodiments of the invention. The above figures are understood to reflect that the CDN(1, 2) DM is a decryption module associated with a CDN. The separation of the CDN(1, 2) from the CDN(1, 2) DM in the figures serves to illustrate which steps according to certain embodiments of the invention may be executed by such a decryption module. The separation in the figures is not there to reflect that a CDN DM is necessarily located outside of the CDN. Generally speaking such decryption module may be located outside of the CDN (for instance hosted by a trusted party able to exchange content (items) with the CDN), or it may just be an integral part of the CDN, for instance located with (e.g. part of) a CDNCF, DCF, RCF or other function known in the art to be part of CDN, preferably an upstream and/or a downstream CDN.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The invention is not limited to the embodiments described above, which may be varied within the scope of the accompanying claims.

The invention claimed is:

1. Method for secure delivery of a content item from at least a first content distribution network (CDN1) to at least one content receiving entity using a split-key cryptosystem comprising an encryption algorithm E and a decryption algorithm D, a cipher algorithm for generating an encryption key e and a decryption key d on the basis of secret information and a split-key algorithm using the secret information for splitting e into i different split-encryption keys $e_1, e_2, \ldots, e_i$ and/or for splitting d into k different split-decryption keys $d_1, d_2, \ldots, d_k$ respectively;

wherein the split-key cryptosystem is further defined in that executing a number of consecutive encryption and decryption operations on content item X, applying E and split-encryption keys $e_1, e_2, \ldots, e_i$, and applying D and split-decryption keys $d_1, d_2, \ldots, d_k$ respectively, conforms to $D_{dk}(D_{dk-1}(\ldots(D_{d2}(D_{d1}(E_{ei}(E_{ei-1}(\ldots(E_{e2}(E_{e1}(X))\ldots))=D_{dk}(D_{dk-1}(\ldots(D_{d2}(X_{e1,e2,\ldots ei}))=X$ wherein $i, k \geq 1$ and $i+k>2$, the method comprising:

a content source providing said at least one CDN1 with at least one encrypted content item;

a key generator associated with said content source comprising said cipher and split-key algorithm generating first split-key information comprising at least one of said split decryption-keys and transmitting said first split-key information to said first CDN1, preferably to a first secure module associated with said CDN1;

generating a partially decrypted content item on the basis of said encrypted content item, said decryption algorithm and said first split-key information; and transmitting said partially decrypted content item to said content receiving entity.

2. Method according to claim 1 wherein said at least one content receiving entity is a content consumption unit, said method further comprising:

receiving a request from said content consumption unit or a content source for delivery of a content item to said content consumption unit;

said key generator generating second split-key information on the basis of said first split-key information;

transmitting said second split-key information to said content consumption unit;

decrypting said partially decrypted content item into a plaintext content item on the basis of the decryption algorithm and said second split-key information.

3. Method according to claim 1 wherein said content receiving entity is at least one second content delivery network (CDN2), said method further comprising:

sending a trigger signal for content ingestion to said second CDN2, preferably said trigger signal comprising a content item identifier and, optionally, a key server identifier identifying a key server comprising said key generator; and said second CDN2 sending a content ingestion request to said first CDN1.

4. Method according to claim 3 further comprising:

receiving a content request from a content consumption unit for delivery of a content item;

said key generator generating at least second split-key information on the basis of said first split-key information;

transmitting said second split-key information to said second CDN2, preferably to a second secure module associated with said second CDN2; and generating a further partially decrypted content item on the basis of said partially decrypted content item, said decryption algorithm and said at least second split-key information.

5. Method according to claim 4 further comprising:

generating third split-key information on the basis of said first and second split-key information;

transmitting said third split-key information to said content consumption unit;

transmitting said further partially decrypted content item to said content consumption unit; and said content consumption unit decrypting said further partially decrypted content item into a plaintext content item on the basis of the decryption algorithm and said at least third split-key information.

6. Method according to claim 1, wherein said split-key algorithm comprises a random split-key generating algorithm for generating first split-key information and a deterministic split-key generating algorithm for generating second split-key information on the basis of said first split-key information.

7. Method according to claim 1, wherein said first secure module comprises at least one split-key combiner and preconfigured split-key information or a random split-key generator, said method further comprising:
- combining said first split-key information and said preconfigured split-key information or a random split-key generated by said random split-key generator into combined split-key information; and
- generating a partially decrypted content item on the basis of said encrypted content item, said decryption algorithm and said combined split-key information.

8. Method according to claim 1 wherein said first secure module comprises at least a second split-key combiner and a random split-key generator, said method further comprising:
- said key generator generating second split-key information on the basis of said first split-key information and transmitting second split-key information to said CDN1;
- said random split-key generator generating random split-key information;
- combining said second split-key information and said random split-key information into combined split-key information; and
- said CDN1 transmitting said combined split-key information to said second CDN2.

9. Method according to claim 1 wherein said encrypted content item comprises multiple segments, each segment of the multiple segments being encrypted using the encryption key, wherein a manifest file comprises information about the locations and names of the locations where said encrypted segments can be retrieved.

10. Method according to claim 9 wherein first split-key information is associated with said multiple segments and wherein said first split-key information is inserted in said manifest file, which is sent to said first CDN1.

11. Method according to claim 1 wherein said encryption and decryption algorithms are based on one of the one-time path, LFSR stream cipher, RSA, ElGamal or Damgard-Jurik cryptosystems.

12. A computer program product comprising software code portions configured for, when run in the memory of a computer, executing the method steps according to claim 1.

13. Method for secure delivery of a content item via at least a first and second content distribution network (CDN1, CDN2) to at least one content receiving entity using a split-key cryptosystem comprising an encryption algorithm E and a decryption algorithm D, a cipher algorithm for generating an encryption key e and a decryption key d on the basis of secret information and a split-key algorithm using the secret information for splitting e into i different split-encryption keys $e_1, e_2, \ldots, e_i$ and/or for splitting d into k different split-decryption keys $d_1, d_2, \ldots, d_k$ respectively,
- the split-key cryptosystem further defined in that executing a number of consecutive encryption and decryption operations on content item X, applying E and split-encryption keys $e_1, e_2, e_i$, and applying D and split-decryption keys $d_1, d_2, \ldots, d_k$ respectively, conforms to $D_{dk}(D_{dk-1}(\ldots(D_{d2}(D_{d1}(E_{ei}(E_{ei-1}(\ldots(E_{e2}(E_{e1}(X))\ldots))=D_{dk}(D_{dk-1}(\ldots(D_{d2}(D_{d1}(X_{e1},e_2,\ldots e_i))=X$ wherein i, k≥1 and i+k>2, the method comprising;
- providing said first CDN1 with at least one encrypted content item or a partially decrypted content item;
- said first CDN1 transmitting said at least one encrypted content item or a partially decrypted content item to said second CDN2;
- a key generator comprising said cipher and split-key algorithm generating split-key information associated with said at least one encrypted content item or a partially decrypted content;
- transmitting a split-decryption control message comprising said split-key information to said first CDN1;
- said first CDN1 relaying said split-decryption control message to said second CDN2;
- generating partially decrypted content item or further partially decrypted content item by applying a decryption operation on said encrypted content item or said partially decrypted content item using said decryption algorithm D and said split-key information; and,
- transmitting said partially decrypted content item or further partial decrypted content item to said content receiving entity.

14. System for secure delivery of a content item X to a content consumption unit comprising:
- an encryption module associated a content source, said encryption module comprising encryption algorithm E for generating an encrypted content item;
- a first decryption module comprising decryption algorithm D associated with a first content distribution network (CDN1);
- a second decryption module comprising decryption algorithm D associated with at least one content consumption unit;
- a key generator associated with said encryption module comprising a cipher and split-key algorithm for generating an encryption key e and a decryption key d on the basis of secret information and a split-key algorithm using said secret information for splitting e into i different split-encryption keys $e_1, e_2, \ldots, e_i$ and/or for splitting d into k different split-decryption keys $d_1, d_2, \ldots, d_k$ respectively;
- wherein said algorithms D, E are further defined in that executing a number of consecutive encryption and decryption operations on said content item X, applying E and split-encryption keys $e_1, e_2, \ldots, e_i$, and applying D and split-decryption keys $d_1, d_2, \ldots, d_k$ respectively, conforms to $D_{dk}(D_{dk-1}(\ldots(D_{d2}(D_{d1}(E_{ei}(E_{ei-1}(\ldots(E_{e2}(E_{e1}(X))\ldots))=D_{dk}(D_{dk1}(\ldots(D_{d2}(D_{d1}(X_{e1, e2, \ldots, ei}))=X$ wherein i, k≥1 and i+k>2.

15. Key server comprising a key generator for use in a content distribution system according to claim 14, said key generator comprising a cipher generator for generating a decryption key d and an encryption key e on the basis of secret information and a split-key generator comprising a random generator for generating one or more random split-keys on the basis of said secret information and a processor comprising a deterministic split-key algorithm for determining a split-key on the basis of said one or more random split-keys and said encryption key e or decryption key d, said key generator being configured to generate encryption keys for said content source and split-key information for said CDN and said content consumption unit.

16. Key sever according to claim 15, wherein said encryption and decryption algorithms and said cipher algorithm are based on the ElGamal algorithm and wherein said split-key algorithm for generating the split-keys is for generating k split keys, wherein the split-key algorithm for generating k split keys is defined as:
- said random generator is configured to select k−1 random integers $d_1 \ldots d_{k-1}$ smaller than p; (define n prime number generated by EL algorithm); and
- compute final integer as $d_k = d-(d_1+\ldots+d_{k-1})(\bmod p)$;
- or, wherein said encryption and decryption algorithms are based the Damgård-Jurik scheme D, E and wherein said split-key algorithm for generating k split-keys is defined as:

determine n−1 random integers $d_1, \ldots, d_{n-1}$ smaller than n (define p prime number generated by EL algorithm); and compute $d_k = d − (d_1 + \ldots + d_{n-1}) \pmod{n}$.

17. Content distribution network (CDN) controller for use in a system according to claim 14, said CDN controller comprising a request routing function for sending a request for split-key information to said key generator in response to a content request of a content consumption unit or of a further CDN, said split-key information being used by a decryption module in order to generate partially decrypted content before sending it to the requesting content consumption unit or said further CDN.

18. Method for secure delivery of key information from at least a first secure module associated with a first content distribution network CDN1 to at least a second secure module in a content receiving entity using a split-key cryptosystem comprising an encryption algorithm E and a decryption algorithm D, a cipher algorithm for generating an encryption key e and a decryption key d on the basis of secret information and a split-key algorithm using the secret information for splitting e into i different split-encryption keys $e_1, e_2, \ldots, e_i$ and/or for splitting d into k different split-decryption keys $d_1, d_2, \ldots, d_k$ respectively;

the split-key cryptosystem further defined in that executing a number of consecutive encryption and decryption operations on content item X, applying E and split-encryption keys $e_1$, $e_2$, $e_i$, and applying D and split-decryption keys $d_1, d_2, \ldots, d_k$ respectively, conforms to $D_{dk}(D_{dk-1}(D_{d2}(D_{d1}(E_{ei-1}( \ldots (E_{e2}( E_{e1}(X)) \ldots ))=D_{dk}(D_{dk-1}( \ldots (D_{d2}D_{d1}1(X_{e1,e2,\ldots ei}))=X$ wherein i, k≥1 and i+k>2, the method comprising:

providing a first secure module with first key information comprising an encrypted key $E_e(K)$, wherein K is a key for encrypting content processed by said CDN1;

a key generator comprising said cipher and split-key algorithm generating at least a first split-key information and transmitting said first split-key information to said first secure module;

said first secure module generating second key information comprising a partially decrypted encrypted key; and, transmitting second key information to said second secure module in said content receiving entity.

\* \* \* \* \*

UNITED STATES PATENT AND TRADEMARK OFFICE
CERTIFICATE OF CORRECTION

PATENT NO. : 9,350,539 B2
APPLICATION NO. : 14/346663
DATED : May 24, 2016
INVENTOR(S) : Peter Veugen, Mattijs Oskar Van Deventer and Omar Aziz Niamut It is certified that error appears in the above-identified patent and that said Letters Patent is hereby corrected as shown below:

On the title page, at item [73], Assignees, please delete "Nederlandse Organisatie voor Toegepast-Natuurwetenschappelijk Onderzoe TNO, Delft (NL)" and replace with -- Nederlandse Organisatie voor Toegepast-Natuurwetenschappelijk Onderzoek TNO, Delft (NL) --.

Signed and Sealed this
Sixteenth Day of August, 2016

Michelle K. Lee
*Director of the United States Patent and Trademark Office*